US012799711B2

(12) United States Patent
Stauffer, Jr. et al.

(10) Patent No.: US 12,799,711 B2
(45) Date of Patent: Nov. 17, 2026

(54) DUAL POWER SWIVEL SYSTEM

(71) Applicant: LATITUDE INNOVATIONS, LLC, Marion Center, PA (US)

(72) Inventors: Levi Stauffer, Jr., Portland, IN (US); Jason Jones, Bedford, PA (US); Paul Jones, Derry, PA (US); Alvin Zook, Cherry Tree, PA (US); David Cooper, Wonewoc, WI (US); Dyan Cooper, Windsor, KY (US); David Troyer, Decatur, IN (US)

(73) Assignee: LATITUDE INNOVATIONS, LLC, Marion Center, PA (US)

( * ) Notice: Subject to any disclaimer, the term of this patent is extended or adjusted under 35 U.S.C. 154(b) by 0 days.

(21) Appl. No.: 19/434,591

(22) Filed: Dec. 29, 2025

(65) Prior Publication Data

US 2026/0125875 A1 May 7, 2026

Related U.S. Application Data

(63) Continuation-in-part of application No. 19/271,923, filed on Jul. 17, 2025, now Pat. No. 12,698,044, (Continued)

(51) Int. Cl.

| | |
|---|---|
| ***E02F 9/12*** | (2006.01) |
| ***E02F 3/36*** | (2006.01) |
| *A01G 23/00* | (2006.01) |

(52) U.S. Cl.

CPC ............ *E02F 9/121* (2013.01); *E02F 3/3654* (2013.01); *E02F 3/3681* (2013.01); *A01G 23/003* (2013.01)

(58) Field of Classification Search

CPC ......... E02F 9/121; E02F 9/123; E02F 3/3654; E02F 3/3681

(Continued)

(56) References Cited

U.S. PATENT DOCUMENTS

| | | | |
|---|---|---|---|
| 3,982,340 | A | 9/1976 | Satterwhite |
| 6,266,901 | B1 | 7/2001 | Kanda et al. |

(Continued)

FOREIGN PATENT DOCUMENTS

| | | | |
|---|---|---|---|
| AU | 2019100317 | A4 | 5/2019 |
| CN | 200974980 | Y | 11/2007 |

(Continued)

OTHER PUBLICATIONS

Written Opinion of the International Searching Authority dated Sep. 25, 2025.

*Primary Examiner* — Michael Mccullough
*Assistant Examiner* — Jessica L Burkman
(74) *Attorney, Agent, or Firm* — Jacob M. Ward; Ward Law Office LLC

(57) ABSTRACT

A power swivel system for an articulated machine can include a core having a rotational axis and configured to permit electrical conduit passage. A first portion couples to and rotates with the cabin, including a first slip ring assembly for electrical power distribution and manifolds for hydraulic power coupling. A second portion rotatably disposed about the core rotates with the boom apparatus, can include a second slip ring assembly for electrical power and a first jug for hydraulic power distribution. A third portion remains stationary within the front chassis, providing both hydraulic and electrical power distribution. The first portion and the second portion rotate independently of each other and the third portion, enabling the cabin and boom apparatus to operate independently while maintaining continuous power transmission throughout the articulated machine.

19 Claims, 50 Drawing Sheets

Related U.S. Application Data which is a continuation-in-part of application No. 17/803,564, filed on Aug. 26, 2022, now abandoned.

(58) Field of Classification Search

USPC ........................................................ 414/695.8

See application file for complete search history.

(56) References Cited

U.S. PATENT DOCUMENTS

| | | | |
|---|---|---|---|
| 6,385,870 | B1 | 5/2002 | Webel et al. |
| 7,322,133 | B2 | 1/2008 | Horton |
| 7,506,506 | B2 | 3/2009 | Krieger |
| 7,658,235 | B2 | 2/2010 | Dahl et al. |
| 7,739,813 | B2 | 6/2010 | Beaton |
| 7,914,226 | B2 | 3/2011 | Miller |
| 8,002,074 | B2 | 8/2011 | Roose |
| 8,764,369 | B2 | 7/2014 | Bowne |
| 10,167,180 | B2 | 1/2019 | Kent et al. |
| 10,815,636 | B2 | 10/2020 | Wagner |
| 2002/0037211 | A1 | 3/2002 | Korycan et al. |
| 2005/0193599 | A1 | 9/2005 | McCoy |
| 2009/0223683 | A1 | 9/2009 | Davidson et al. |
| 2013/0026271 | A1 | 1/2013 | Trembley et al. |
| 2015/0274492 | A1 | 10/2015 | Govender |
| 2016/0122972 | A1 | 5/2016 | Price |
| 2017/0233978 | A1 | 8/2017 | Friedrich |
| 2018/0362098 | A1 | 12/2018 | Staal |
| 2019/0071840 | A1 | 3/2019 | Altstadt et al. |
| 2020/0307967 | A1 | 10/2020 | Ishikawa et al. |
| 2024/0133153 | A1 | 4/2024 | Sachdeva et al. |

FOREIGN PATENT DOCUMENTS

| | | | |
|---|---|---|---|
| FI | 20225273 | A1 | 3/2022 |
| FR | 2773753 | A1 | 7/1999 |
| GB | 2184419 | A | 6/1987 |
| WO | 2001027397 | A1 | 4/2001 |
| WO | 2013089074 | A1 | 6/2013 |

DUAL POWER SWIVEL SYSTEM

CROSS-REFERENCE TO RELATED APPLICATIONS

This application is a continuation-in-part of U.S. patent application Ser. No. 19/271,923 filed on Jul. 17, 2025, which claims the benefit of U.S. patent application Ser. No. 17/803, 564 filed on Aug. 26, 2022. The entire disclosures of the above applications are incorporated herein by reference.

FIELD

The present technology relates to a construction machine, and more specifically, to an articulated machine for moving objects.

INTRODUCTION

This section provides background information related to the present disclosure which is not necessarily prior art.

In the field of agricultural and construction machinery, several challenges impact operational efficiency and accessibility. Tractors and earth-moving equipment can include a fixed operator cabin with limited visibility and restricted operational angles, making maintained visual contact with work areas during complex tasks difficult. Visibility issues can require an operator to work in an uncomfortable position, leading to reduced productivity and increased operator fatigue.

Agricultural and construction tasks can further require multiple specialized machines, each designed for a specific function such as moving materials, processing timber, or performing excavation work. The necessity for multiple machines increases operational costs, storage requirements, and maintenance complexity. The financial burden of purchasing and maintaining several specialized pieces of equipment creates barriers to entry for small operations and individual property owners. Additionally, the logistics of transporting multiple machines between work sites and storing the machines securely presents challenges.

The physical demands of operating heavy machinery pose an additional barrier for elderly or disabled individuals who wish to maintain property or perform agricultural work. Equipment often lacks adequate accessibility features and requires physical effort to operate effectively, limiting who can use such machinery. The physical requirements of frequent mounting and dismounting, manual attachment changes, and operation of controls in fixed positions can create exclusionary conditions that prevent certain individuals from participating in property maintenance and agricultural activities. These limitations can particularly impact aging farmers and property owners who wish to continue managing land independently.

Agricultural and construction equipment can be limited in the ability to efficiently move and transport large quantities of materials. While certain machines can lift and move materials within the capacity of a bucket or attachment, such machines can lack an integrated system for collecting and transporting bigger loads. The inability to transport large loads can require multiple trips between collection and drop-off points, increasing operational time and reducing efficiency. The need to repeatedly travel between locations with only bucket-sized loads further creates unnecessary wear on equipment and terrain while consuming more fuel and operator hours. Additionally, the absence of substantial integrated storage capacity means operators must coordinate multiple pieces of equipment, one for collecting material and another for transport, further complicating logistics and increasing operational costs.

Various patents are known in the art such as WO2001027397A1, CN200974980U, WO201389074, U.S. Pat. No. 8,002,074B2 and GB2184419A, discloses usage of a machine of digging, agriculture, and transportation purposes. Patents such as U.S. Pat. No. 8,764,369B2, and US2013026271A1 discloses bale spear in agriculture machines, U.S. Pat. Nos. 10,167,180B2 and 7,658,235B2 discloses usage of pallet forks in vehicles, U.S. Pat. Nos. 7,739,813B2 and 7,506,506B2 discloses usage of grading bucket in vehicles, U.S. Pat. Nos. 398,240A and 7,914, 226B2 discloses usage of digging buckets in the excavator; and U.S. Pat. Nos. 7,322,133B2 and 6,385,870B1 discloses usage of hydraulic hammer in the excavator machines.

Accordingly, there is a need for an articulated machine with an accessible attachment system that provides large load transport and independent operability.

SUMMARY

In accordance with teachings of the present application, a machine having attachment units for 360° rotation of a digger and a cab is provided.

An object of the present application is to provide a machine having a front frame and a rear frame connected by a hydraulic powered articulated steering, and mechanism for rotation of a digger, a dumper or a rear portion and a cab.

Another object of the present application is to provide a hydraulic motor for rotating the digger or grasping element to 360 degrees around the arm, and further providing a plurality of hydraulic actuators and a hydraulic outrigger.

An object of the present application is to provide a forestry management machine 109 (see FIG. 1) for processing residual fallen trees and tree tops into useful logs, firewood and burnable waste; a machine 109 (see FIG. 1) that provides the ability from the climate-controlled safety of the 2-man operator cabin 108 (see FIG. 1) to process the abovenamed.

An object of this machine 109 (see FIG. 1) is to enable elderly and/or disabled to safely and comfortably perform outdoor property maintenance and landscaping tasks not normally possible for elderly and/or disabled.

The above discussed, and subsequently discussed, exemplifications of the present device will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and nonobvious one with respect to the other.

In concordance with the instant disclosure, an articulated machine with an accessible attachment system that provides large load transport and independent operability, has surprisingly been discovered. The present technology includes articles of manufacture, systems, and processes that relate to an articulated machine having a rotatable boom and cabin for material handling and processing.

In certain embodiments, an articulated machine for moving an object is provided that can include a front chassis, a rear chassis, a power swivel system, a cabin, and a boom apparatus. The rear chassis can be coupled to the front chassis by a rear chassis actuator for moving the rear chassis relative the front chassis. The power swivel system can be disposed partially within the front chassis and can have a rotational axis. The cabin can be rotatably coupled the power swivel system and can be disposed adjacent the front chassis. The cabin can be independently rotatable about the rotational axis of the power swivel system. The boom apparatus can be rotatably mounted on the front chassis and can be coupled to the power swivel system. The boom apparatus can include a boom swivel plate disposed between the front chassis and the cabin. The boom swivel plate can permit independent rotation of the boom apparatus about the rotational axis of the power swivel system. The boom apparatus can include a boom coupled to the boom swivel plate and configured to move the object.

In certain embodiments, an articulated machine for moving an object is provided that can include a front chassis, a rear chassis, a power swivel system, a boom apparatus, and a cabin. The rear chassis can be coupled to the front chassis by a rear chassis actuator for moving the rear chassis in a flexion direction relative to the front chassis. The power swivel system can be disposed partially within the front chassis and can have a rotational axis. The boom apparatus can be rotatably mounted on the front chassis and can be coupled to the power swivel system. The boom apparatus can include a boom swivel plate disposed adjacent to the front chassis. The boom swivel plate can permit independent rotation of the boom apparatus about the rotational axis of the power swivel system via a boom rotation actuator. The boom apparatus can include a boom coupled to the boom swivel plate and configured to move the object. The cabin can be rotatably coupled the power swivel system and disposed adjacent the boom swivel plate. The cabin can include a cabin rotation actuator coupled to the boom swivel plate and configured to independently rotate the cabin continuously about the rotational axis of the power swivel system.

In certain embodiments, a method for moving an articulated machine is provided that includes providing an articulated machine, as described herein. The method can include independently moving at least one of the rear chassis, the cabin, and the boom apparatus.

In certain embodiments, a power swivel system for an articulated machine having a front chassis, a cabin, and a boom apparatus is provided. The power swivel system can include a core, a first portion, a second portion, and a third portion. The core can have a rotational axis and can extend from a first end to a second end. The core can be configured to permit electrical conduit to run from the first end to the second end. The first portion can be disposed about and coupled to the core. The first portion can be configured to rotate with the cabin of the articulated machine. The first portion can include a first slip ring assembly for providing electrical power to the cabin. The first portion can include a first manifold and a second manifold for coupling the first portion to the cabin and providing hydraulic power to the first portion. The second portion can be rotatably disposed about the core and can be configured to rotate with the boom apparatus of the articulated machine. The second portion can include a second slip ring assembly for providing electrical power to the boom apparatus, a first jug for providing hydraulic power to the boom apparatus, and a support manifold for coupling the second portion to the boom apparatus. The third portion can be disposed about the core and can be stationary within and coupled to the front chassis. The third portion can provide hydraulic power and electrical power to the front chassis. The first portion and the second portion can rotate independently of one another and the third portion to allow the cabin and the boom apparatus to rotate independently of one another and the front chassis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DETAILED DESCRIPTION

Figure 1:
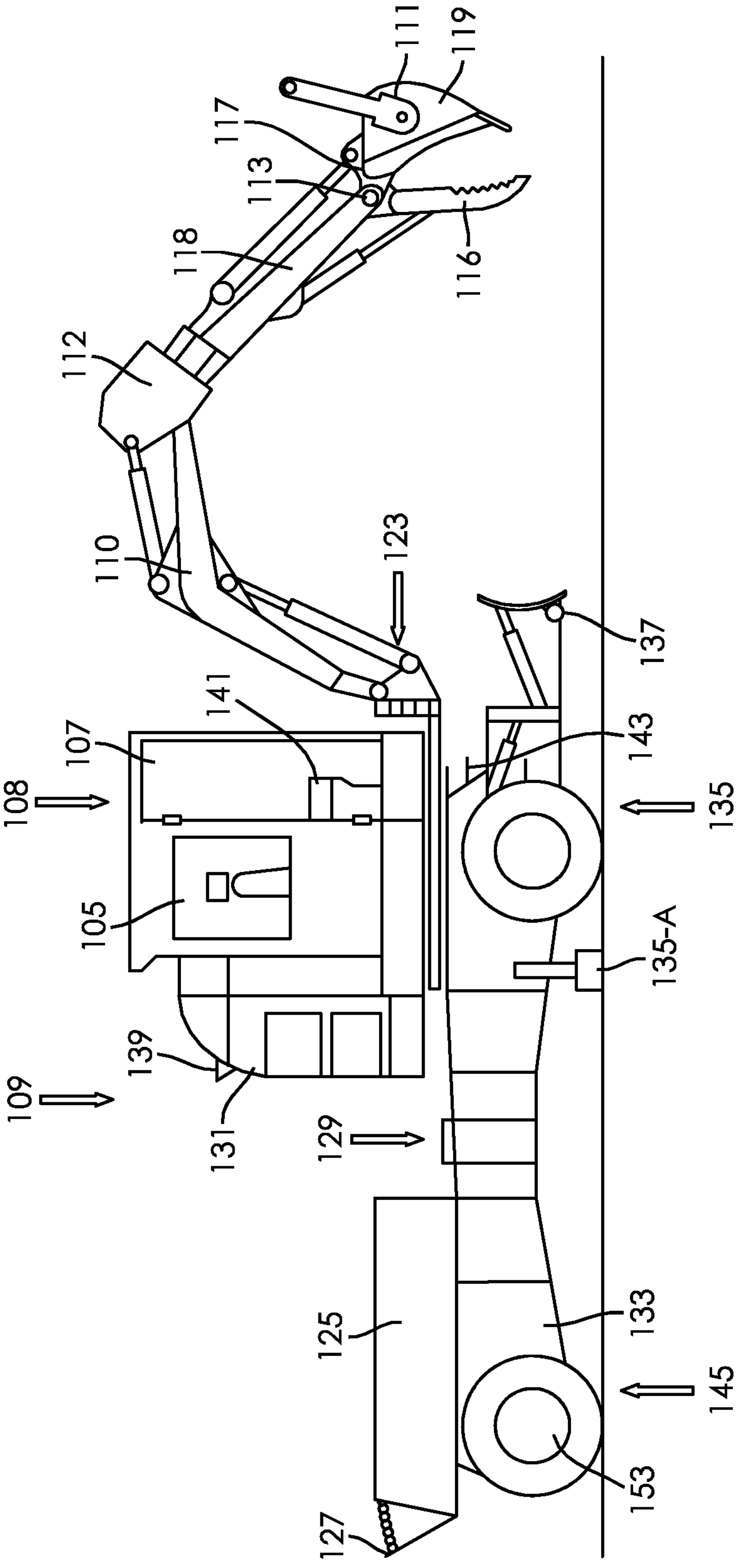
FIG. 1 Illustrates a side view of a machine.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1A:
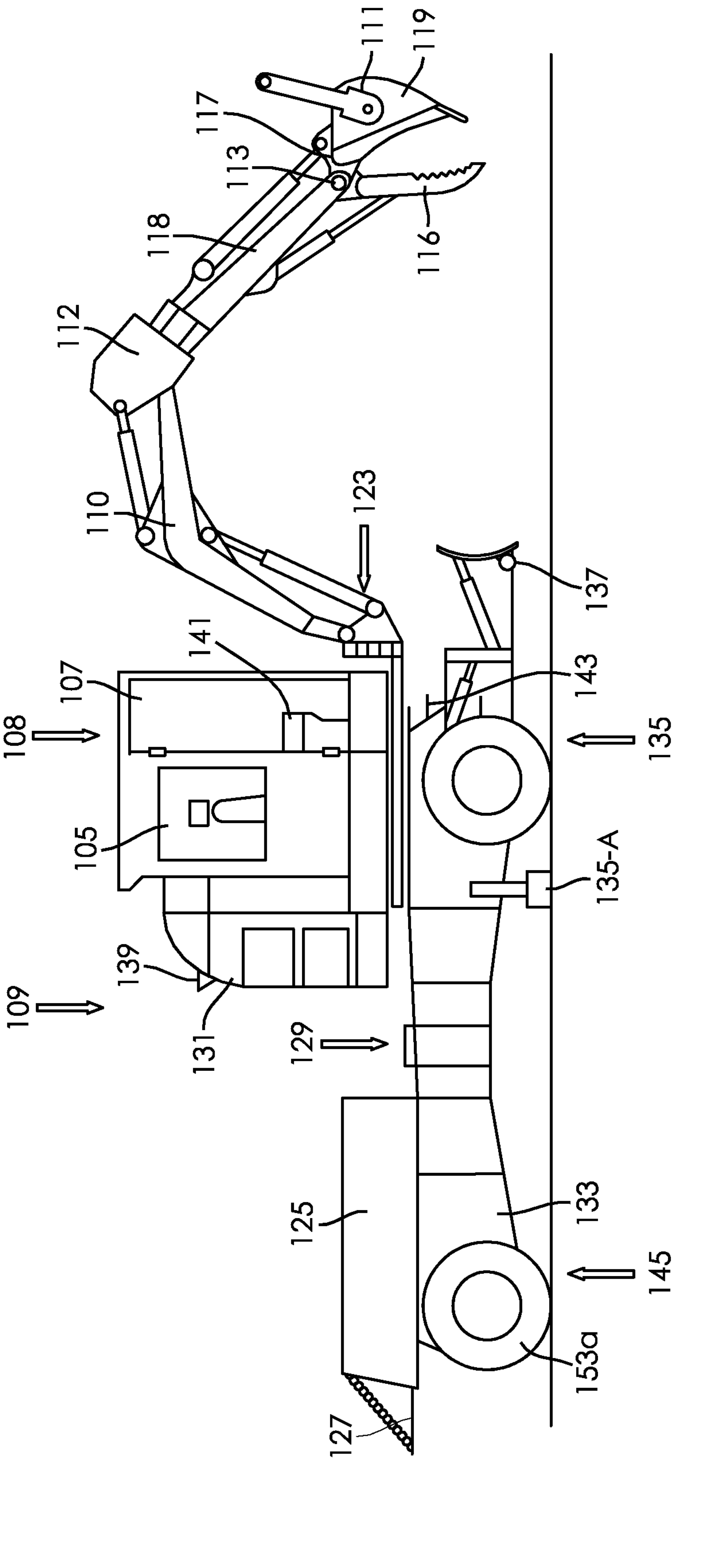
FIG. 1A Illustrates a side view of a machine with tailgate fully open.
Figure 2:
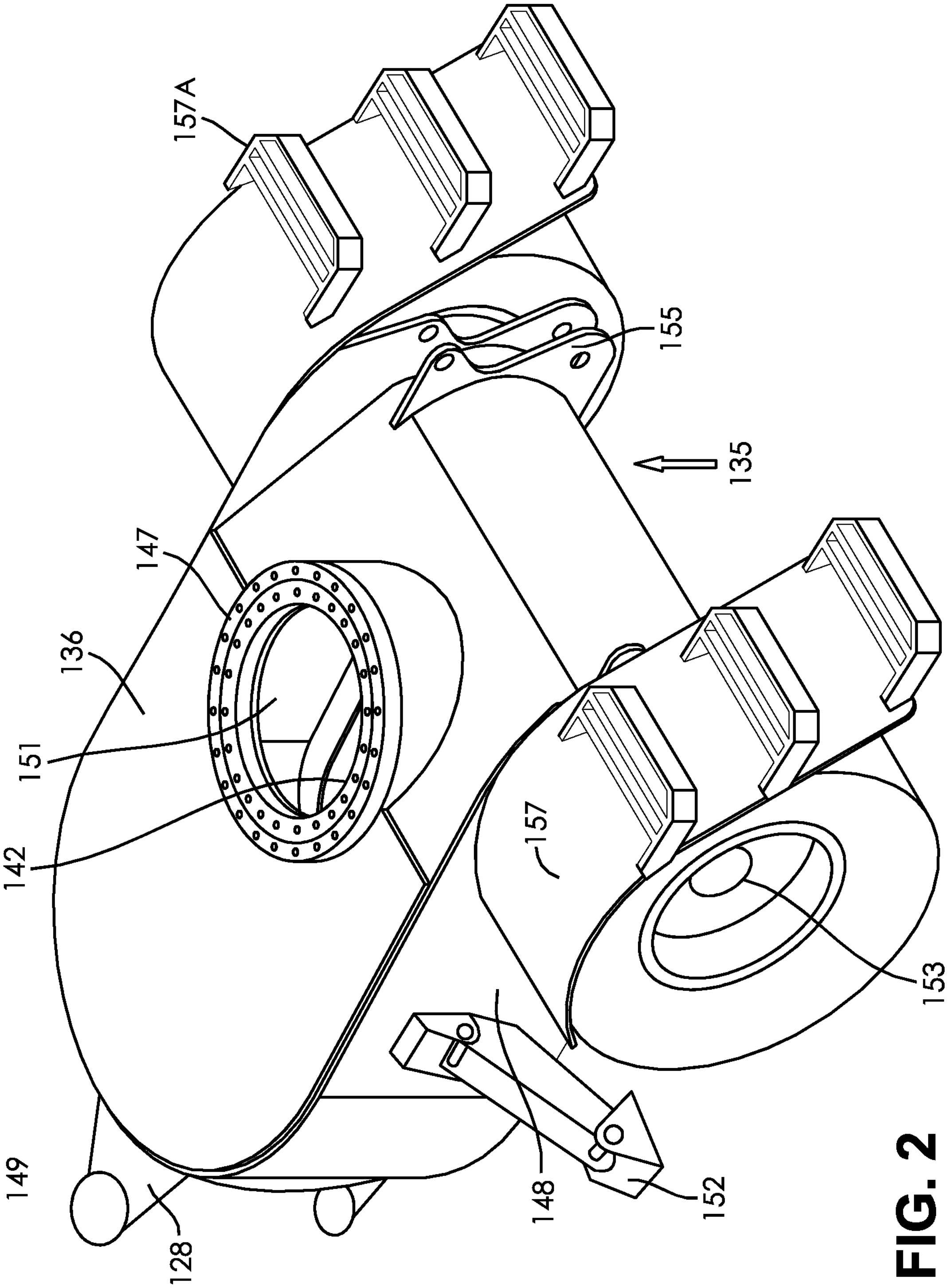
FIG. 2 Illustrates a dextral front isometric view of front chassis.

FIG. 1 Illustrates a side view of the 2-man operator cabin 108, machine 109, and boom 110 and passenger door 107. FIG. 1A Illustrates a side view of a machine with tailgate fully open; and FIG. 2 Front chassis 135 includes a uni-body (one piece) water-jet machined, press-formed, welded steel plate frame 136 with a circular 24" bolt-on steel access plate 142 bolted on base of front chassis 135 and a hydraulic 2-speed wheel final drive 153 attached through the anterior area of each front chassis frame sidewall 148, each hydraulically powered traction final drive 153 is fitted with wide flotation/traction tires 153*a* (see FIG. 3). Affixed to each front chassis frame sidewall 148 above the tires 153*a* (see FIG. 3) is a steel plate radius-formed wheel fender 157 rotated forward in an embodiment 12" above ground level. Affixed to upper surface of each steel plate radius-formed fender 157 are serrated tread entry steps 157 A to facilitate safe entry of independently rotatable 1 or more man operator cabin. On each front chassis frame sidewall 148 behind hydraulic 2-speed wheel final drive 153 is affixed a hydraulically actuated front chassis outrigger 152. Affixed to each lateral extremity of the lower anterior vertical surface of front chassis 135 is a front tool coupler connector 155. On upper surface of front chassis 135 is affixed a boom swivel bearing 147 centered on circular port for flow-through fluid swivel 151 boom swivel bearing 147 enables attachment and continuous rotation of independently rotatable boom apparatus 123 (see FIG. 1, FIG. 4). Affixed to extreme posterior vertical surface of front chassis 135 is a horizontal axis (parallel to machine) limited flexion steering actuator connector device 128 enabling a limited (20° each side of vertical) horizontal flexion of front chassis 135 and rear chassis 133 (see FIG. 1, FIG. 3) relative to each other facilitating traction on rough or uneven terrain.

Figure 3:
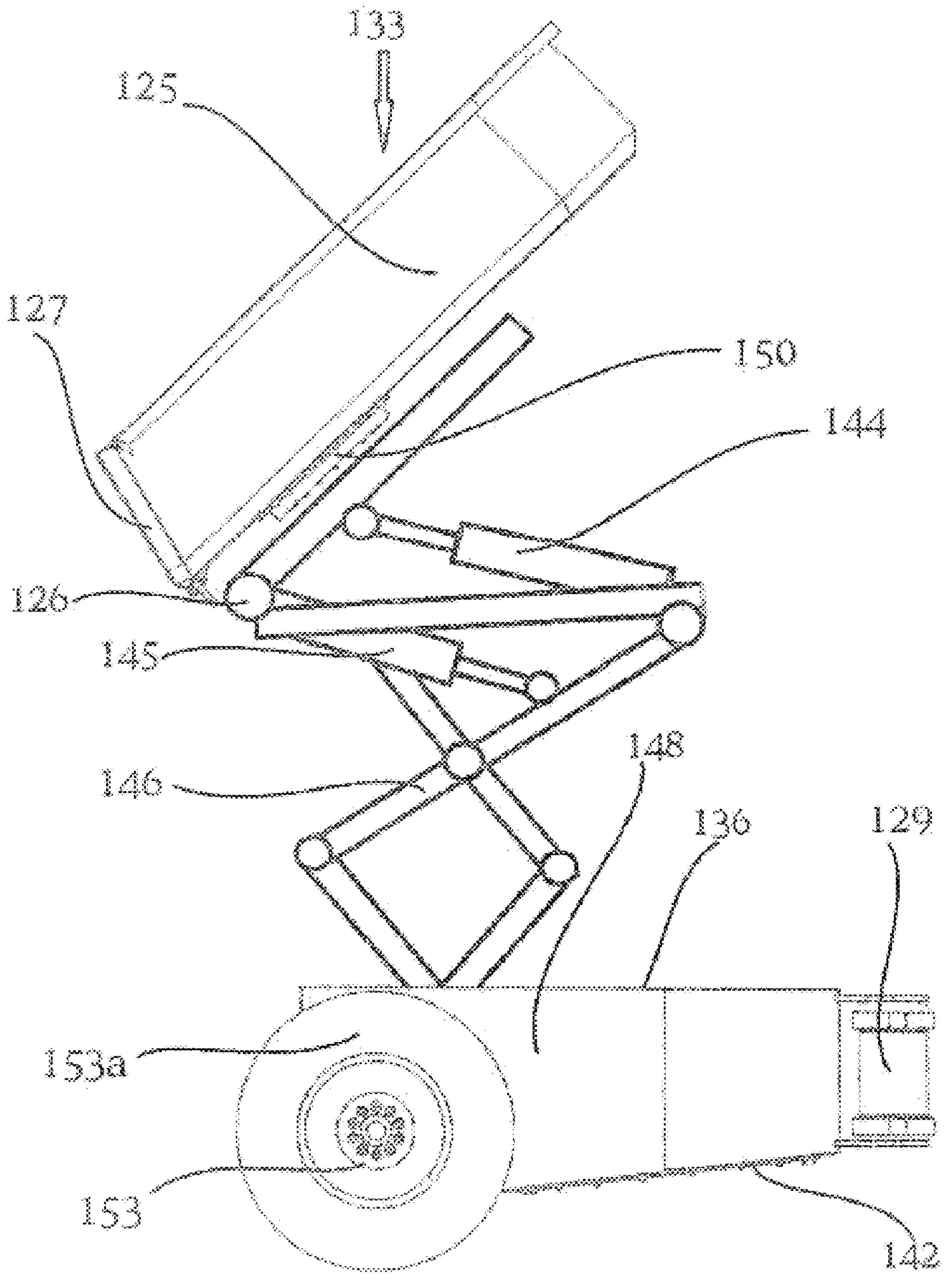
FIG. 3 Illustrates a side view of rear chassis with dump body lifted and dumping.
Figure 3A:
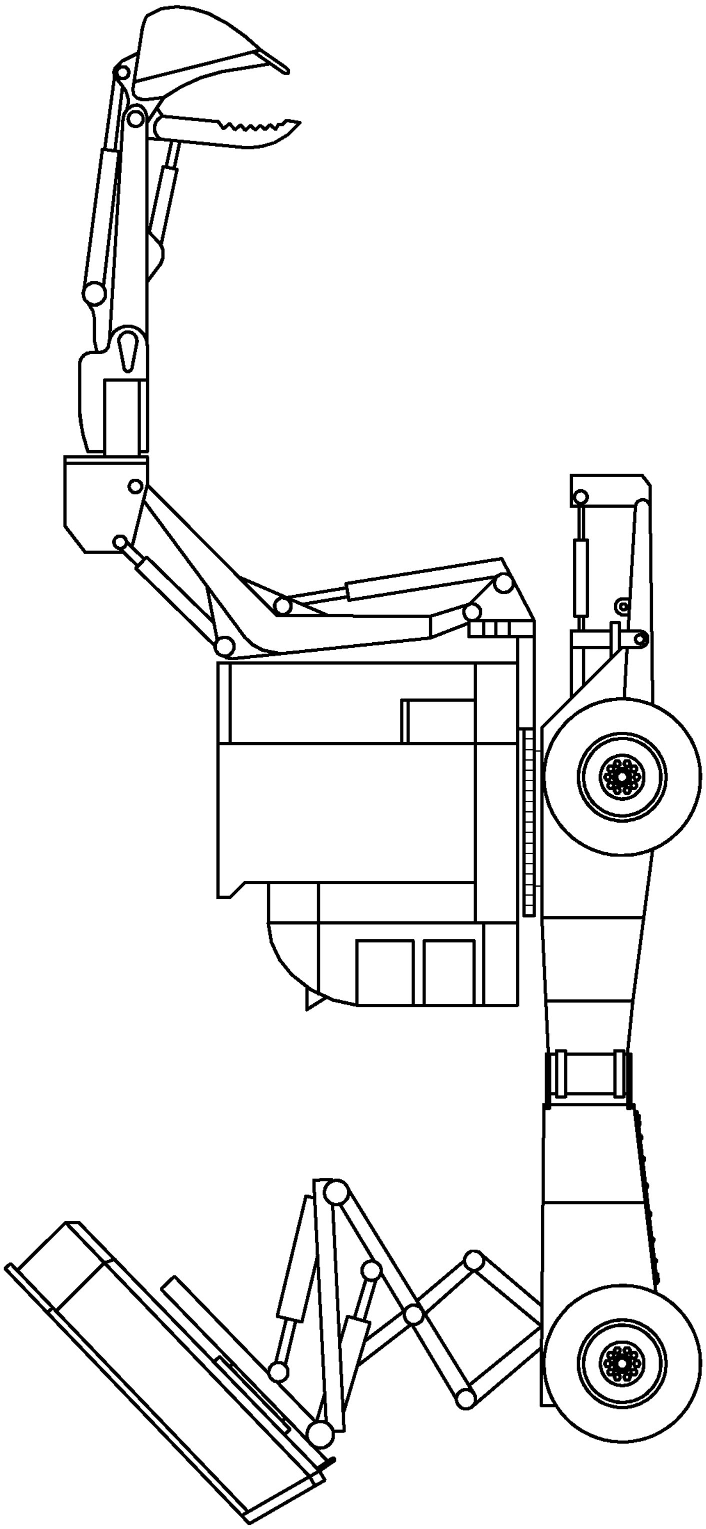
FIG. 3A Illustrates a side view of the machine with the dump body lifted and dumping.
Figure 3B:
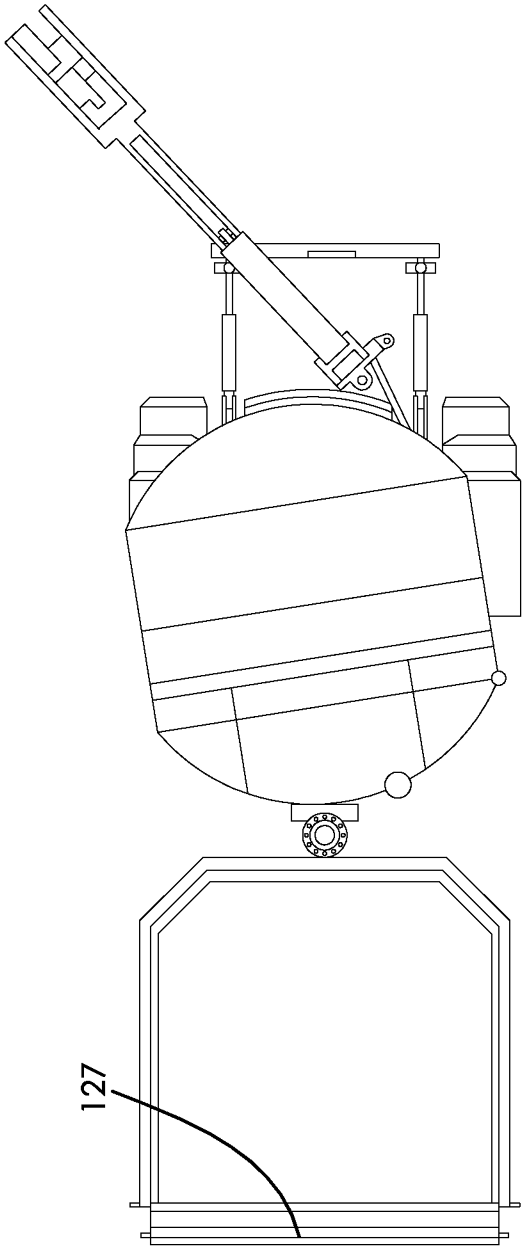
FIG. 3B Illustrates a side view of full machine dump body lifted dumping.

FIG. 3 Rear chassis 133 includes a uni-body (one piece) water-jet machined, press-formed, welded steel plate frame 136 with a circular 24" bolt-on steel access plate 142 bolted on base of rear chassis 133 and a hydraulic 2-speed wheel final drive 153 attached through the posterior area of each rear chassis frame sidewall 148, each hydraulic 2-speed wheel final drive 153 is fitted with wide flotation I traction tires 153*a*. Affixed to extreme anterior vertical surface of rear chassis uni-body (one piece), water-jet machined, press-formed, welded steel plate frame 136 is a hydraulic rotary actuator steering device 129 enabling a limited up (up to 45° each side of 0°) flexion of front chassis 135 (see FIG. 1, FIG. 2) and rear chassis 133 relative to each other on a vertical axis facilitating steering of travel and positioning of machine 108 and attachments 111 & etc. (see FIG. 1) . Installed inside uni-body (one piece), water-jet machined, press-formed, welded steel plate frame 136 is a hydraulically actuated dump body lift mechanism 146 enabling lifting of rotatable dump body 125 up to but not limited to 48" above un-lifted rest position. Hydraulically actuated dump body lift mechanism 146 is powered by hydraulically operated dump body lift actuator 145. Affixed to upper surface of hydraulically actuated dump body lift mechanism 146 is affixed hydraulically operated dump actuator 144 enabling the rotatable dump body 125 to operate vertically from a posterior horizontal axis 126. Affixed to upper surface of hydraulically operated dump actuator 144 is dump rotation actuator 150 enabling limited rotation (up to 100° each side of normal rest position, up to 200° total rotation) of rotatable dump body 125. Affixed to upper surface of dump rotation actuator 150 is a rotatable dump body 125 enabling storage, transport, and placement (dumping) of cut stone, logs, firewood, pallet, crushed stone aggregate, top soil and etc. Dump body 125 includes a horizontal axis hinged tailgate 127 (see FIG. 1, FIG. 3*b*) comprising the posterior vertical plane of dump body 125. Horizontal axis hinged tailgate 127 (see FIG. 1, FIG. 3*b*) is hinged along lower edge of tailgate 127 on a horizontal axis extending along the posterior width of dump body base 125. Horizontal axis hinged tailgate 127 (see FIG. 1, FIG. 3A) facilitates containment of solids and aggregates in the closed position (see FIG. 3) and release of solids and aggregates for placement in the fully open (see FIG. 1A) position.

Figure 4:
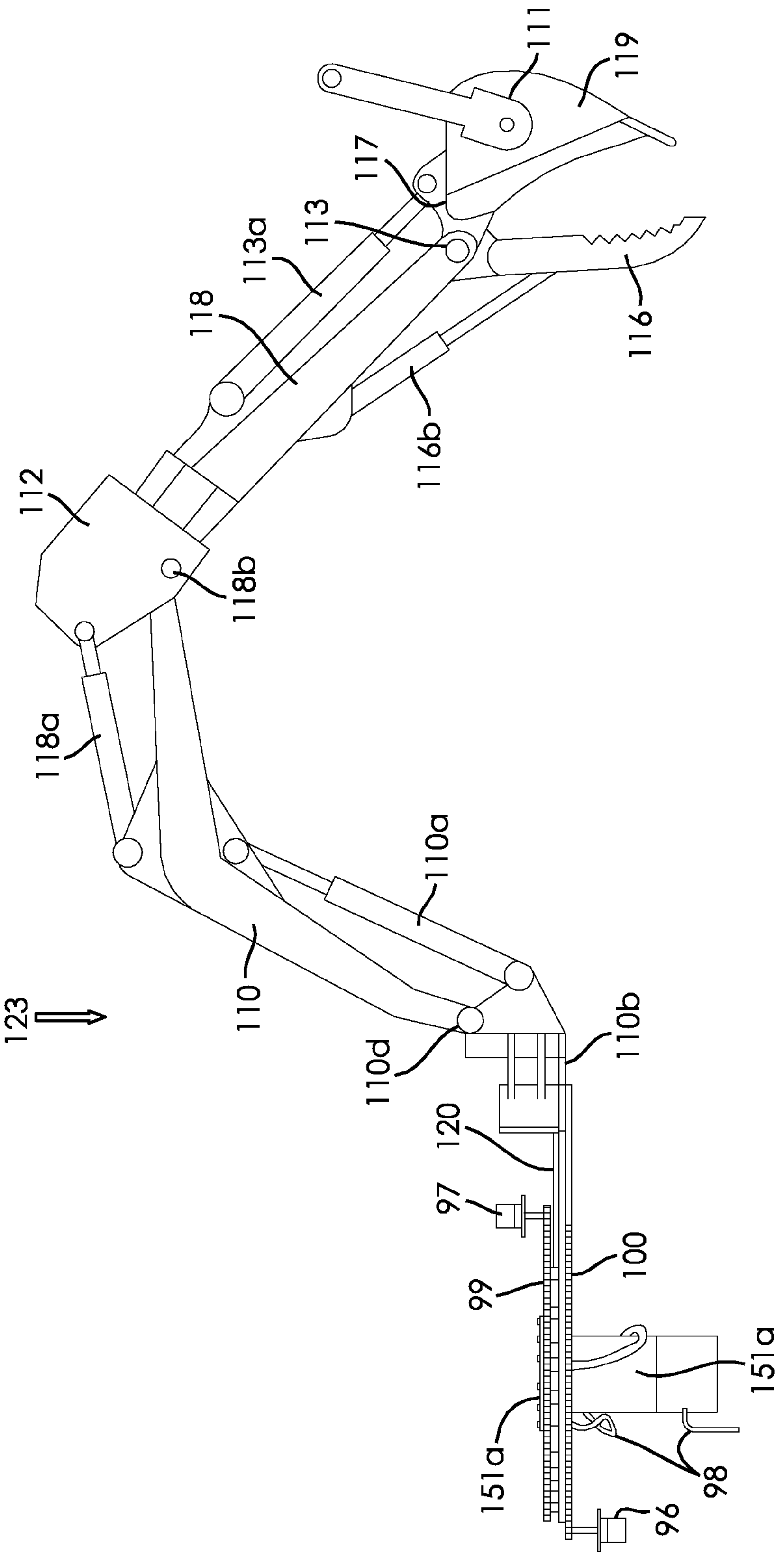
FIG. 4 Illustrates a side view of independently rotatable boom apparatus.
Figure 13:
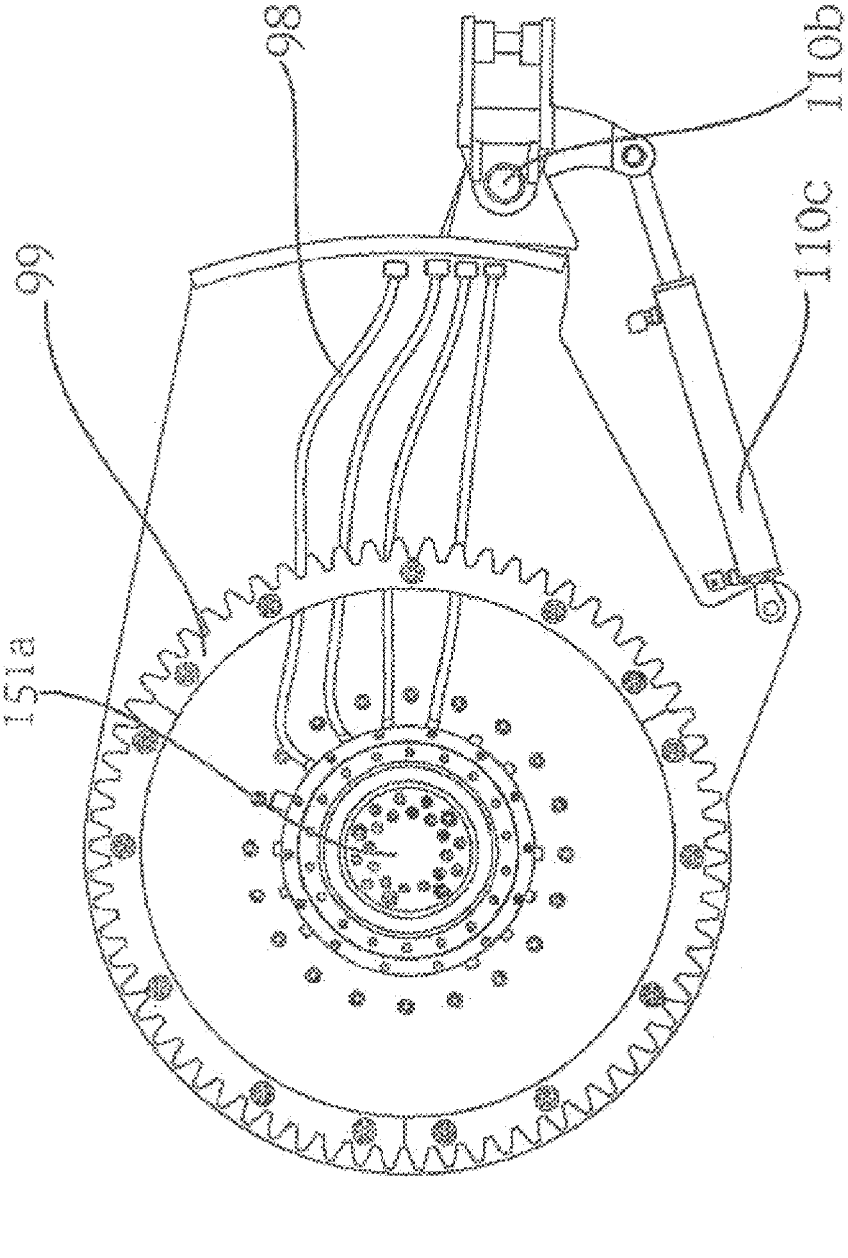
FIG. 13 Illustrates a top view of boom support plate with hydraulic fluid circuits.
Figure 14:
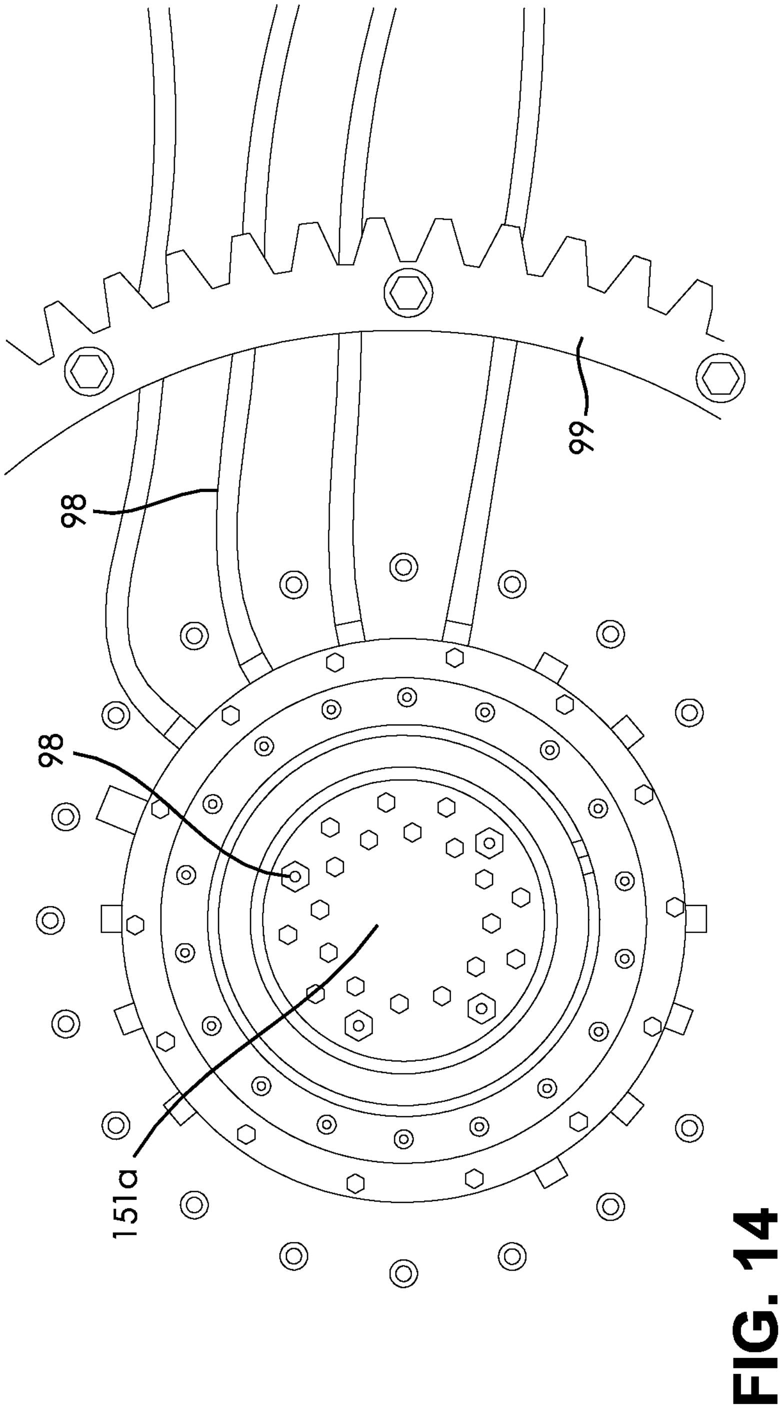
FIG. 14 Illustrates close-up view of hydraulic circuits and fluid swivel.
Figure 15:
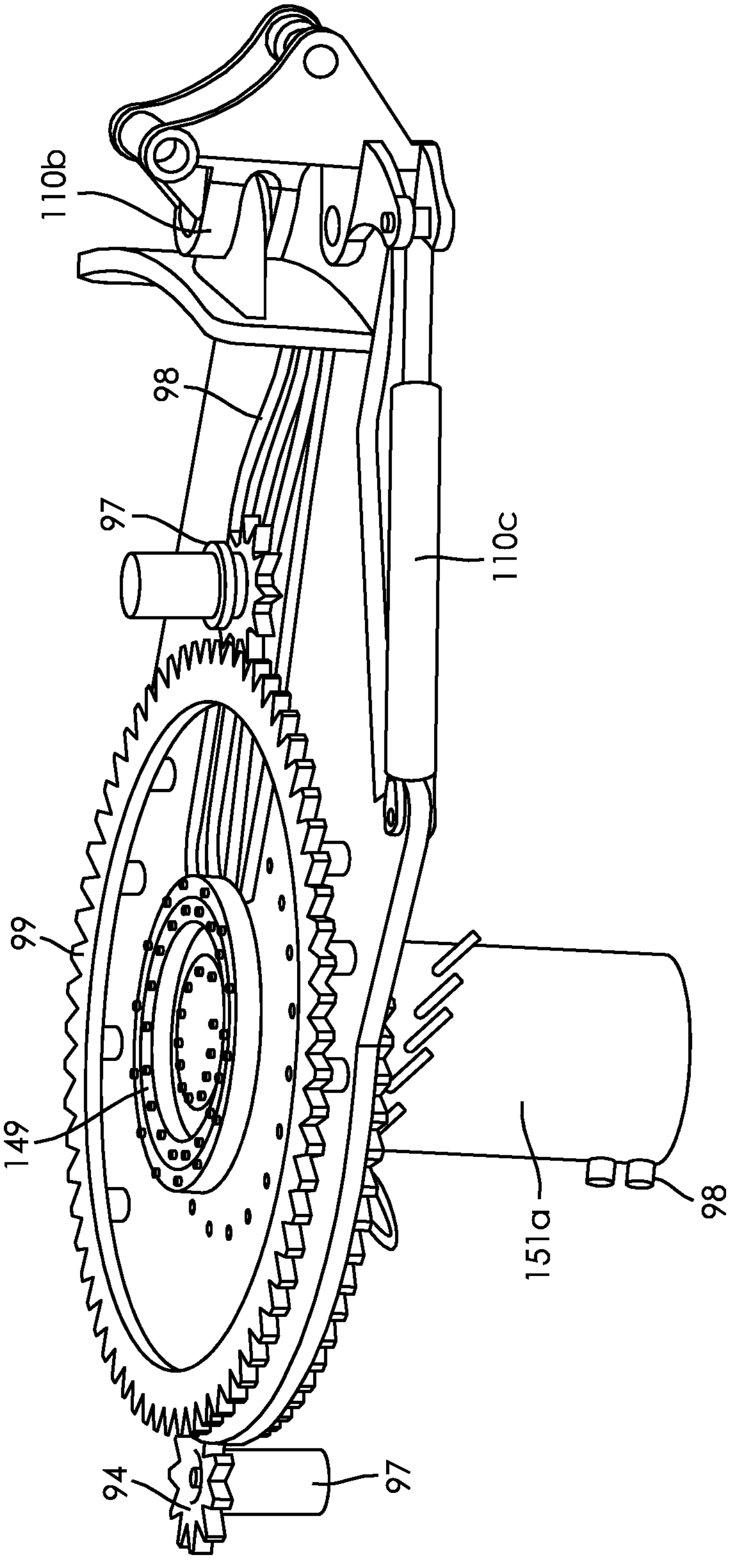
FIG. 15 Illustrates boom support swivel w/gears, pinions, fluid swivel, and fluid circuits.
Figure 16:
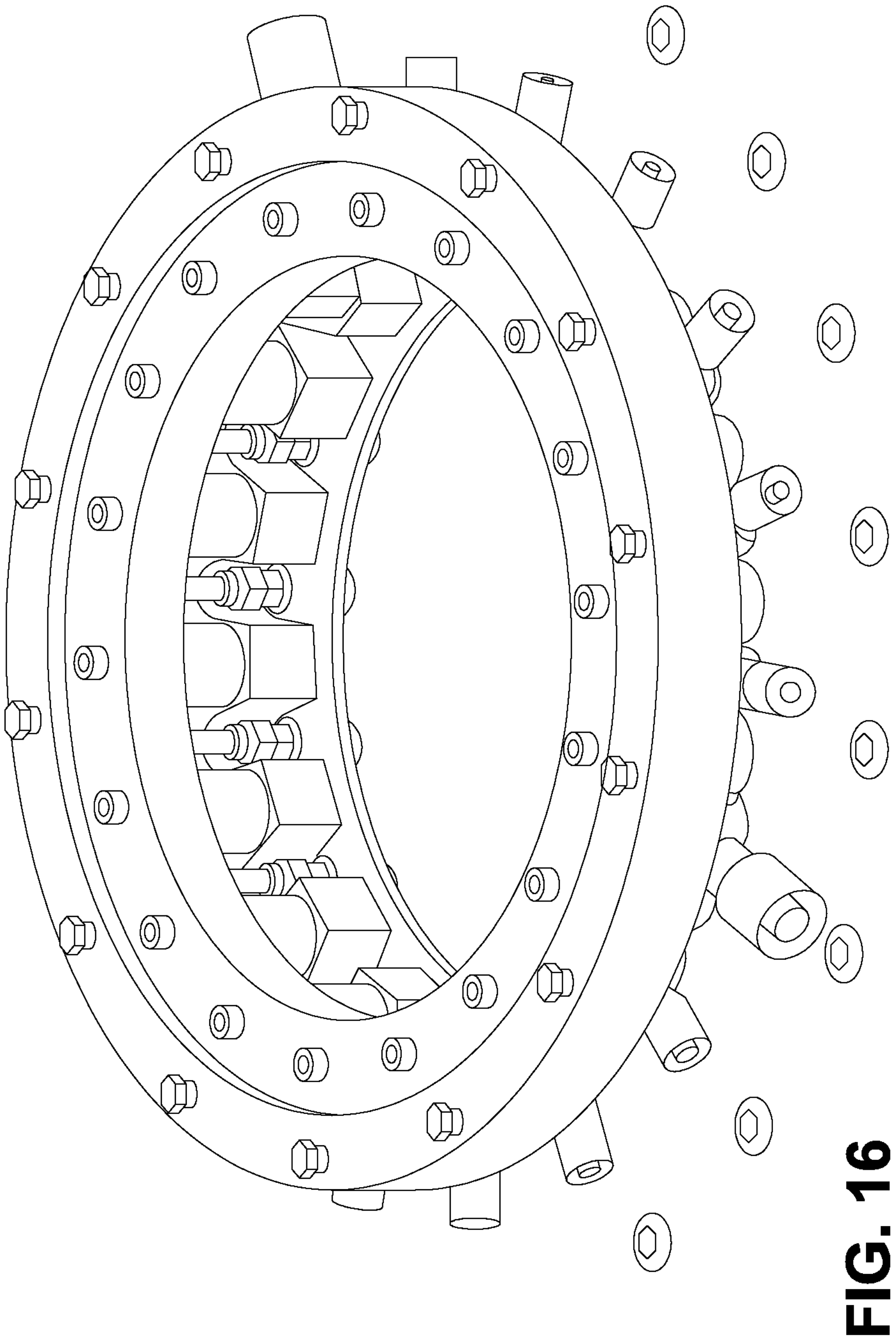
FIG. 16 Illustrates close-up of fluid circuits routed through cab-mount bearing.

FIG. 4 Independently rotatable boom apparatus 123 includes boom support swivel plate 120 (see also attached FIGS. 13 through 21) boom support swivel plate 120 enables unlimited continuous rotation of independently rotatable boom apparatus 123 via an undermounted gear 100 engaged to boom rotation pinion gear actuator 96. Boom support swivel plate 120 attaches via boom swivel bearing 147 (see FIG. 2) to top offront chassis 135 (see FIG. 2) enabling unlimited rotation of independently rotatable boom apparatus 123. Affixed to upper surface of boom support swivel plate 120 (see also FIG. 13) is cabin rotation gear 99. Cabin rotation gear 99 (see also FIG. 13) facilitates continuous unlimited rotation of independently rotatable 2-man operator cabin 108 synchronously with or in simultaneous opposition to independently rotatable boom apparatus 123.

Figure 17:
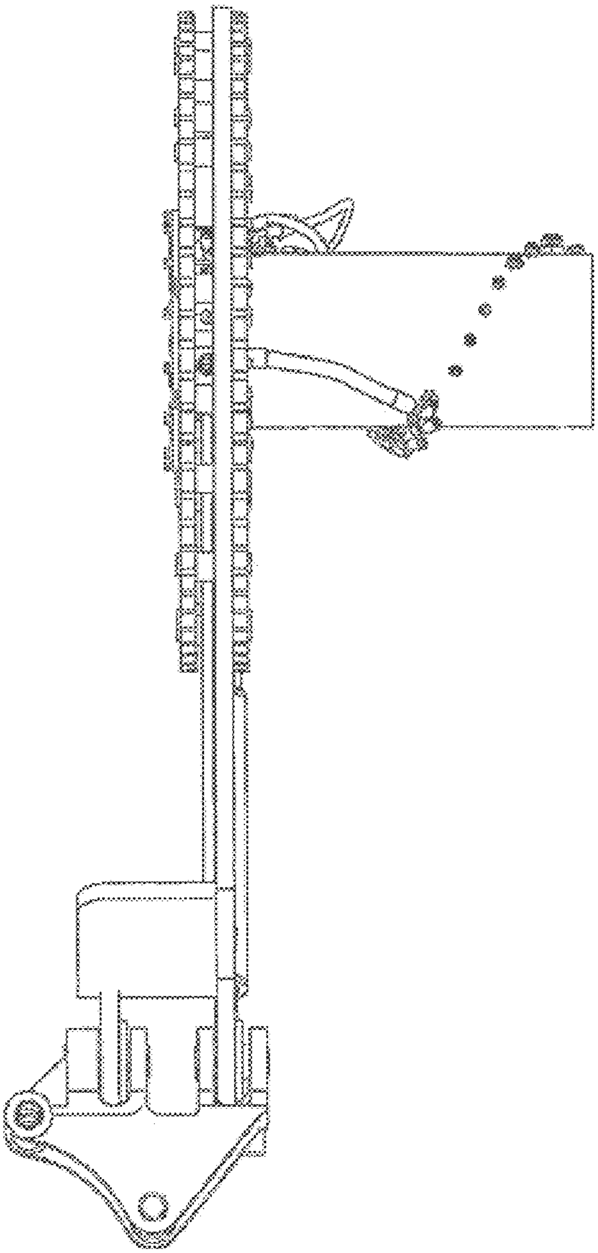
FIG. 17 Illustrates side view of boom support swivel plate with boom hinge.
Figure 18:
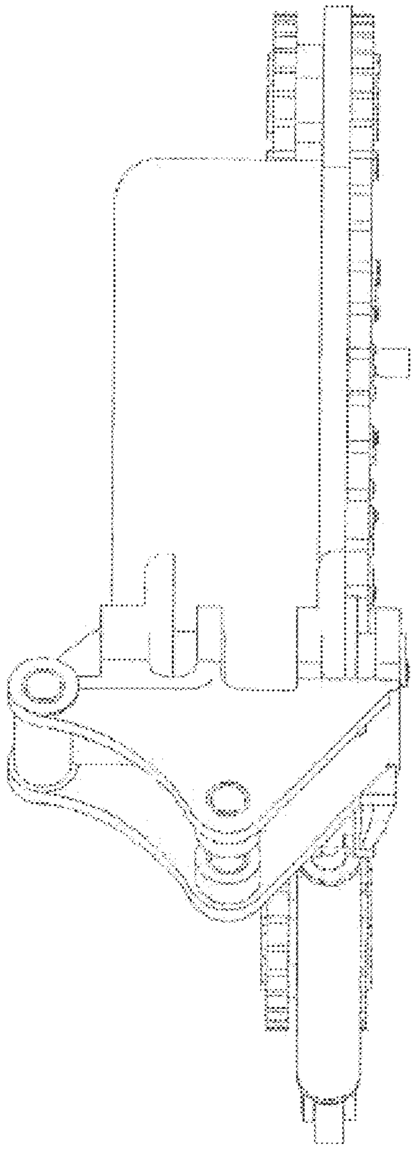
FIG. 18 Illustrates front view of boom support swivel plate with vertical axis boom hinge.
Figure 19:
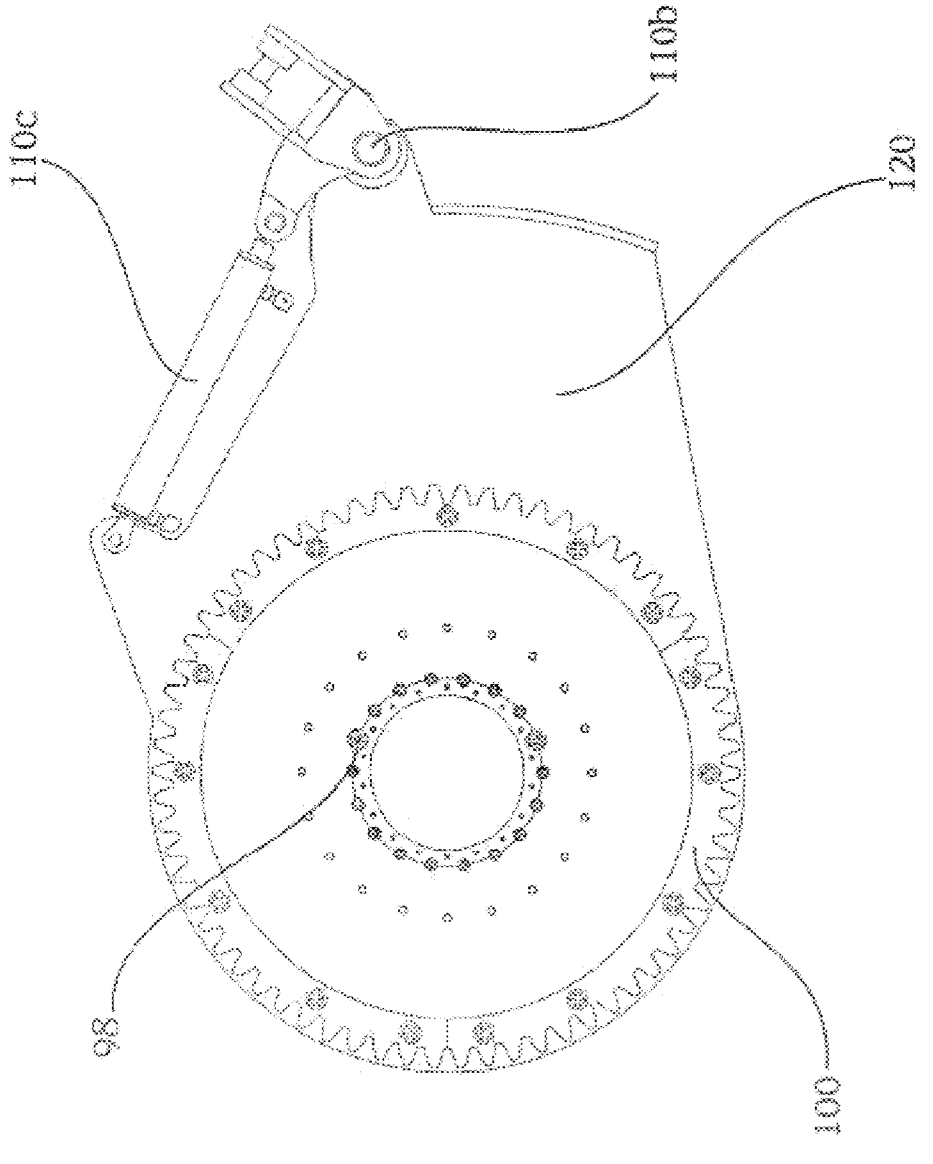
FIG. 19 Illustrates bottom view of boom support swivel plate with boom rotation gear.
Figure 20:
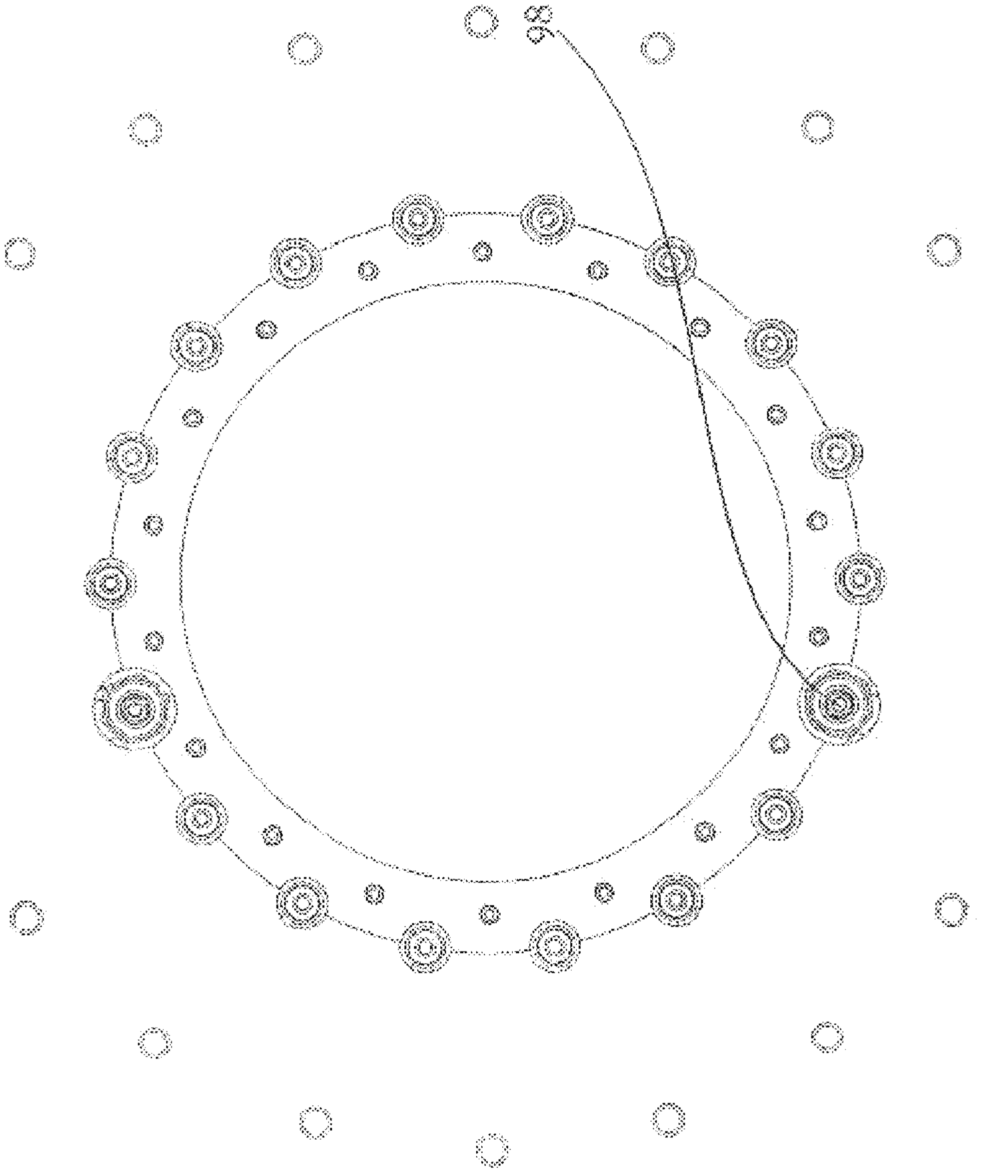
FIG. 20 Illustrates close-up of bottom view with view of multiple fluid circuit fittings.
Figure 21:
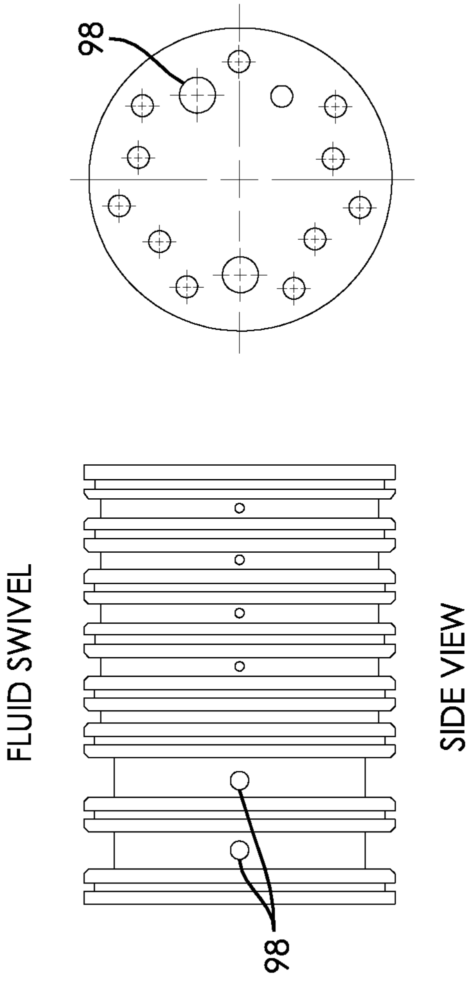
FIG. 21 Illustrates side view of fluid swivel core with lands and grooves and end view of fluid swivel core with threaded fluid ports.

Boom support swivel plate includes machine central fluid swivel 151*a* (see also FIG. 17). Machine central fluid swivel 151*a* (see also FIG. 17) enables hydraulic fluid circuits 98 from power unit 103 (see FIG. 5) laterally (see also FIG. 15, FIG. 16, FIG. 17, FIG. 19) through boom support plate 120 to independently rotatable boom apparatus 123 enabling, but not limited to, hydraulically operated actuators 110*a*, 118*a*, 112, 113*a*, 116*b*, 117, 111 & etc. (see FIG. 4). Machine central fluid swivel 151*a* enables hydraulic fluid circuits from power unit 103 (see FIG. 5A) vertically through boom support plate 120 to front chassis 135 enabling tiltable manual quick attach for multiple hydraulic/non-hydraulic attachments including but not limited to brush mower, grading blade, road sweeper, motorized auger, compactor, material handling bucket, brush grapple, mulcher, chipper, stump grinder, and fork lift attachment; and enabling 2-speed hydraulic wheel final drive 153 and enabling hydraulic rotary actuator steering device 129 and enabling hydraulically actuated dump body lift mechanism 146 (see FIG. 3) and enabling hydraulically operated dump actuator 144(see FIG. 3) and enabling, but not limited to, dump rotation actuator 150(see FIG. 3).

Figure 6:
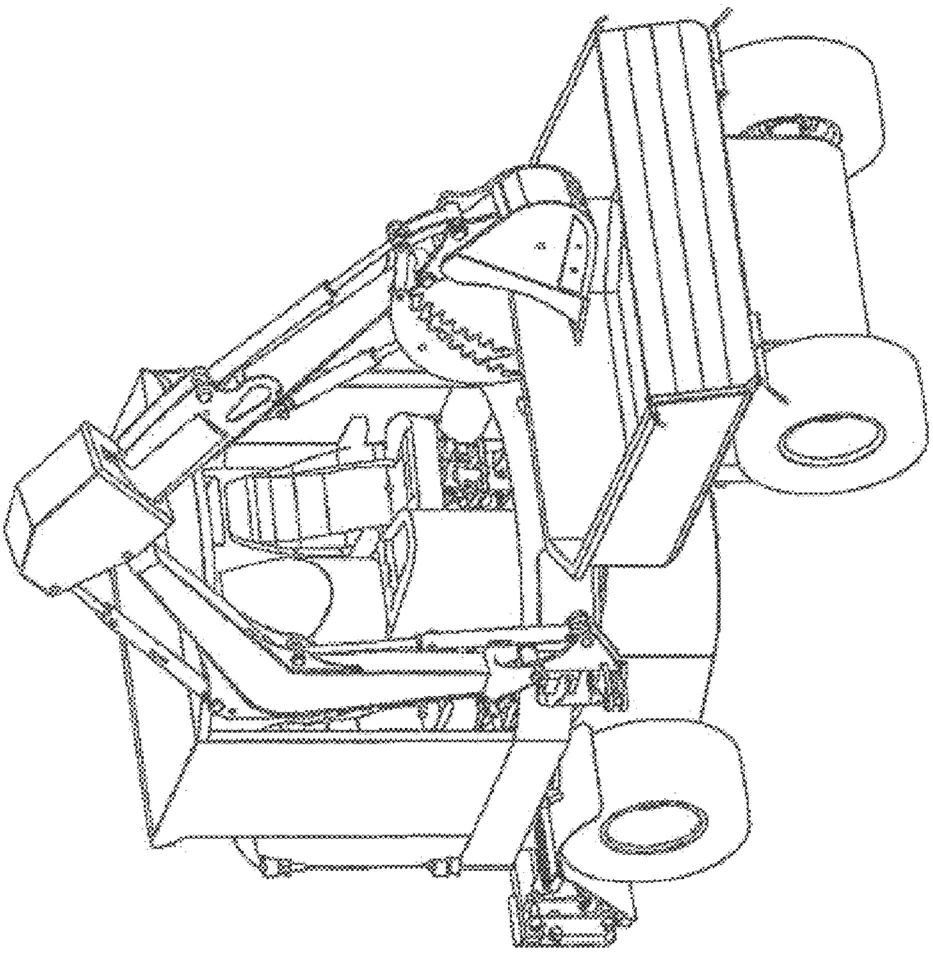
FIG. 6 Illustrates a sinistral posterior isometric view of loading position.
Figure 7:
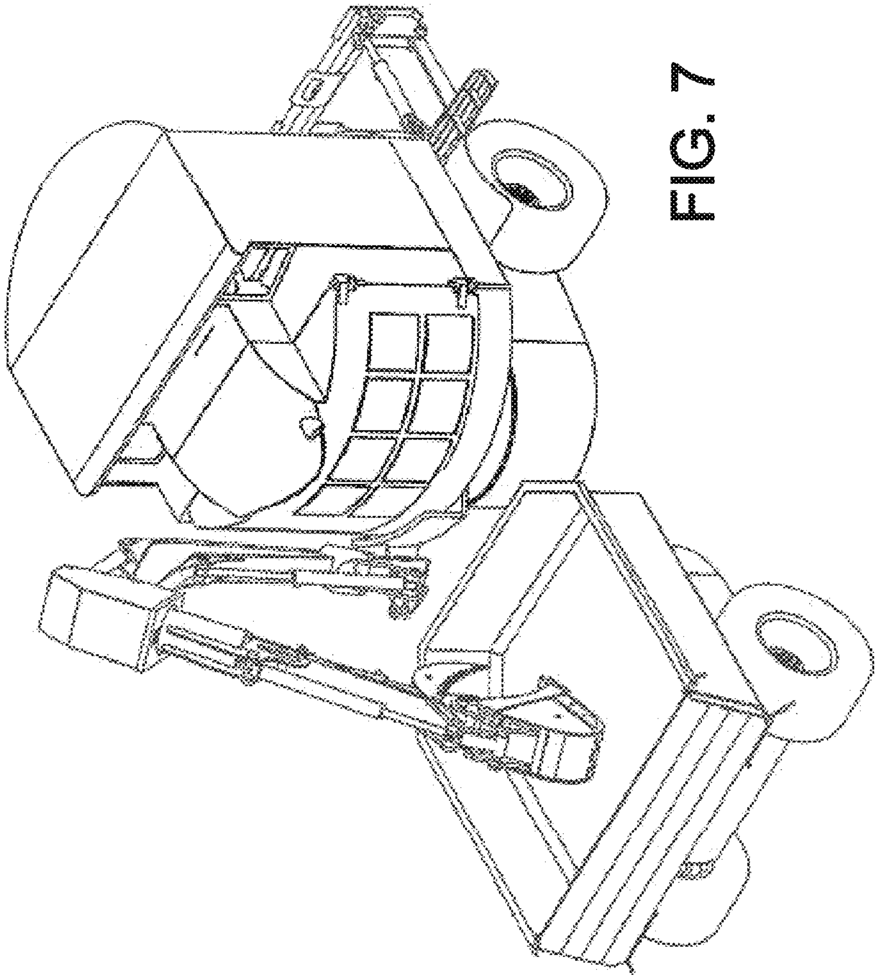
FIG. 7 Illustrates a dextral posterior isometric view of travel position.
Figure 8:
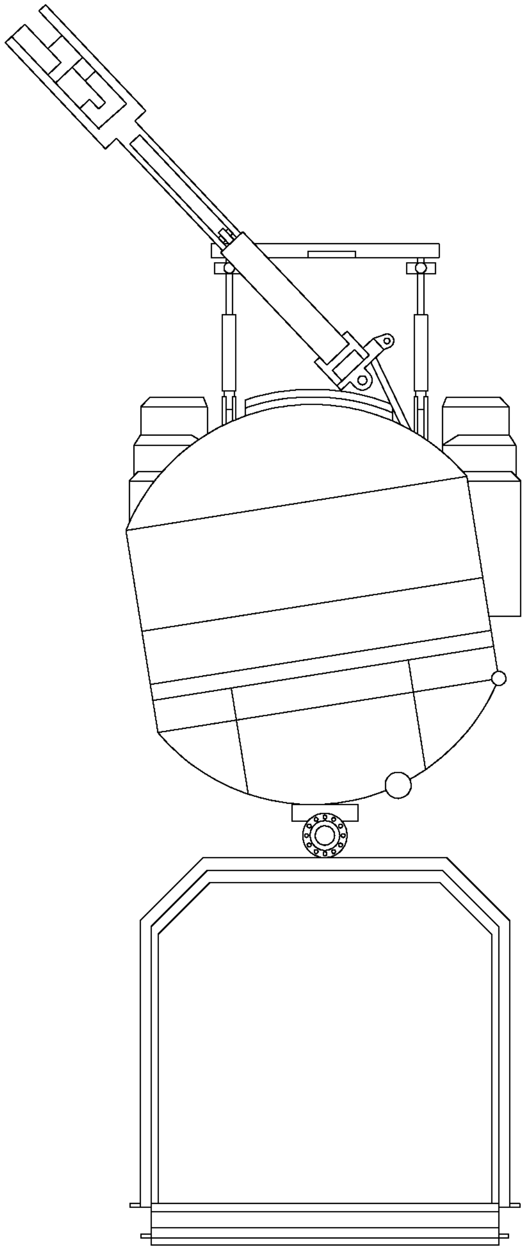
FIG. 8 Illustrates a top view of machine with power unit compartment secured.
Figure 9:
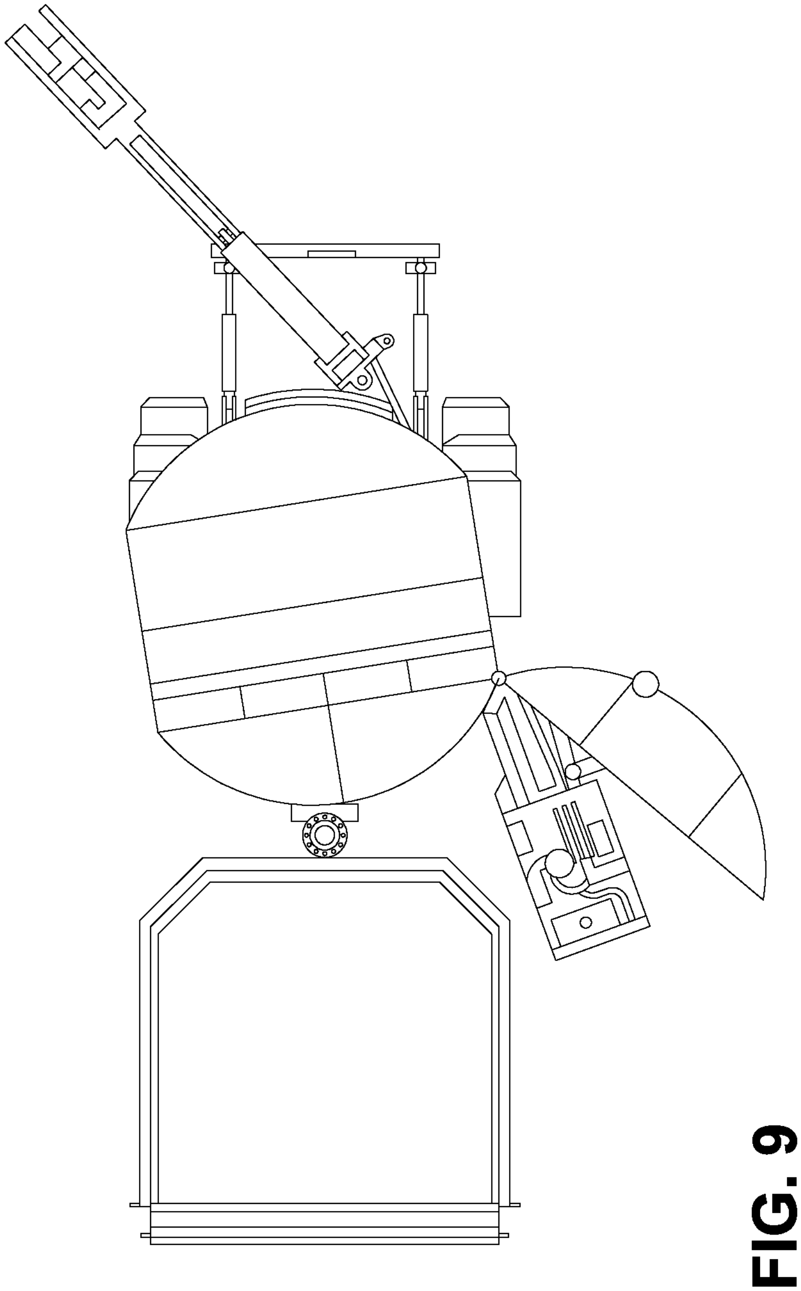
FIG. 9 Illustrates a top view of machine with power unit rotated out for accessibility.

Independently rotatable boom apparatus includes boom hinge 11 Ob and boom hinge actuator 11 Oc (see FIG. 13) boom hinge 11 Ob enables lateral positioning of boom 110 on a vertical axis perpendicular or parallel to boom 110 (dependent on position of boom actuator 110*a*) to facilitate angles of excavation, loading of materials onto dump body 125 (see FIG. 6) and storage of boom for travel (see FIG. 7) and positioning of hydraulic remote quick attach 117 for multiple types of hydraulic/non-hydraulic attachments 111 (& 188 etc.) (see FIG. 1).

Independently rotatable boom apparatus 123 includes boom 110 and hydraulic remotely operated boom actuator 11 Oa. Boom actuator 11 Oa actuates boom 110 enabling reciprocal vertical limited angle flexion on a horizontal axis boom hinge-pin 11 Od installed perpendicular to boom 110. Boom enables reciprocal vertical actuation of boom stick rotator 112, boom stick 118, hydraulic remotely operated quick attach for multiple attachments 117 and, but not limited to, hydraulically operated forestry saw attachment 111 (& etc.), for excavation, loading, unloading, material and tool placement.

Independently rotatable boom apparatus includes hydraulic remotely operated boom stick rotator 112 enabling continuous unlimited bi-directional rotation of boom stick 118, hydraulic remotely operated quick attach for multiple attachments 117 and, but not limited to, hydraulically operated forestry saw attachment 111 (& etc.). Bi-directional rotation facilitates loading, unloading, positioning for excavation, and multiple tool positioning for operation of multiple procedures with multiple hydraulic/non-hydraulic tool attachments (111 & etc.).

Independently rotatable boom apparatus 123 includes boom stick 118. Boom stick 118 is actuated vertically on a horizontal axis 118*b* (see FIG. 4) perpendicular to boom 110 by hydraulic remotely operated boom stick actuator 118*a* (see FIG. 4) enabling bi-directional flexion on a horizontal axis 118*b* (see FIG. 4) perpendicular to boom 110 (see FIG. 4) facilitating loading, unloading, positioning for excavation, and multiple tool positioning for execution of multiple procedures with multiple hydraulic/non-hydraulic tool attachments.

Independently rotatable boom apparatus includes hydraulic remotely operated quick attach 117 for multiple types of hydraulic/non-hydraulic attachments 111 (& etc.). Hydraulic remotely operated quick attach for multiple types of attachments facilitates rapid remote attachment/detachment of non-hydraulic tool attachments and rapid Attachment/detachment of hydraulic tool attachments 111 (& etc.).

Independently rotatable boom apparatus includes thumb 116 to facilitate gripping, but not limited to, for lifting or breaking objects. Thumb 116 is actuated by hydraulic remotely operated thumb actuator 116*b*.

Figure 5:
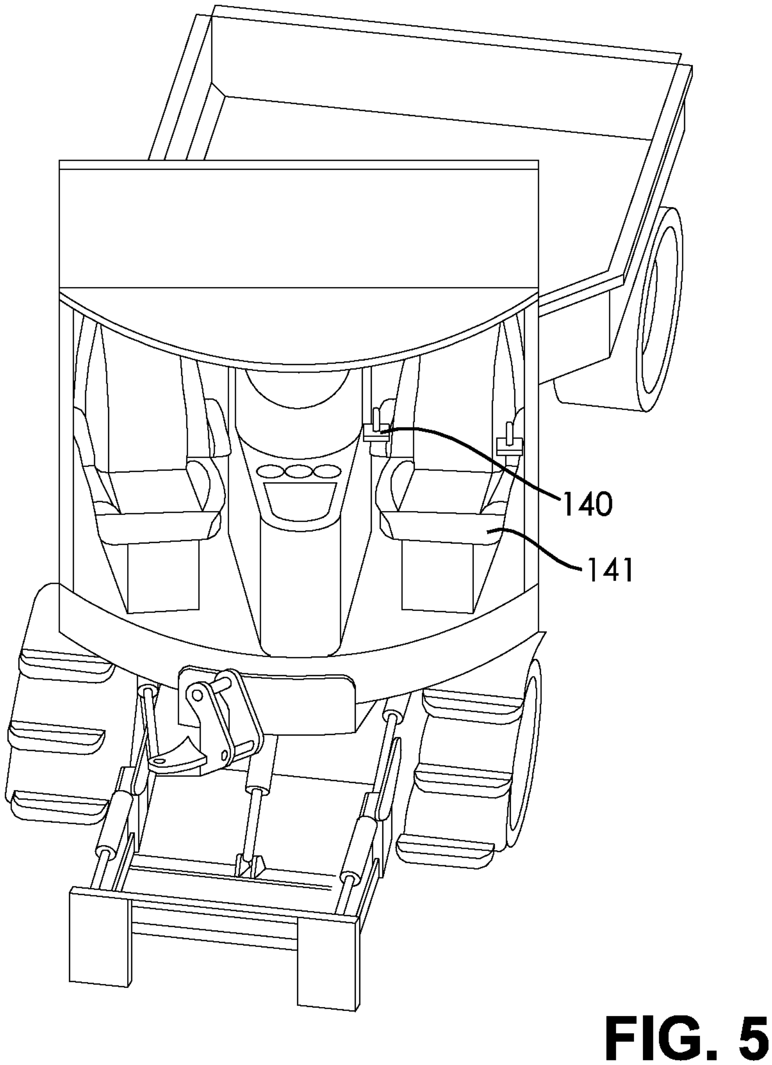
FIG. 5 Illustrates an anterior isometric view of machine cabin interior.
Figure 5A:
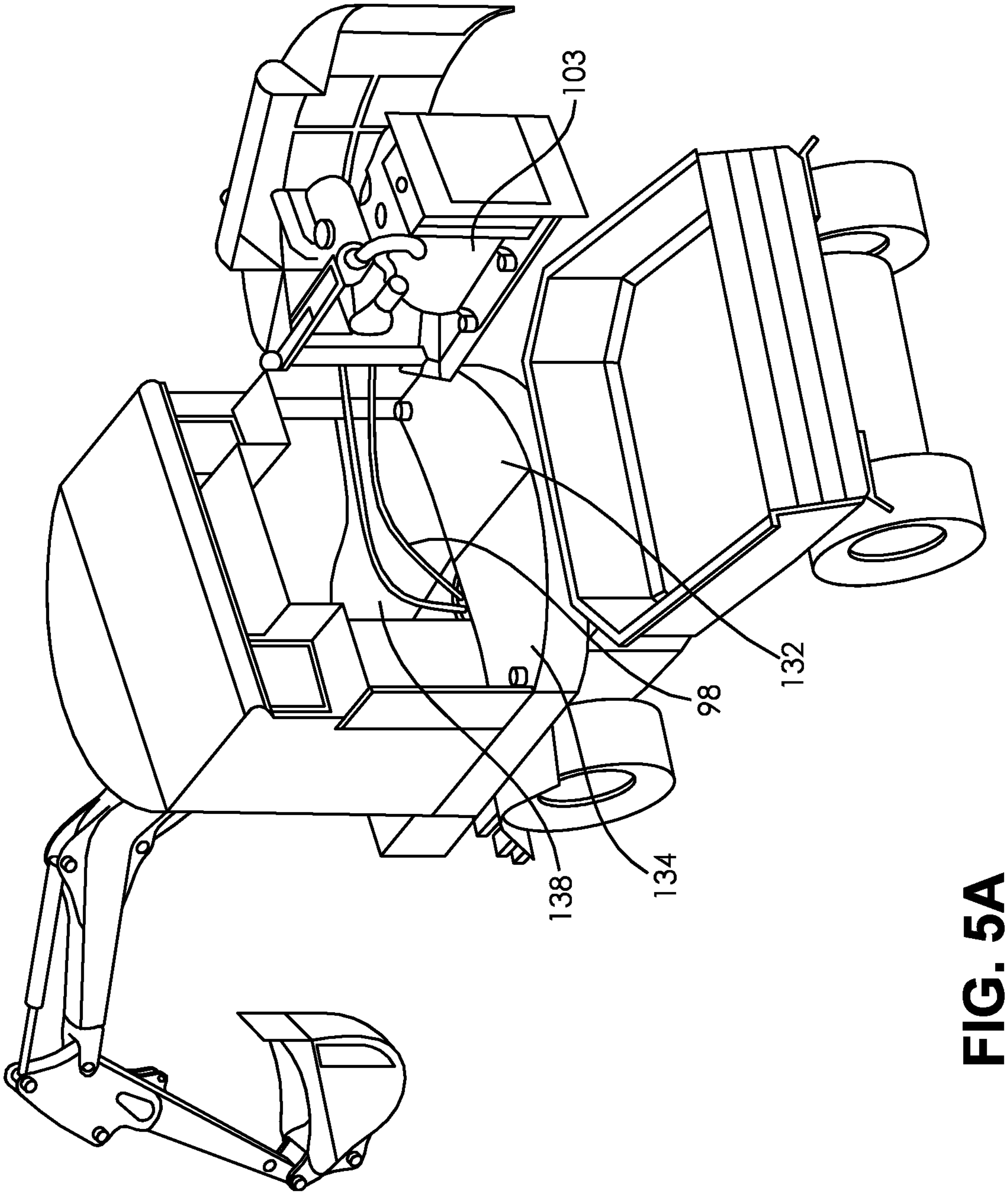
FIG. 5A Illustrates a sinistral posterior isometric view of open power unit compartment.

FIG. 5 Independently rotatable 1 or more man operator cabin 108 (see FIG. 1) includes two adjustable air-ride operator seats 141.

Independently rotatable 1 or more man operator cabin 108 (see FIG. 1) includes two polycarbonate resin thermoplastic operator/passenger doors 107 (see FIG. 1).

Independently rotatable 1 or more man operator cabin 108 (see FIG. 1) includes operator joy-stick machine controls 140.

Independently rotatable 1 or more man operator cabin 108 (see FIG. 1) includes side window 105 (see FIG. 1) . Independently rotatable 1 or more man operator cabin 108 (see FIG. 1) includes power unit compartment 138 (see FIG. Sa).

Independently rotatable 1 or more man operator cabin 108 (see FIG. 1) includes power unit 103 (see FIG. Sa).

Independently rotatable 1 or more man operator cabin 108 (see FIG. 1) includes fuel storage tank 134 (see FIG. Sa). Independently rotatable 1 or more man operator cabin includes hydraulic fluid storage tank 132 (see FIG. Sa).

Independently rotatable 1 or more man operator cabin 108 (see FIG. 1) includes hydraulic fluid circuits 98 (see FIG. Sa).

Independently rotatable 1 or more man operator cabin 108 (see FIG. 1) includes cabin rotation pinion gear actuator 97 (see FIG. 4) attached vertically through base of independently rotatable 1 or more man operator cabin 108 (see FIG. 1) engaged in cabin rotation gear 99 (see FIG. 4) bolted to boom plate 120 (see FIG. 4).

An object of the present application is to provide a forestry management machine 109 (see FIG. 1) for processing residual fallen trees and tree tops into useful logs, firewood and burnable waste; a machine 109 (see FIG. 1) that provides the ability from the climate-controlled safety of the 2-man operator cabin 108 (see FIG. 1) to process the above-named. An object of this machine 109 (see FIG. 1) is to enable elderly and/or disabled to safely and comfortably perform outdoor property maintenance and landscaping tasks not normally possible for elderly and/or disabled.

Figure 10:
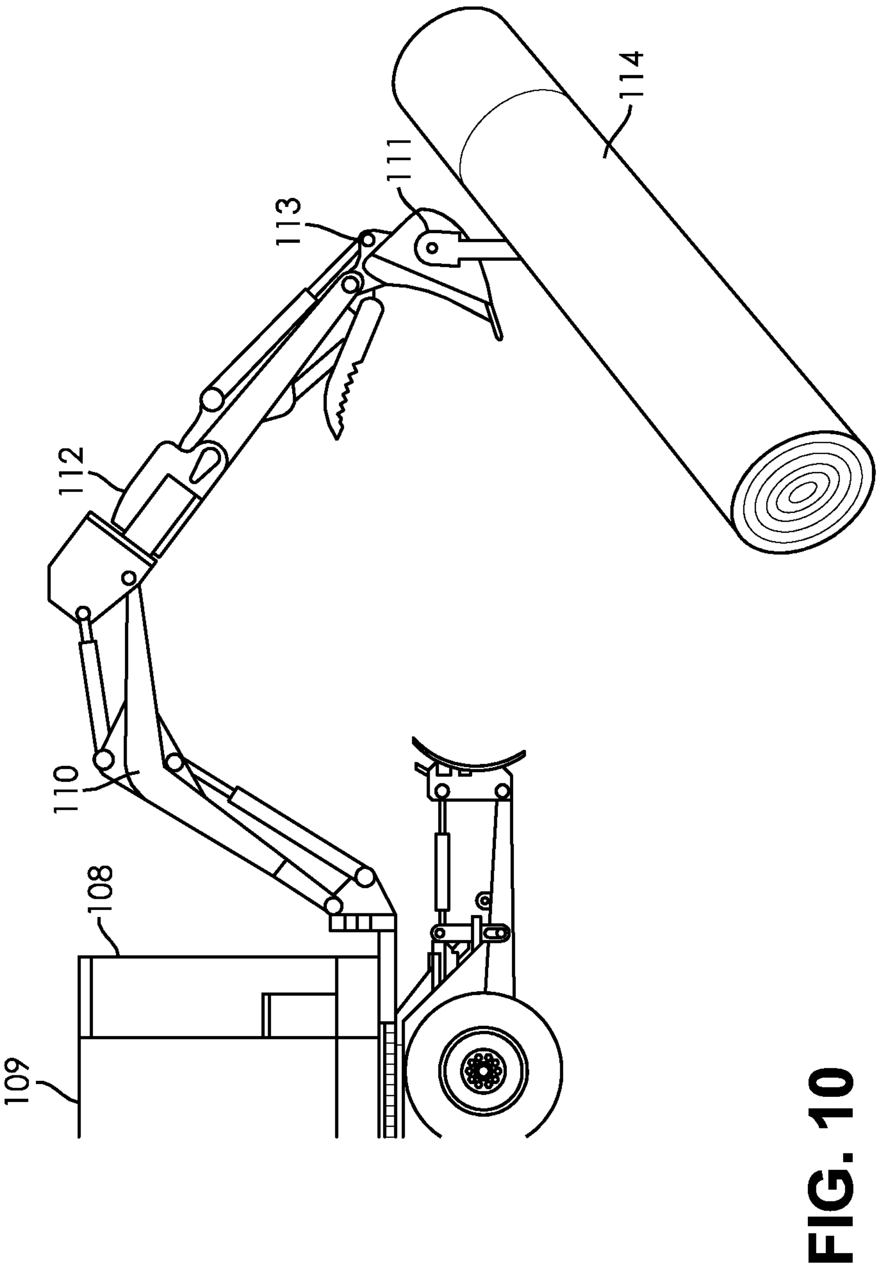
FIG. 10 Illustrates a side view of boom with the hydraulic forestry saw operative.
Figure 11:
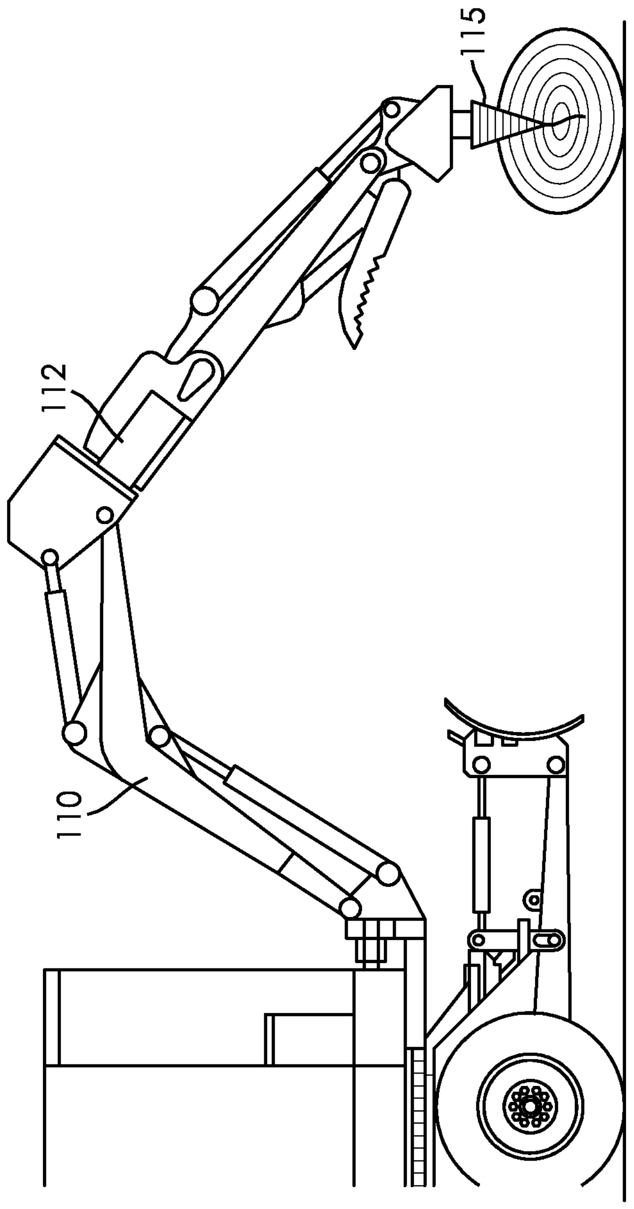
FIG. 11 Illustrates a side view of boom with screw-type wood splitter operative.
Figure 12:
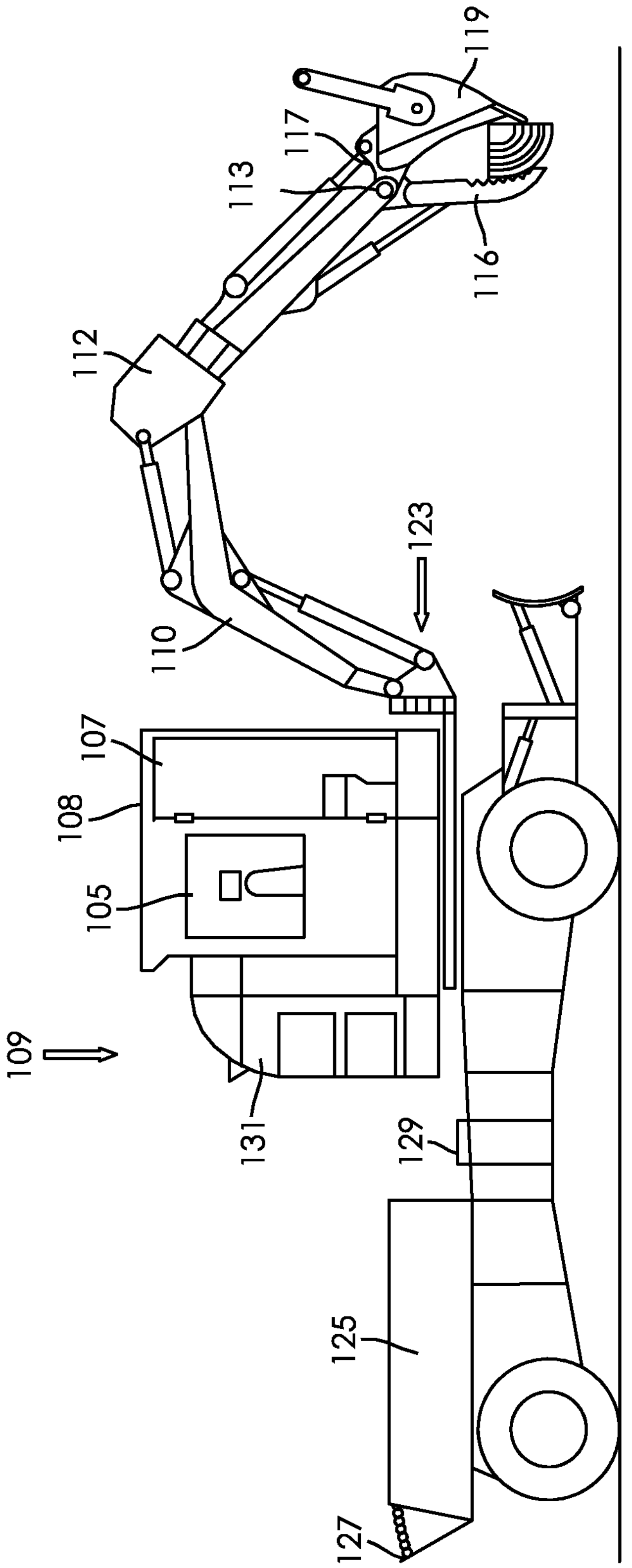
FIG. 12 Illustrates a side view of a machine gripping wood for loading.

FIG. 10 Illustrates a side view of the machine boom 11 0 with a hydraulically operated forestry saw attachment 111 cutting a log 114. The boom stick rotator 112 and the bucket curl function 113 enable rotary and lateral positioning respectively of (but not limited to) the hydraulically operated forestry saw attachment 111.

The present disclosure provides a machine 200 for handling material, for example, in the fields of forestry management and agriculture. The machine 200 can include a front chassis 202, a rear chassis 204, a power swivel system 206, a cabin 208, and a boom apparatus 210, as shown generally in FIGS. 22-28C. The machine 200 can process a fallen tree and tree tops into logs and firewood, perform forestry management operations, and handle various materials like stone, agricultural products, and aggregates. The machine 200 enables comfortable operation, making the machine 200 beneficial for elderly or disabled individuals who would otherwise find it challenging to perform outdoor property maintenance and landscaping tasks. The machine 200 can move, lift, transport, and precisely place various materials while allowing an operator to remain in a protected environment.

Figure 22:
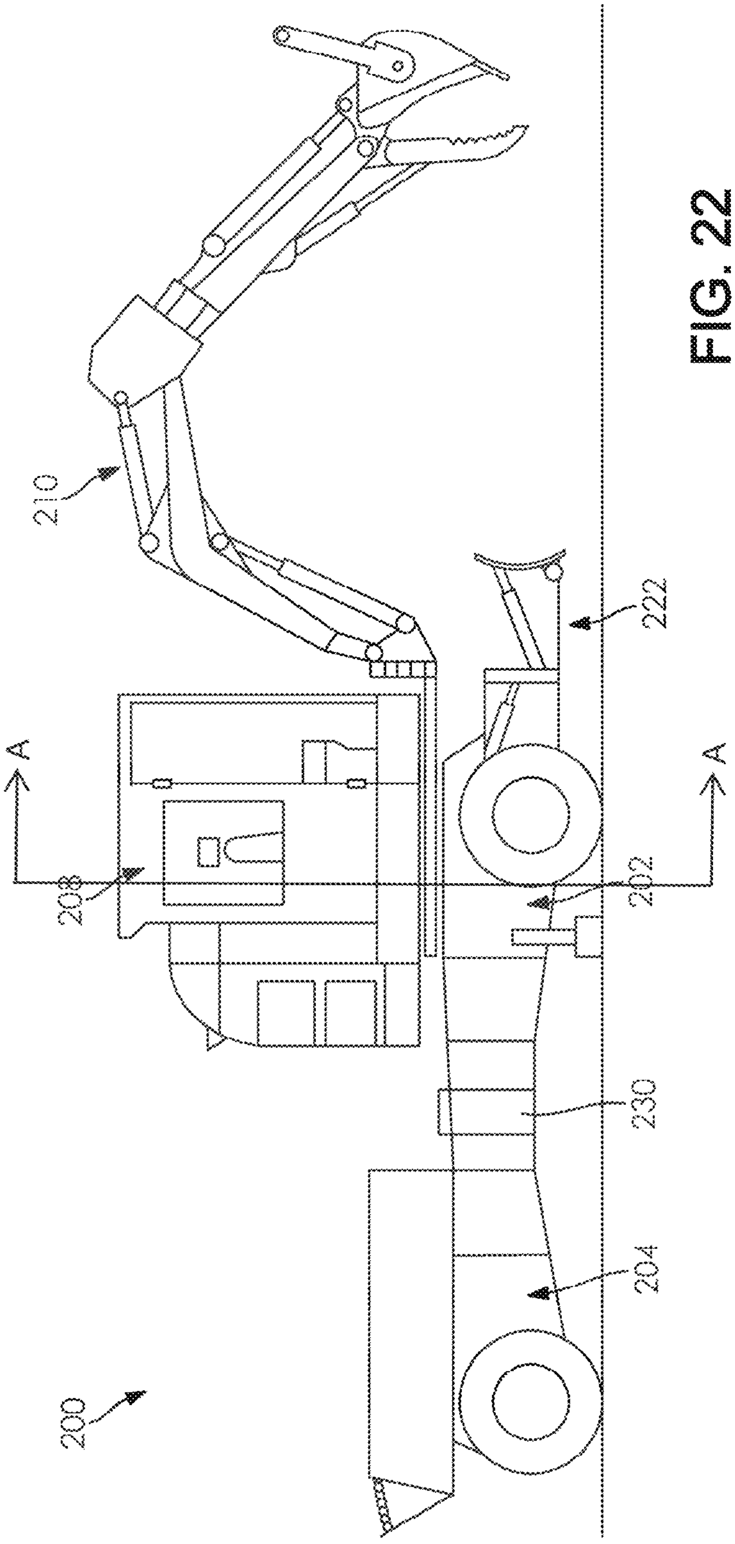
FIG. 22 is a side elevational view of an articulated machine including a front chassis, a rear chassis, a cabin, and a boom apparatus.
Figure 23:
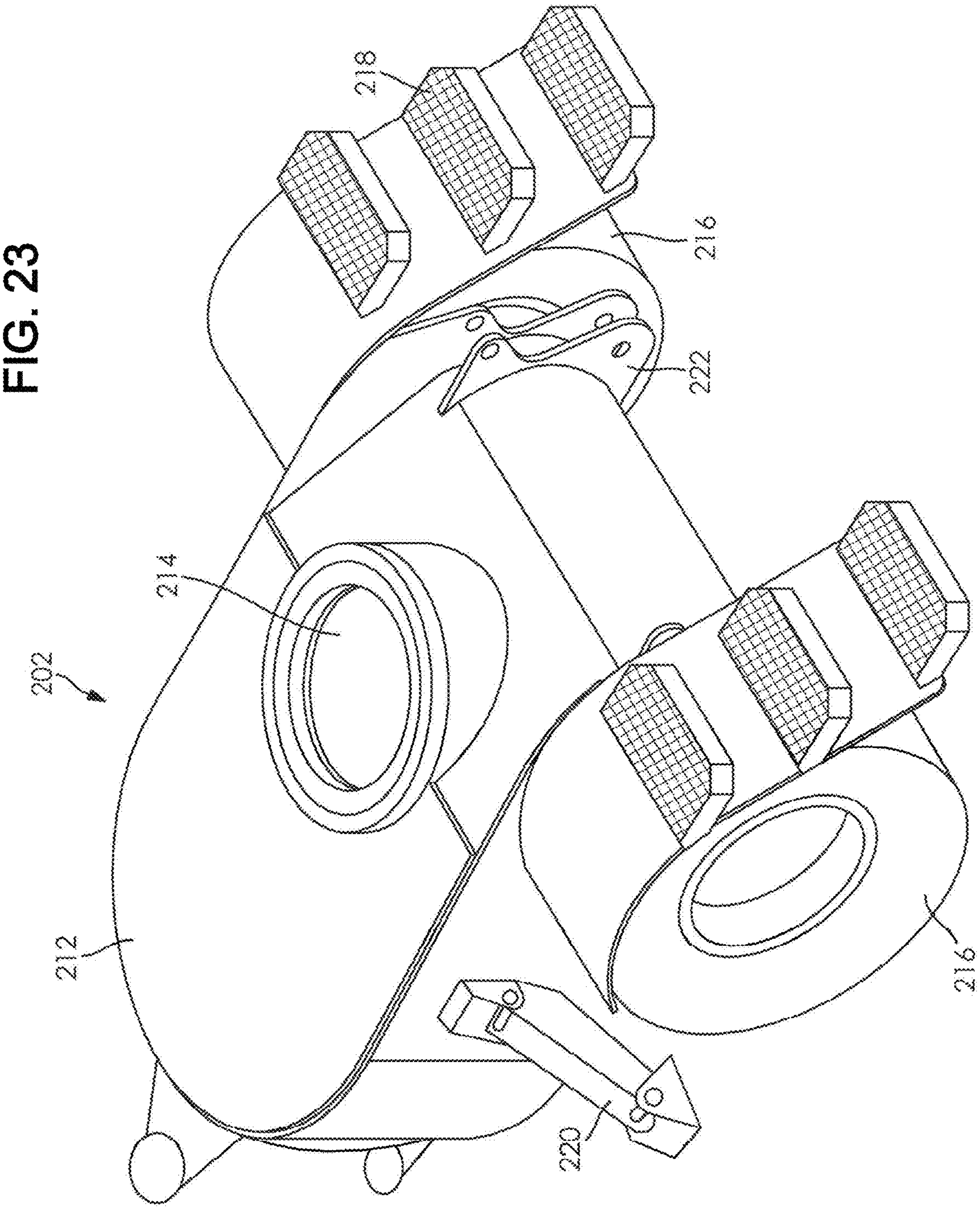
FIG. 23 is a top perspective view of the front chassis of the articulated machine.

As shown in FIGS. 22-23, the machine 200 can include the front chassis 202. The front chassis 202 can serve as a central hub for the machine 200 with other components of the machine 200, such as the rear chassis 204, the power swivel system 206, the cabin 208, and the boom apparatus 210, being coupled to the front chassis 202. To facilitate the coupling of the various components, the front chassis 202 can include a front chassis housing 212. The front chassis housing 212 can be constructed from a durable industrial-grade material, such as high-strength steel, an aluminum alloy, or a reinforced composite to provide the necessary structural integrity for heavy-duty application. A skilled artisan can select a suitable material for the front chassis housing 212 within the present disclosure. The front chassis housing 212 can be a unitary body formed using water-jet cutting, press-forming, and welded joints to create a robust frame, for example.

Figure 27:
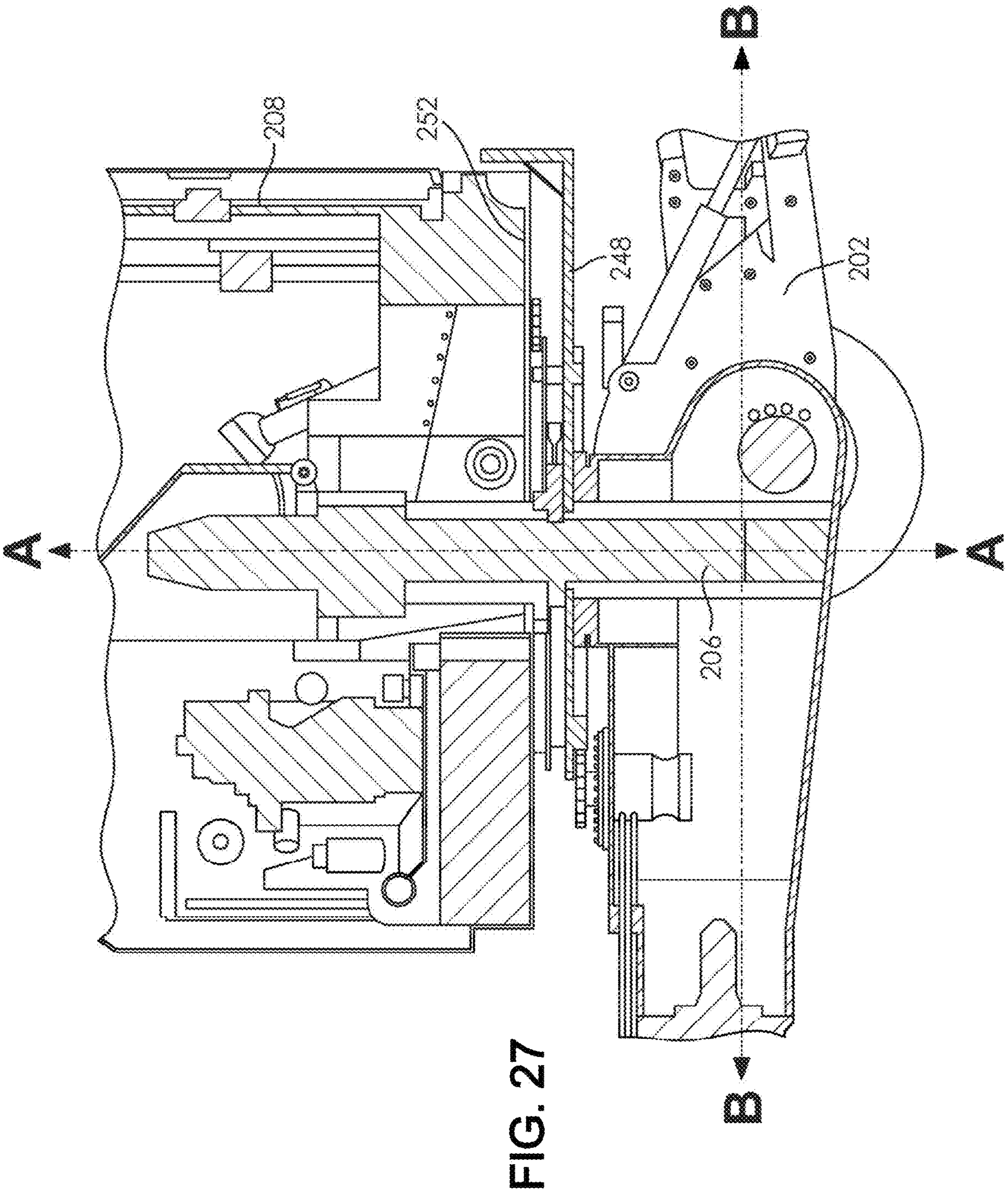
FIG. 27 is a side elevational, cross-sectional view taken at A—A of FIG. 22A depicting a power swivel system of the articulated machine.

The front chassis housing 212 can include a hollow interior for providing space for component storage, mechanical systems, and operational equipment. The front chassis housing 212 can include an access point 213 and/or an opening 214 to allow for maintenance access and integration of various mechanical systems. As shown in FIG. 27, the opening 214 can receive the power swivel system 206, as described herein. The access point 213 can be disposed at a location on the front chassis 202 to permit entry into the front chassis housing 212.

The front chassis housing 212 can include a wheel 216, and in certain embodiments, more than one wheel 216 coupled to the front chassis housing 212. As shown in FIG. 23, two wheels 216 can be coupled to the front chassis housing 212 opposite one another to facilitate movement of the machine 200. Each wheel 216 can include various configurations such as standard wheels, tracked systems, or specialized traction solutions depending on the intended application and terrain requirements. The front chassis housing 212 can include a fender mounted to the front chassis housing 212 above the wheel 216. Advantageously, the fender can protect the wheel 216 in operation and militate against the wheel 216 being punctured.

With continued reference to FIG. 23, the front chassis housing 212 can include one or more steps 218 to facilitate entry into the cabin 208. In certain embodiments, the steps 218 can include serrated treads to provide secure footing during entry and exit of the cabin 208. The step 218 can be positioned approximately 12 inches above ground level and can be mounted above the wheel 216 on the fender. The placement of the step 218 on the fender can create an ergonomic access point that enables operators to mount and dismount the machine 200 during industrial operations.

In certain embodiments, the front chassis housing 212 can include an outrigger 220. The outrigger 220 can be hydraulically actuated and can be affixed to a sidewall positioned behind the wheel 216. The outrigger 220 can be deployed to provide additional stability during machine operations. Specifically, the outrigger 220 can provide stability and support during stationary operation, particularly where the machine 200 is performing tasks that could affect balance or require enhanced ground contact for operational effectiveness.

In certain embodiments, the front chassis housing 212 can include a tool connector 222 coupled to the sidewall of the front chassis 202, as shown in FIGS. 22-23. The tool connector 222 can couple the front chassis 202 to a hydraulic/non-hydraulic attachment, such as a brush mower, a grading blade, a road sweeper, a motorized auger, a compactor, a material handling bucket, a brush grapple, a mulcher, a chipper, a stump grinder, and a fork lift attachment. A skilled artisan can select a suitable tool for coupling via the tool connector within the scope of the present disclosure.

Figure 24:
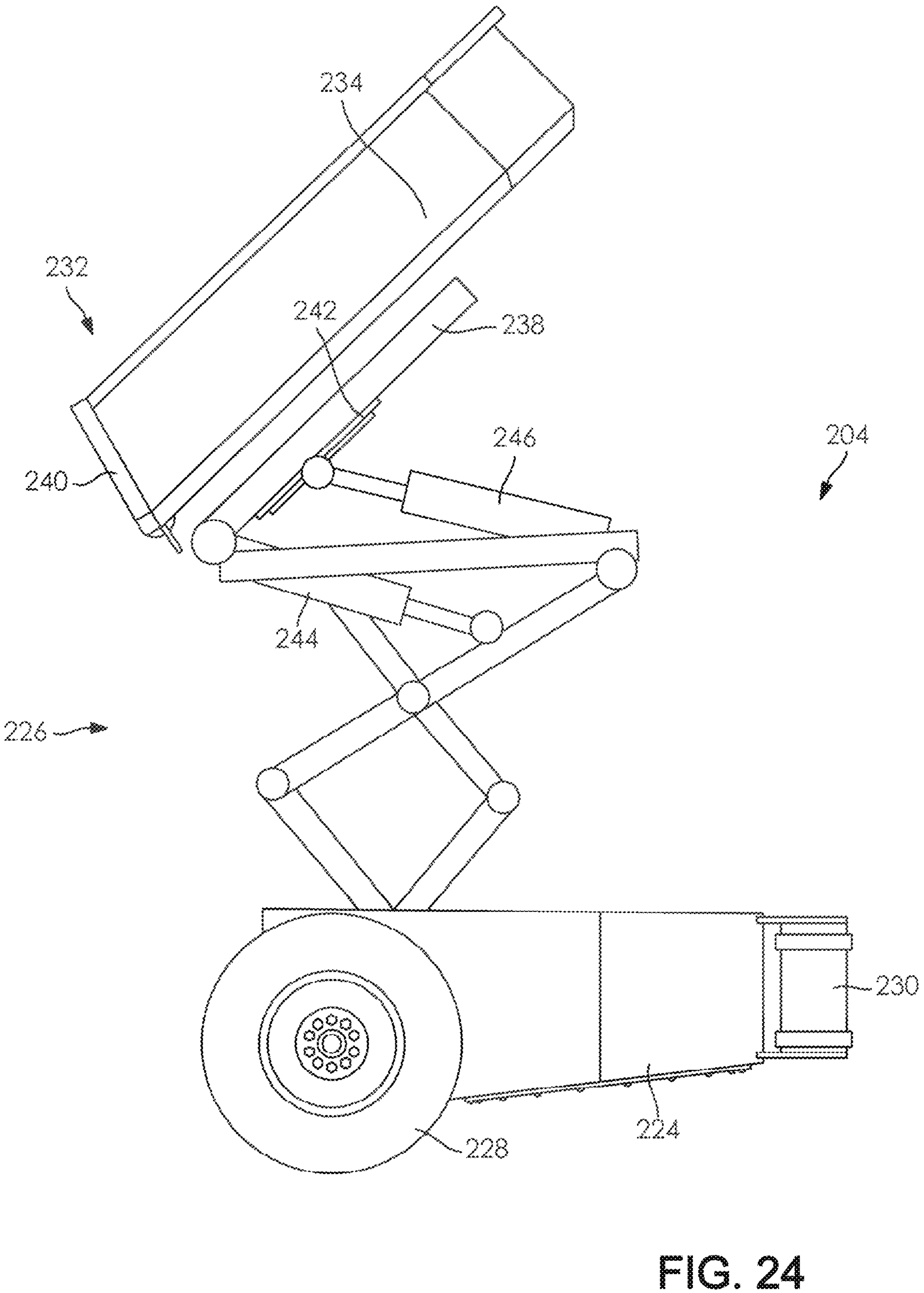
FIG. 24 is a side elevational view of the rear chassis including a lift mechanism and a dump system.

With reference to FIGS. 22 and 24, the rear chassis 204 can include a rear chassis housing 224. The rear chassis housing 224 can be constructed from a durable industrial-grade material, such as high-strength steel, an aluminum alloy, or a reinforced composite to provide the necessary structural integrity for heavy-duty application. A skilled artisan can select a suitable material for the rear chassis housing 224. The rear chassis housing 224 can be a unitary body formed using water-jet cutting, press-forming, and welded joints to create a robust frame, for example.

The rear chassis housing 224 can include a hollow interior for providing space for component storage, mechanical systems, and operational equipment. The rear chassis housing 224 can include an access point 225 or access panel to allow for maintenance access and integration of various mechanical systems. In certain embodiments, the rear chassis housing 224 can store various components of a lift mechanism 226, as described herein.

The rear chassis housing 224 can include one or more wheels 228, and in certain embodiments, a pair of wheels 228 coupled to the rear chassis housing 224. The wheels 228 can be coupled to the rear chassis housing 224 opposite one another to facilitate movement of the machine 200. Each wheel 228 can include various configurations such as standard wheels, tracked systems, or specialized traction solutions depending on the intended application and terrain requirements.

As shown in FIG. 22, the rear chassis 204 can be coupled to the front chassis 202 by the rotary actuator steering device. An example of the rotary actuator steering device can include a rear chassis actuator 230. The rear chassis actuator 230 can facilitate vertical axis movement of the rear chassis 204 relative to the front chassis 202. The rear chassis actuator 230 can include a horizontal axis flexion steering actuator that allows for the rear chassis 204 to move in a horizontal axis flexion direction relative to the front chassis 202 to maintain drive traction when traversing rough terrain. For example, the rear chassis 204 can move left or right relative to the front chassis 202. The rear chassis actuator 230 can permit for the rear chassis 204 to maintain and gain traction on rough or uneven terrain. For example, the rear chassis actuator 230 can allow for up to about 20 degrees of flexion on each side of vertical from the front chassis 202 and rear chassis 204. The range of motion can help maintain stability while allowing sufficient articulation for navigating challenging terrain conditions. In certain embodiments, the rear chassis actuator 230 can be locked by the user.

With reference to FIG. 24, the rear chassis 204 can include a dump system 232. The dump system 232 can include a dump body 234 coupled to the lift mechanism 226. The dump body 234 can be coupled to the lift mechanism 226 via a lift plate 238. The dump body 234 can allow for versatile material handling and can be configured for storing, transporting, and holding various materials including cut stone, logs, firewood, pallets, crushed stone aggregate, and topsoil in use. The dump body 234 can include a hinged tailgate 240 for loading and unloading the dump body 234. In certain embodiments, the hinged tailgate 240 can be remotely actuated by the operator.

A bottom of the dump body 234 can be affixed to the lift plate 238 via a dump rotation actuator 242. The dump rotation actuator 242 can allow for the rotation of the dump body 234 on the lift mechanism 226. In this way, the dump body 234 can rotate independently from the rear chassis housing 224 such that in operation, the rear chassis 204 can remain in place and the dump body 234 can be spun to allow for the operator to use the hinged tailgate 240 to dump the contents of the dump body 234 at any location about the rear chassis 204. The dump rotation actuator 242 can allow for extensive range of motion, for example, up to about 100 degrees on each side of a normal rest position, providing a total rotation capability of about 200 degrees. In certain embodiments, the dump rotation actuation 242 can permit for unlimited and/or continuous range of rotation, for example, up to about unlimited degrees). A skilled artisan can select a suitable range of motion for the dump rotation actuator 242 within the scope of the present disclosure.

The lift mechanism 226 can enable movement of the dump body 234 relative to the rear chassis 204 via a lift actuator 244. The lift actuator 244 can be hingedly coupled to the lift plate 238 and/or the dump rotation actuator 242. The operator can use the lift mechanism 226 and lift actuator 244 to move the dump body 234 between a resting position and a raised position such that the dump body 234 is raised and lowered during operation. The lift mechanism 226 can elevate the dump body 234 to about 48 inches above the resting position on the rear chassis 204, for example. A skilled artisan can select a suitable distance between the resting position and the raised position.

With continued reference to FIG. 24, the lift mechanism 226 can include one or more dump actuator 246 hingedly affixed to the lift plate 238. The dump actuator 246 can facilitate a tilting movement of the dump body relative to the rear chassis housing 224 by tilting the dump body 234 upward. It should be appreciated that the dump body 234 can move at the point where the lift actuator 244 is hingedly coupled to the dump body 234 allowing for movement of the dump body 234 relative to the connection point. In operation, the dump actuator 246 can push a substantially central point of the lift plate 238 upward relative to the rear chassis 204, the lift plate 238 can tilt at the connection point of the lift actuator 244, and the dump body 234 can be tilted with the lift plate 238.

Figure 25:
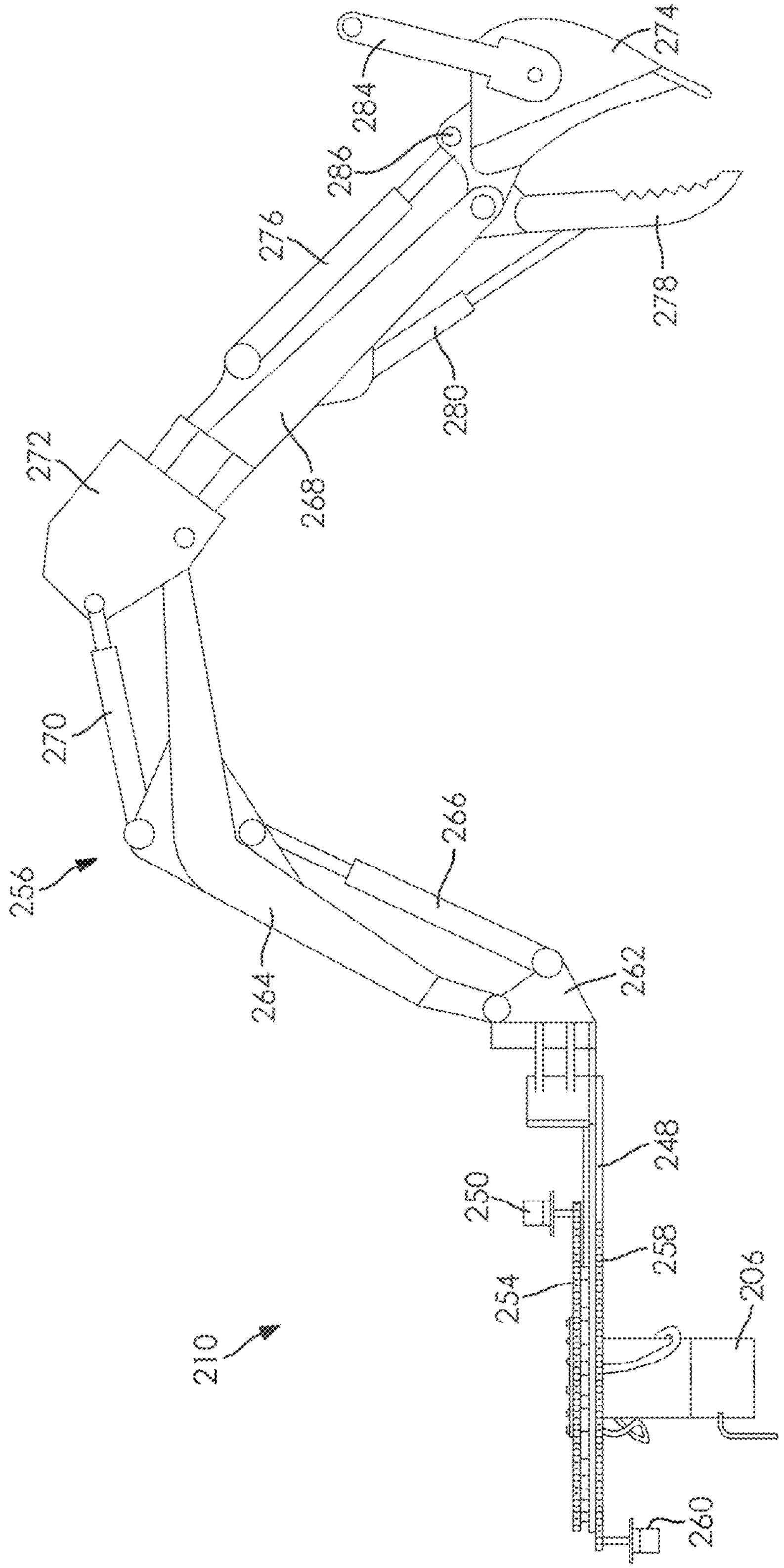
FIG. 25 is a side elevational view of the boom apparatus including a boom swivel plate and a boom arm assembly.
Figure 26:
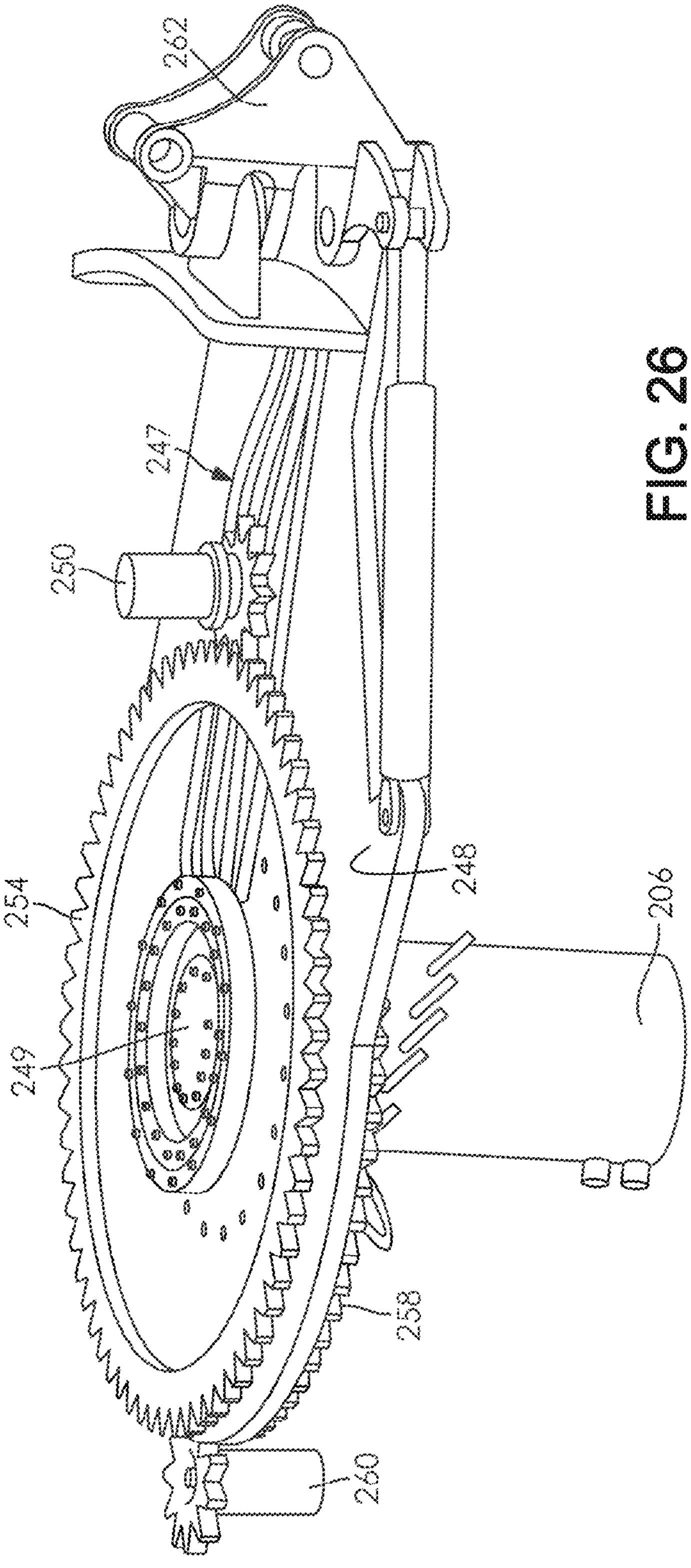
FIG. 26 is a top perspective view of the boom swivel plate.

Turning now to FIGS. 25-27, the power swivel system 206 can provide operational power to the entire machine 200 and can be disposed within the front chassis 202 through the opening 214. The power swivel system 206 can be disposed partially within the front chassis 202, with a portion that can extend into the cabin 208. The power swivel system 206 can have rotational axis (A) that can be disposed perpendicular to a longitudinal axis (B) of the front chassis 202. When the power swivel system 206 is disposed in the front chassis 202, the power swivel system 206 can be oriented such that the power swivel system 206 is disposed perpendicular to the front chassis 202 through the opening 214. The power swivel system 206 can be configured such that a portion of the power swivel system 206 can be disposed within the front chassis 202 while another portion can extend upwardly out of the opening 214 in the front chassis 202. The configuration can enable the power swivel system 206 to effectively interface with one or more components of the front chassis 202, the cabin 208, and/or the boom apparatus 210.

The power swivel system 206 can interact with the boom apparatus 210 through a boom support swivel plate. For example, the boom support swivel plate can include a boom swivel plate 248 that can include a fluid circuit 247 and a central fluid swivel 249 enabling hydraulic fluid circuits from the power swivel system 206. The power swivel system 206 can include one or more independent sections that can enable separate rotation capabilities therefore allowing the rear chassis 204, the cabin 208, and the boom apparatus 210 to rotate independently or synchronously relative to the front chassis 202. The independent rotation can be facilitated through a connection of the power swivel system 206 with a cabin rotation gear and a boom rotation mechanism, which can operate simultaneously in opposition to each other or in synchronous motion. The power swivel system 206 can also include a machine central fluid swivel that can enable hydraulic fluid circuit to flow through the boom swivel plate 248 to power various machine functions including, a hydraulically operated actuator, a tiltable manual quick attach mechanism, and a hydraulic attachment.

The power swivel system 206 can be implemented as a hydraulic power system, utilizing a hydraulic fluid circuit to power various machine functions and actuators throughout the machine 200. The power swivel system 206 can include a fluid swivel, a land, a groove, and a threaded fluid port to facilitate comprehensive power distribution. In certain embodiments, the power swivel system 206 can include an electric motor system that can provide rotary power through an electric actuator and motor, a pneumatic power swivel system that can utilize compressed air for power transmission and actuation, or a hybrid power swivel system that can combine multiple power sources such as hydraulic-electric or pneumatic-hydraulic combinations to optimize power delivery and operational efficiency for different machine functions.

Turning now to the cabin 208 shown in FIGS. 22 and 27, the cabin 208 can be disposed atop the boom swivel plate 248, which can be disposed atop the front chassis 202 adjacent to the power swivel system 206. The cabin 208 placement can enable optimal visibility for the operator while maintaining direct interface with the power swivel system 206 that is partially disposed within the front chassis 202. The positioning can allow for efficient power transmission through the power swivel system 206 while ensuring the cabin 208 remains securely mounted to the boom swivel plate 248 which is securely mounted to the front chassis 202 through the boom swivel plate 248. The placement of the cabin 208 can also facilitate effective integration with the boom swivel plate 248, which can be disposed between the front chassis 202 and the cabin 208, as shown in FIG. 27, enabling both structural support and rotational capability of the cabin 208 and the boom aparatus210 independently or synchronously relative to the front chassis 202.

As described herein, the cabin 208 can rotate continuously and without limitation about the rotational axis (A) of the power swivel system 206 due to the independent sections of the power swivel system 206 that are partially disposed within the cabin 208. The rotation capability can be facilitated through a cabin rotation actuator 250 that can be attached vertically through a base 252 of the cabin 208 and can engage with a cabin rotation gear 254 that can be affixed to the boom swivel plate 248. It should be appreciated that through the cabin rotation actuator 250 and cabin rotation gear 254, the cabin 208 can rotate synchronously with or in simultaneous opposition to the independently rotatable boom apparatus 210.

The cabin 208 can be configured as an operator cabin or team member cabin that houses an operator control for managing machine function. The operator control can include operator joy-stick machine control that enables operation of the various components of the machine 200, including movement of the machine 200 itself, cabin 208 rotation, rear chassis 204 positioning, lift mechanism 226 operation, dump body 234 manipulation, and boom apparatus 210 control. A skilled artisan can select other operational functions to be controlled via the operator control within the scope of the present disclosure. The cabin 208 can provide a climate-controlled environment for the operator and team member while performing various tasks including forestry management, outdoor property maintenance, and landscaping tasks.

It should be appreciated that the cabin 208 can include various structural and operational components for optimal functionality and operator comfort such as an operator door, an adjustable operator seat, a windshield, and climate control capabilities. For example, the operator door can include polycarbonate resin thermoplastic operator door for secure entry and exit. The cabin 208 can also include an adjustable spring suspension operator seat for ergonomic positioning, and a strategically placed side window for enhanced visibility. The cabin 208 can have a comprehensive power unit compartment that contains operations systems including the power swivel system 206, a fuel storage tank, and a hydraulic fluid storage tank. A hydraulic fluid circuit of the power swivel system 206 can be routed through the cabin, with a fluid circuit fitting enabling control of the hydraulic function of the machine 200. The cabin 208 can also include climate control capabilities to promote operator comfort while performing various operational tasks.

Figure 28A:
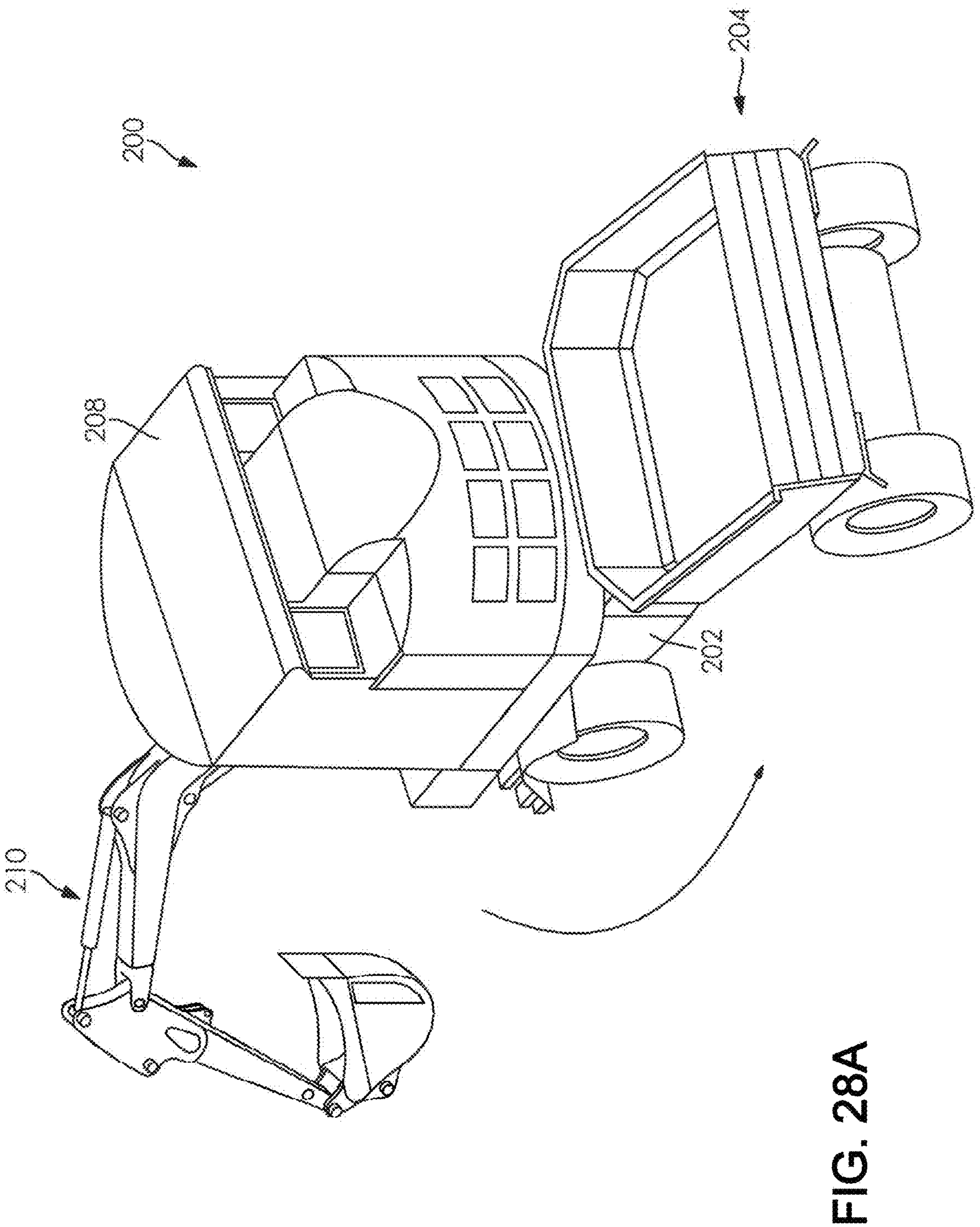
FIG. 28A is a rear, top perspective view of the articulated machine with the boom apparatus and the cabin positioned at a front of the articulated machine.

Turning now to FIGS. 25-26, the boom apparatus 210 can include the boom swivel plate 248 and a boom arm assembly 256 that work together to enable various material handling operations. The boom swivel plate 248 can enable unlimited continuous rotation of the boom arm assembly 256 through an undermounted gear 258 engaged to a boom rotation actuator 260. The power swivel system 206 can be coupled to and interact with the boom apparatus 210 through the boom swivel plate 248, which can couple the boom apparatus 210 to the front chassis 202 and can include a fluid circuit and a fluid swivel that enables a hydraulic fluid circuit to power various machine functions and actuators. The configuration can allow the boom arm assembly 256 to rotate continuously and without limitation about the rotational axis (A) of the power swivel system 206 and around the periphery of the machine 200. As illustrated in FIG. 28A, the boom arm assembly 256 can be positioned at the front of the machine 200 for loading operations, while FIG. 28B demonstrates how the boom arm assembly 256 can be moved or repositioned to the rear of the machine 200 adjacent to the dump body 234 for efficient material transfer. The rotational capability can enable the operator to collect materials from any position around the machine 200 and transfer the material to the dump body 234 located on the rear chassis 204, and/or collect materials from the dump body 234 and transfer the material to any position around the machine 100, enhancing operational flexibility and efficiency.

The boom arm assembly 256 can be coupled to the boom swivel plate 248 through a boom hinge 262 that provides a hinged contact point for both vertical and horizontal axis movement and operational flexibility. The boom arm assembly 256 can include multiple components working together in a coordinated system including a boom 264 that serves as the primary arm, a boom actuator 266 for controlled movement of the boom 264, a boom stick 268 for extended reach and positioning, a boom stick actuator 270 for control of the boom stick 268, a boom stick rotator 272 for synchronous rotational adjustment of bucket 274 and thumb 278, a bucket 274 for material handling, a bucket actuator 276 for scooping of the bucket 274, a thumb 278 for securing materials in the bucket 274, and a thumb actuator 280 for gripping control via the thumb 278. The components can be arranged and interconnected to enable comprehensive control and movement of the boom apparatus for various material handling operations including excavation, loading, and precise positioning tasks, for example.

The boom 264 can work in conjunction with the boom actuator 266 to enable controlled movement of the boom arm assembly 256 through a hydraulic system, as described herein. The boom actuator 266 can be hingedly coupled to both the boom hinge 262 and the boom 264, enabling reciprocal vertical limited angle flexion on a horizontal axis through a boom hinge-pin 282 that is disposed perpendicular to the boom 264. The configuration can allow for precise control of the vertical positioning of the boom 264 during operation, facilitating various tasks such as lifting, lowering, and maintaining specific operational angles. The boom actuator 266 can work with the boom 264 to enable multiple positioning capabilities, enhancing the versatility of the machine 200 in handling different types of materials and operational requirements.

The boom stick 268 can operate through the coordinated action of the boom stick actuator 270 and boom stick rotator 272, providing operational flexibility and precise control. The boom stick actuator 270 can enable vertical actuation of the boom stick 268 on a vertical axis perpendicular to the boom 264, while the boom stick rotator 272 can enable bi-directional rotation of the boom stick 268 for comprehensive positioning capabilities. The boom stick rotator 272 can be hingedly coupled between the boom 264 and boom stick 268, facilitating a wide range of operational movements including loading, unloading, excavation tasks, and precise material placement. The boom stick 268 and actuation system can allow for smooth transitions between different operational positions while maintaining stability and control throughout various material handling procedures.

The bucket 274 and thumb 278 can work together as coordinated components and can both be hingedly connected to the boom stick 268 to enable effective and versatile material handling operations. The bucket 274 can be actuated through the bucket actuator 276 that can be hingedly coupled between the boom stick 268 and the bucket 274, providing precise control over scooping and dumping operations. Similarly, the thumb 278 can be controlled via the thumb actuator 280 that can be hingedly coupled between the thumb 278 and boom stick 268, enabling detailed gripping adjustment. The configuration can allow the bucket 274 and the thumb 278 to work in tandem with the bucket 274 providing primary scooping or holding capability while the thumb 278 can move in opposition to secure the material against the bucket 274, creating a secure grip on various materials. Together, the bucket 274 and the thumb 278 can enable comprehensive material handling operations, including gripping, scooping, and transferring materials such as stones, logs, and other objects, while maintaining secure control throughout the entire operation. The coordinated movement between the bucket 274 and the thumb 278 can be useful in forestry management, agricultural applications, and general material handling tasks.

With reference to FIG. 25, the boom apparatus 210 can be equipped with an attachment 284 that can be coupled to the boom stick 268 through a quick attach. An example of a quick attach can include an attachment system 286. For example, the attachment 284 can include a hydraulically operated forestry saw for cutting a log, a screw-type wood splitter for processing firewood, a brush mower, a grading blade, a road sweeper, an auger, a compactor, a material handling bucket, a brush grapple, a mulcher, chipper, a stump grinder, and a fork lift attachment. A skilled artisan can select a suitable attachment 284 within the scope of the present disclosure. The attachment system 286 can facilitate rapid remote attachment and detachment of both hydraulic and non-hydraulic tools, providing operational flexibility. The versatility of the attachment 284 can enable the machine 200 to perform various tasks including forestry management, outdoor property maintenance, and landscaping tasks. The ability to quickly switch between different attachments can be particularly advantageous as it allows the machine 200 to adapt to different operational requirements without significant downtime, enabling the operator to comfortably perform multiple outdoor maintenance tasks that might not otherwise be possible.

Figure 28B:
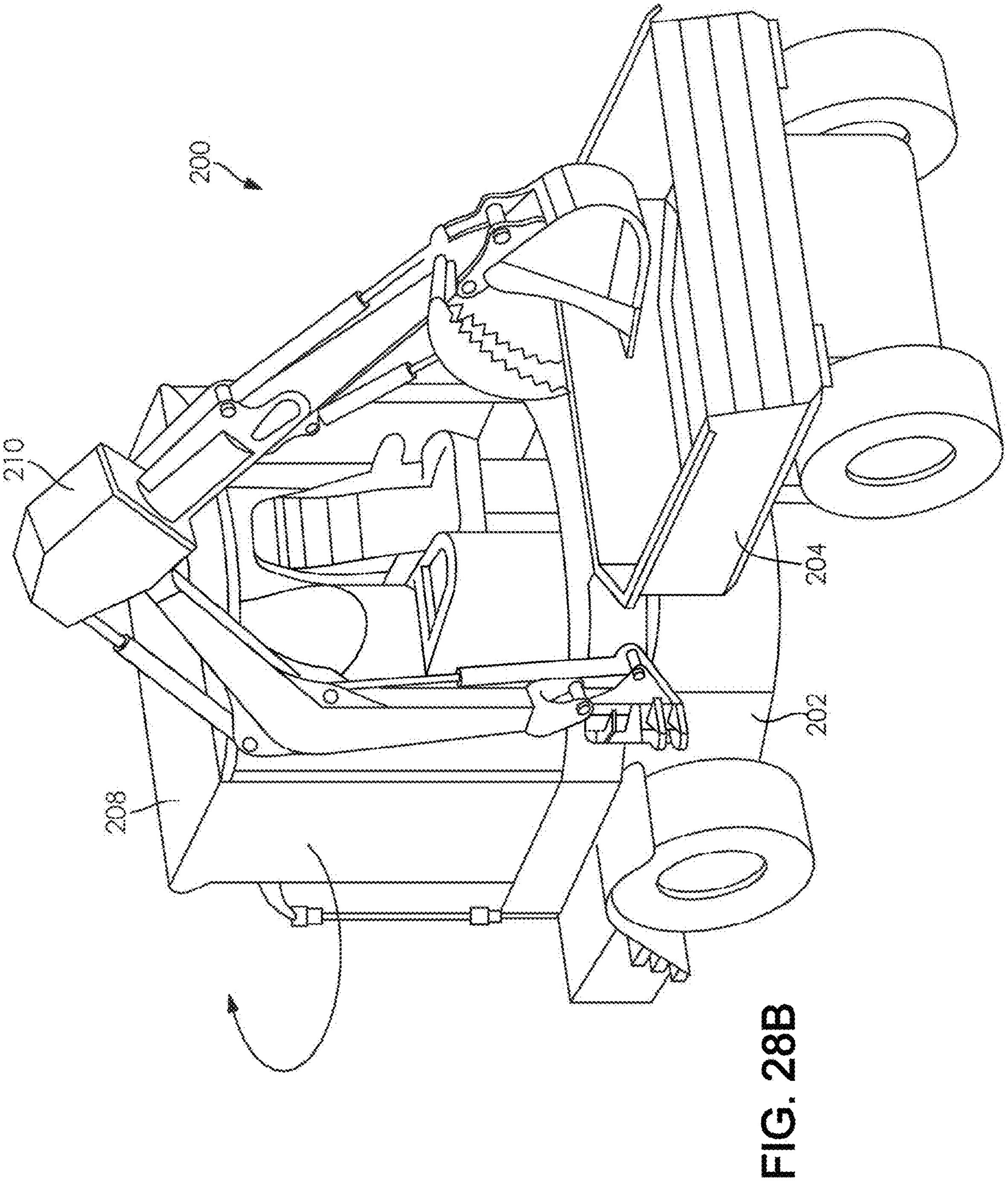
FIG. 28B is a rear perspective view of the articulated machine with the boom apparatus and the cabin positioned at a rear of the articulated machine.
Figure 28C:
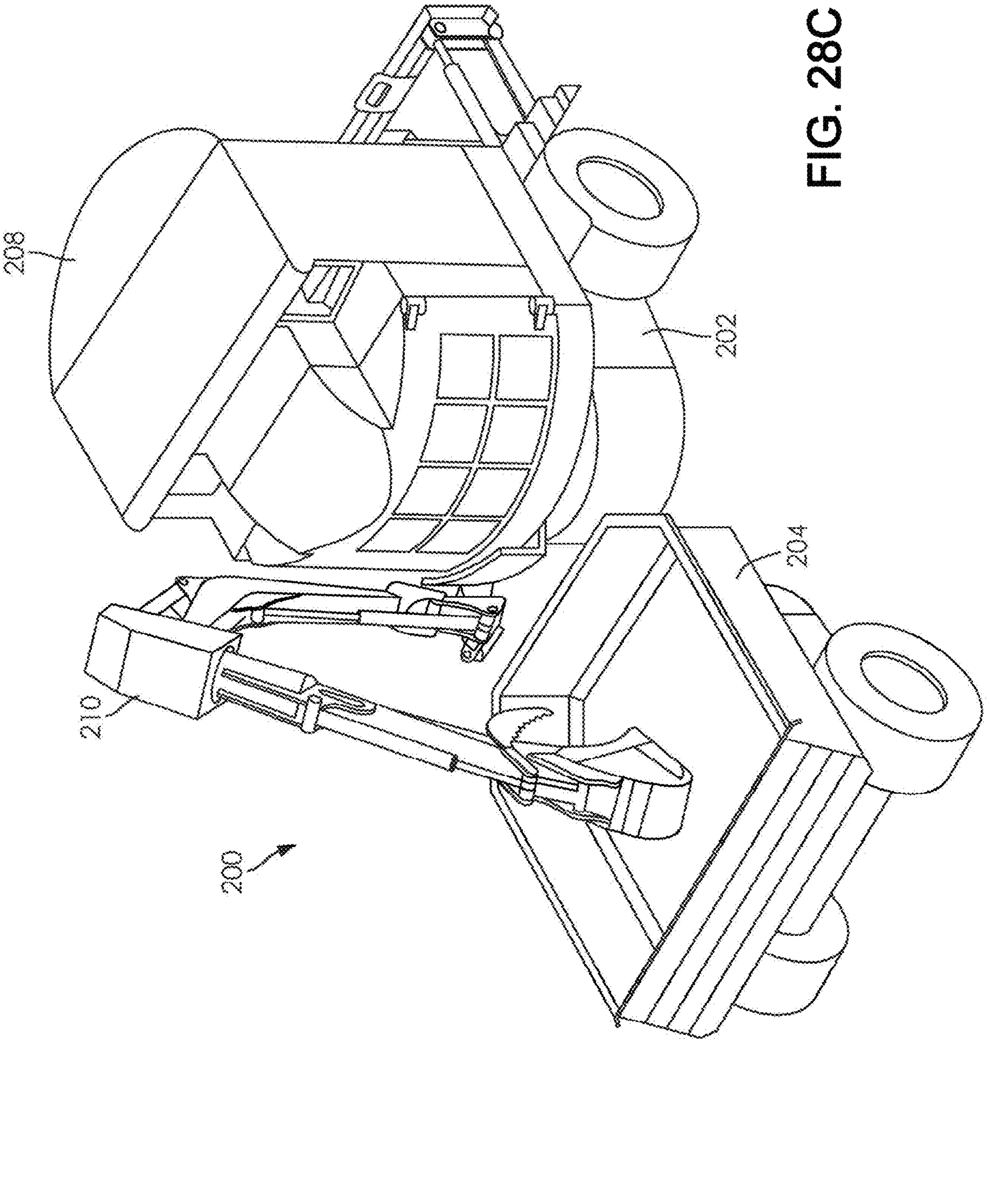
FIG. 28C is a rear, top perspective view of the articulated machine with the boom apparatus positioned at the rear of the articulated machine and the cabin positioned toward the front of the articulated machine.

With reference to FIGS. 28A-28C, the machine 200 includes multiple independently rotating components enabled by the power swivel system 206. The rear chassis 202 can move independently through the rear chassis actuator 230. The cabin 208 can rotate continuously and without limitation about the rotational axis (A) of the power swivel system 206 through the cabin rotation actuator 250 and the cabin rotation gear 254. The boom apparatus 210 can also rotate continuously and without limitation about the rotational axis (A) of the power swivel system 206 through the undermounted gear 258 engaged to a boom rotation actuator 260, allowing the boom to move around the entire periphery of the machine. The front chassis 202, the cabin 208, and the boom apparatus 210 can rotate independently or synchronously relative to the front chassis 202 due to the independent sections of the power swivel system 206.

In operation and with reference to FIG. 28A, the boom apparatus 210 and the cabin 208 can be positioned at a front of the articulated machine 200. The operator can use the boom apparatus 210 to collect a limb that was removed from a tree using the attachment 284 such as a saw. With reference to FIG. 28B, the operator can move both the boom apparatus 210 and the cabin 208 such that the boom apparatus 210 and the cabin 208 are positioned toward a rear of the articulated machine 200. The operator can release the limb of the tree from the boom apparatus 210 and allow the limb to fall into the dump body 234 of the rear chassis 204. With reference to FIG. 28C, the operator can rotate the cabin 208 independently from the boom apparatus 210 such that the boom apparatus 210 can be positioned toward the rear of the articulated machine 200 and the cabin positioned toward the front of the articulated machine 200 to allow for the operator to view the tree and determine whether additional limbs should be removed before rotating the boom apparatus 210 to the front of the machine 200.

As described herein, it should be appreciated that each of the rear chassis actuator 230, the dump rotation actuator 242, the lift actuator 244, the dump actuator 246, the cabin rotation actuator 250, the boom rotation actuator 260, the boom actuator 266, the boom stick actuator 270, the bucket actuator 276, and the thumb actuator 280 can include a hydraulic actuator. In certain embodiments, any of the rear chassis actuator 230, the dump rotation actuator 242, the lift actuator 244, and the dump actuator 246, the cabin rotation actuator 250, the boom rotation actuator 260, the boom actuator 266, the boom stick actuator 270, the bucket actuator 276, and the thumb actuator 280 can include an electric actuator, a pneumatic actuator, a mechanical actuator, and an electro-hydraulic actuator. The rear chassis actuator 230, the dump rotation actuator 242, the lift actuator 244, and the dump actuator 246, the cabin rotation actuator 250, the boom rotation actuator 260, the boom actuator 266, the boom stick actuator 270, the bucket actuator 276, and the thumb actuator 280 can be centrally powered by a power system, including various types of power systems such as hydraulic, electrical, and/or pneumatic power systems. A skilled artisan can select a suitable actuator within the scope of the present disclosure.

In certain embodiments, the machine 200 can include multiple actuators beyond the rotational system discussed herein to enable further movement capabilities. The boom apparatus 210 can include several actuators that work together, including a boom arm assembly actuator for changing the angle of the boom arm assembly 256 on a vertical axis relative to boom swivel plate 248. Additionally, the machine 200 can include a tool actuator for operating various tools through the tool connector 222 of the front chassis 202, such as brush mowers, grading blades, road sweepers, motorized augers, and other specialized tools. Importantly, the boom arm assembly actuator and the tool actuator can be implemented using a power system such as a hydraulic actuator, an electric actuator, a pneumatic actuator, a mechanical actuator, or an electro-hydraulic actuator, providing flexibility in operation. Both of the boom arm assembly actuator and the tool actuator can be powered via the power swivel system 206.

The machine 200 can be constructed from a durable industrial-grade material to militate against weathering and corrosion in outdoor operating conditions. The components, including the front chassis housing 212 and the rear chassis housing 224, can be constructed from a non-rusting, non-corrosive material such as high-strength steel, an aluminum alloy, and/or a reinforced composite to provide structural integrity for heavy-duty applications. A skilled artisan can select a suitable material for constructing the machine 200 within the scope of the present disclosure. The frame of the machine 200 can be formed as a unitary body using manufacturing processes including water-jet cutting, press-forming, and welded joints to create a robust structure capable of withstanding demanding outdoor conditions and heavy-duty use. The selection of appropriate materials and manufacturing processes can ensure the machine maintains its structural integrity and operational capabilities across various environmental conditions while performing tasks such as forestry management, agricultural operations, and general material handling.

Figure 29:
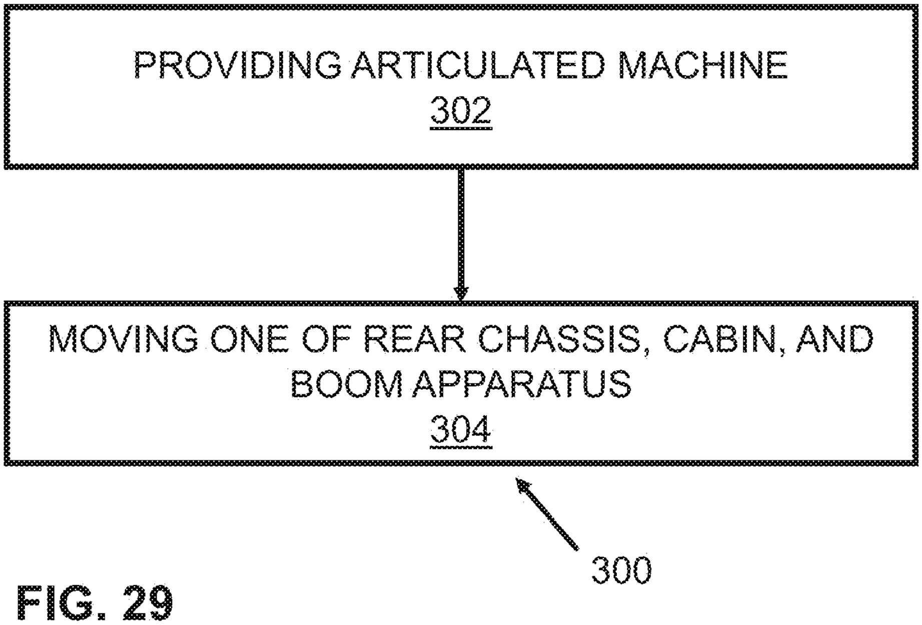
FIG. 29 is a flowchart depicting a method for moving an articulated machine.

The present disclosure provides a method 300 for moving an articulated machine 200, shown generally in FIG. 29. In a step 302, the machine 200, as described herein, can be provided. The method can include a step 304 of independently moving at least one of the rear chassis actuator 230, the cabin rotation actuator 250, and the boom rotation actuator 260, whereby at least one of the rear chassis 204, the cabin 208, and the boom apparatus 210 move independently of one another.

As described hereinabove, the machine 200 can include the power swivel system 206. In certain embodiments, the power swivel system 206 can include a dual power swivel system 400, shown generally in FIGS. 30-43, which can provide both electrical and hydraulic power throughout the dual power swivel system 400. It should be appreciated that the dual power swivel system 400 can allow for the cabin 208 and the boom apparatus 210 to rotate independently from one another as well as the front chassis 202. The dual power swivel system 400 can include a core 402, a first portion 404, a second portion 406, and a third portion 408.

Figure 30:
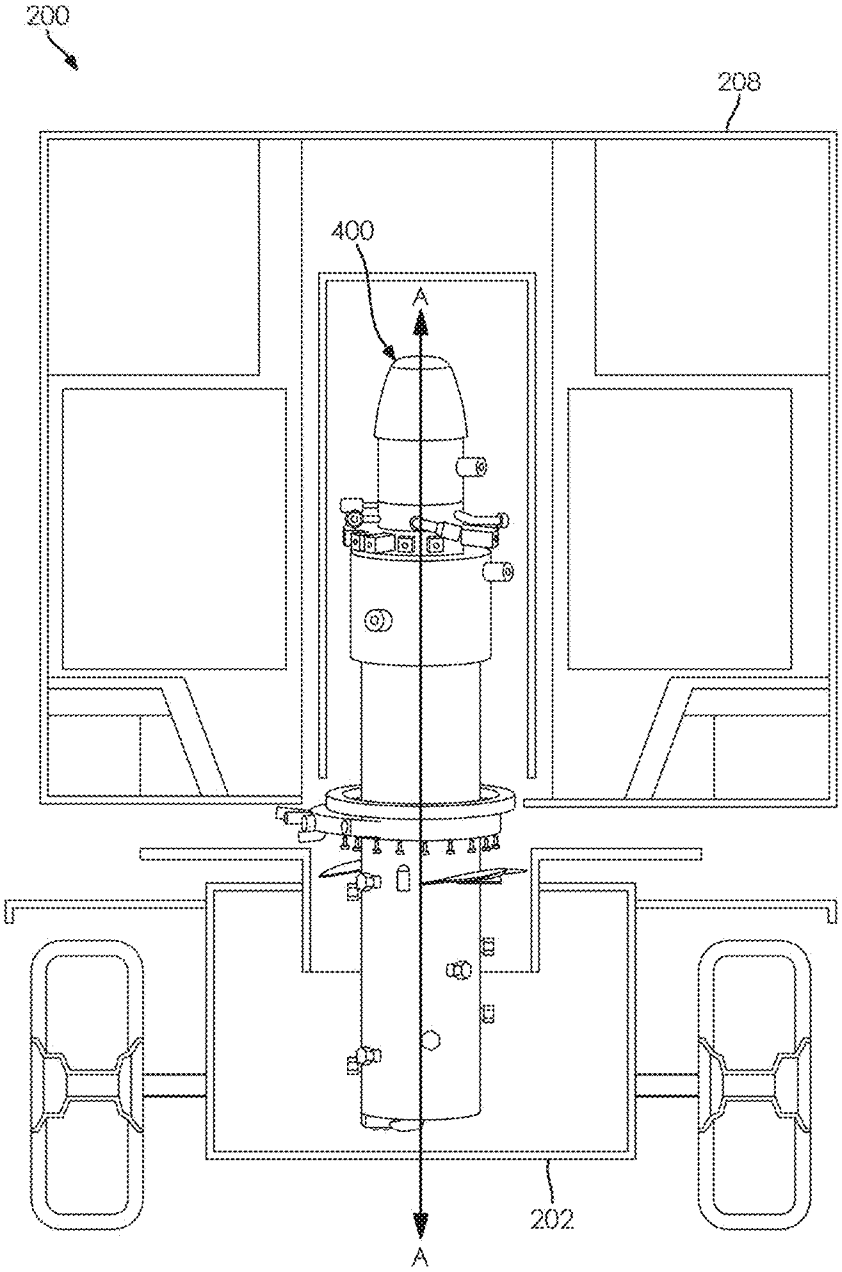
FIG. 30 is a side elevational, cross-sectional view taken at A—A of FIG. 22 depicting a dual power swivel system of the articulated machine within the front chassis and the cabin.

The core 402 can function as the central structural and operational element of the dual power swivel system 400, extending along the rotational axis (A), as shown in FIG. 30. The core 402 can provide a structure around which the first portion 404, the second portion 406, and the third portion 408 can be disposed. The core 402 can permit electrical conduit to run from one end to another end, enabling continuous electrical connectivity throughout the dual power swivel system 400 while accommodating the rotational movement of the various portions.

It should be appreciated that the dual power swivel system 400 includes the first portion 404, the second portion 406, and the third portion 408 to allow for independent operational control of the cabin 208 and the boom apparatus 210. The first portion 404 can be disposed about and coupled to the core 402. The first portion 404 can be configured to provide electrical power to rotate the cabin 208 of the machine 200. The second portion 406 can be rotatably disposed about the core 402 and can be configured to rotate with the boom apparatus 210 of the articulated machine 200. The second portion 406 can provide both electrical and hydraulic power to the boom apparatus 210. The third portion 408 can be disposed about the core 402 in a stationary configuration within and coupled to the front chassis 202. The third portion 408 can provide both hydraulic power and electrical power to the front chassis. The first portion 404 and the second portion 406 can rotate independently of one another and the third portion, thereby allowing the cabin 208 and boom apparatus 210 to rotate independently of each other and the front chassis 202.

Figure 31:
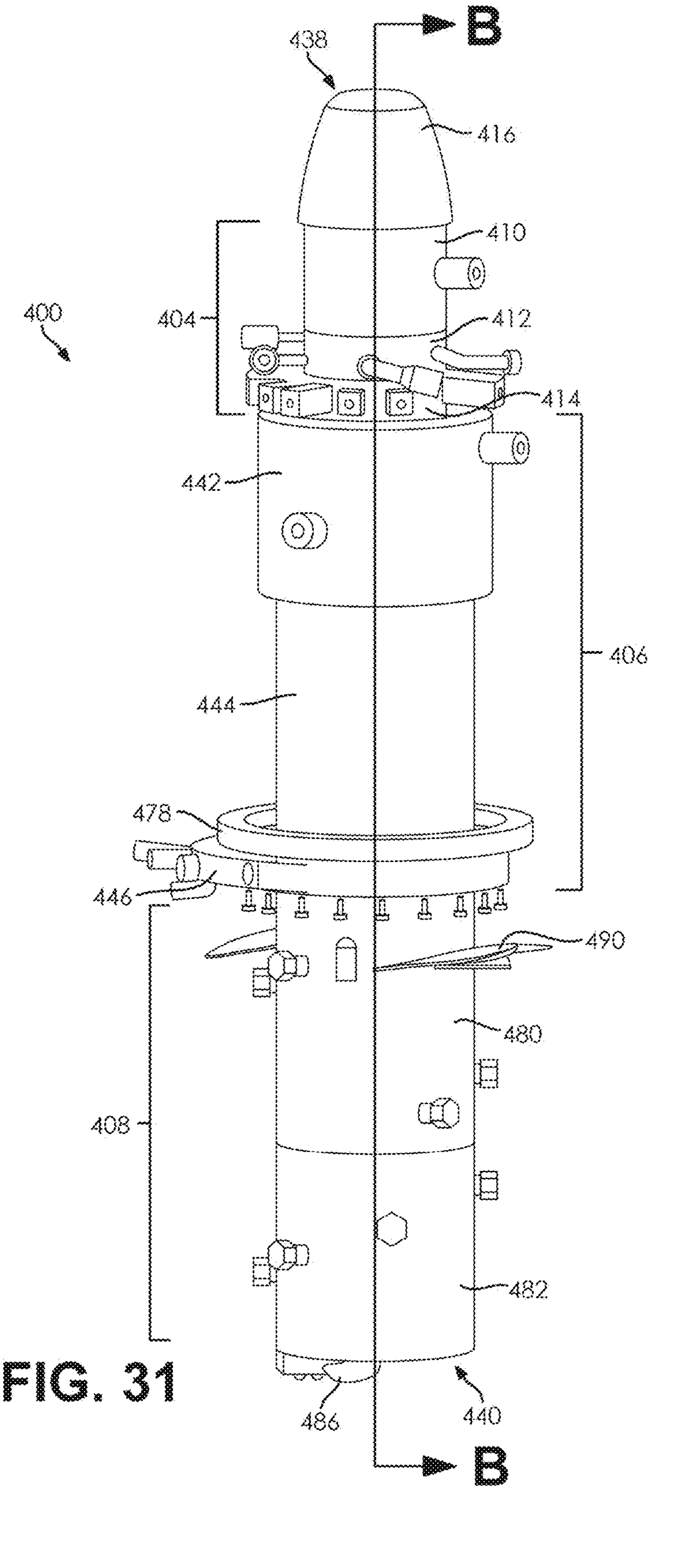
FIG. 31 is a side elevational view of the dual power swivel system.
Figure 32:
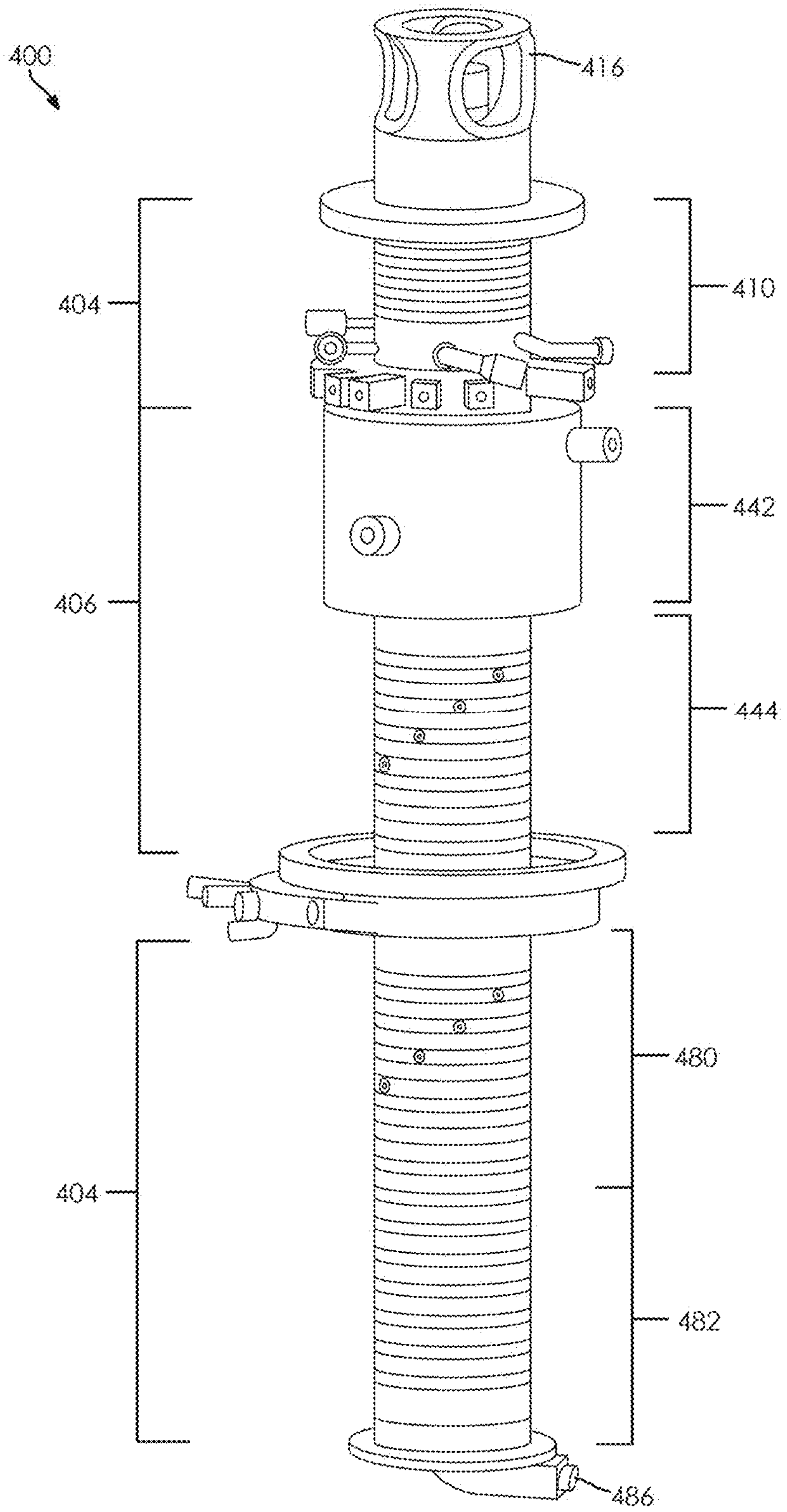
FIG. 32 is a side elevational view of the dual power swivel system with certain housing removed.
Figure 33:
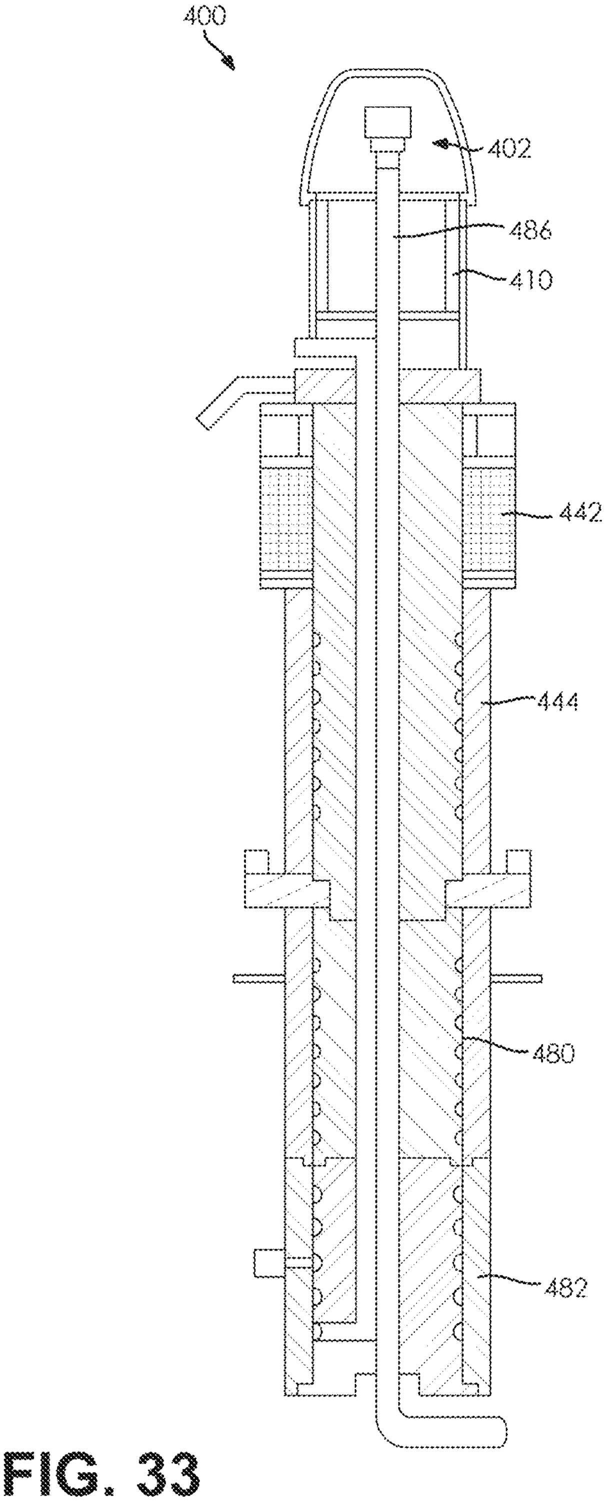
FIG. 33 is a side elevational, cross-sectional view taken at B—B of FIG. 31 depicting a core of the dual power swivel system.

With reference to FIGS. 31-33, the first portion 404 can be disposed about and coupled to the core 402. The first portion 404 can be configured to rotate with the cabin 208 of the machine 200 and the first portion 404 can provide continuous power transmission capabilities while maintaining continuous and unlimited degrees of rotational functionality. The integration of electrical power transmission within the first portion 404 can create a comprehensive power delivery system that maintains operational capability regardless of cabin 208 position relative to the front chassis 202 or other machine components, such as the boom apparatus 210. The first portion 404 can include a first slip ring assembly 410, a first manifold 412, and a second manifold 414.

Turning to FIGS. 35-38, the first slip ring assembly 410 can work together with an electrical hub 416 to provide power to the cabin 208. The first slip ring assembly 410 can include various components, all in electrical communication, to allow electrical power to flow from a power source, through the dual power swivel system 400, and into the cabin 208. Electrical wire from the cabin 208 can enter the first slip ring assembly 410 via a first slip ring input 418. The first slip ring input 418 can be configured to receive multiple electrical wires originating from various cabin 208 systems including power generation equipment, control systems, communication devices, operator interfaces, and monitoring equipment housed within the cabin 208.

The electrical wire entering through the first slip ring input 418 can be placed in electrical communication with one or more first slip ring lugs 420 that can serve as secure a connection point for establishing electrical contact throughout the first slip ring assembly 410. Each first slip ring lug 420 can be configured to receive and secure an electrical wire from the cabin 208, creating multiple independent electrical circuits that can handle different power requirements and signal types. The first slip ring lugs 420 can be constructed from conductive materials that can maintain reliable electrical connectivity while accommodating the rotational movements and environmental stresses encountered during operation of the articulated machine. The slip ring lugs 420 can be arranged to provide organized wire management and can include fastening mechanism (not shown) that can ensure secure electrical connections are maintained throughout the operational life of the power swivel system.

Each first slip ring lug 420 can be placed in electrical communication with a first conductive ring 424 that can serve as a rotating electrical conductor within the first slip ring assembly 410. The first conductive ring 424 can be constructed from highly conductive materials such as copper or specialized conductive alloys, for example, which can maintain excellent electrical conductivity while providing durability and resistance to wear from continuous rotational contact. Each first conductive ring 424 can be configured to handle specific electrical requirements such as DC power transmission, control signal distribution, or communication data transfer, enabling multiple independent electrical circuits to operate simultaneously within the first slip ring assembly. Each first conductive ring 424 can be mounted within the first slip ring assembly 410 using a fastening method that can maintain proper alignment and spacing while allowing for smooth rotational movement.

Each first conductive ring 424 can be placed in electrical communication with a first brush 426 that can provide sliding electrical contact between the rotating first conductive ring 424 and stationary electrical connections within the first slip ring assembly 410. The first brush 426 can be constructed from carbon or other specialized conductive materials that can maintain reliable electrical contact while minimizing friction and wear during continuous rotation operations. Each brush 426 can be spring-loaded or otherwise biased to maintain consistent contact pressure against its corresponding conductive ring, ensuring reliable electrical connectivity throughout the full range of rotational movement. The first slip ring assembly 410 can include multiple brushes 426 for each first conductive ring 424 to provide redundancy and ensure that electrical connectivity is maintained even if individual brushes 426 experience wear or temporary loss of contact. The brushes 426 can be configured to accommodate the rotational speeds and environmental conditions encountered during power swivel system operation while maintaining consistent electrical performance.

The brushes 426 can be placed in electrical communication with a first slip ring 428 that can sit interior to the first slip ring assembly 410 and can complete the electrical connection within the rotating first slip ring assembly 410. The first slip ring 428 can be constructed as a conductive element that can rotate independently from the exterior components of the first slip ring assembly 410 while maintaining electrical connectivity through the first brush 426 interface. Each first slip ring 428 can be configured to handle specific electrical circuits and can be isolated from adjacent slip rings 428 to militate against electrical crosstalk or interference between different electrical systems. The first slip ring 428 can be mounted on a bearing or similar rotation mechanism that can enable smooth, continuous rotation while maintaining proper electrical contact through the brush 426 system.

The first slip rings 428 within the first slip ring assembly 410 can be connected to a first rod 430 that can be disposed within the core 402 and can provide structural mounting and electrical connectivity throughout the dual power swivel system 400. The first rod 430 can serve as both a mechanical support element and an electrical conductor that can transmit electrical power and information from the first slip ring assembly 410 through the core 402 to the electrical hub 416. The first rod 430 can be constructed from a conductive material that can maintain electrical connectivity while providing adequate structural strength to support the components of the first slip ring assembly 410 during rotational operations. The first rod 430 can be configured to interface with the electrical conduit system within the core 402, enabling electrical connections to be routed from the first slip ring assembly 410 to the electrical hub 416.

The electrical hub 416 can include a first electrical ring 432 in electrical communication with the first rod 430. The first electrical ring 432 can also include one or more first electrical ring lugs 434, with each first electrical ring lungs 434 in electrical communication with an electrical wire 435. The electrical wire 435 can bundle into an opening of the electrical hub 416 and feed down through the core 402 from a first end 438 of the core 402 to a second end 440 of the core 402. The electrical wires 435 can exit the core 402 at the second end 440.

Figure 34:
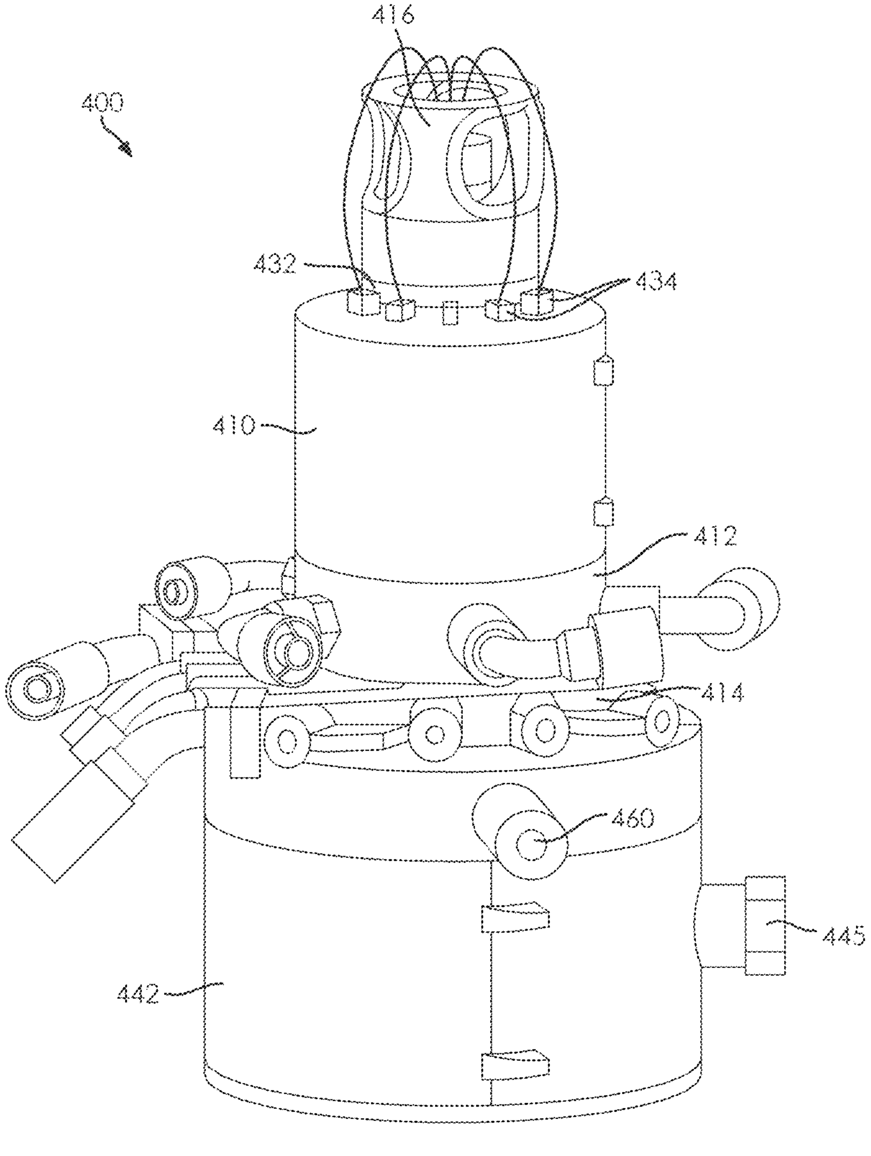
FIG. 34 is a side elevational view of a portion of the dual power swivel system including a first slip ring assembly and a second slip ring assembly.
Figure 35:
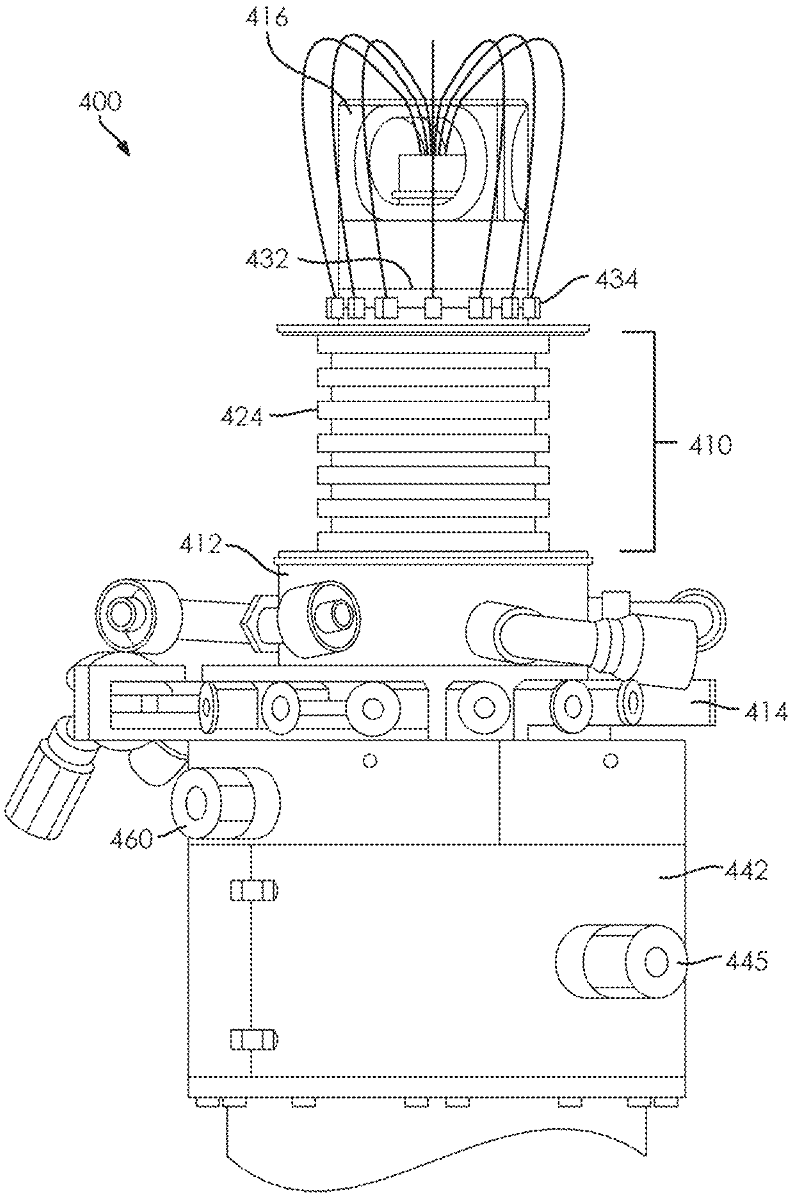
FIG. 35 is a side elevational view of the first slip ring assembly without a housing and the second slip ring assembly.
Figure 36:
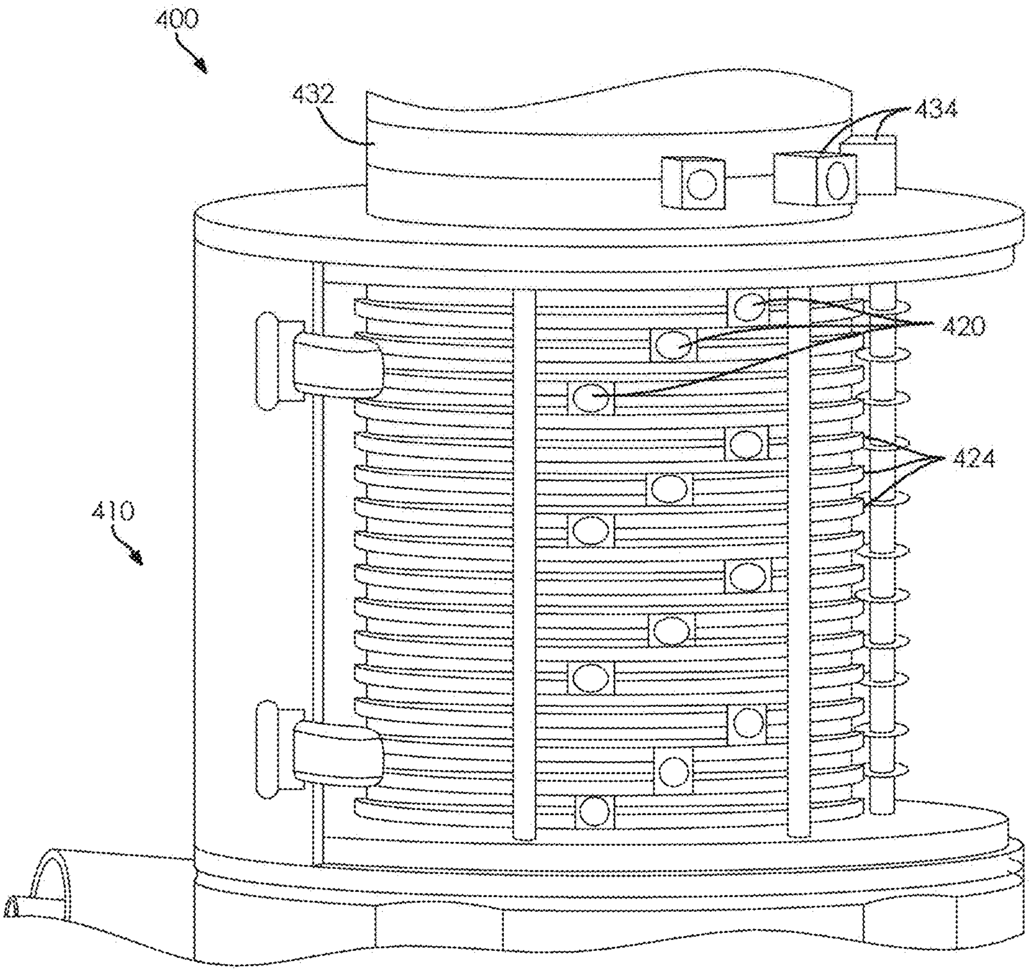
FIG. 36 is a side elevational view of the first slip ring assembly without a housing.
Figure 37:
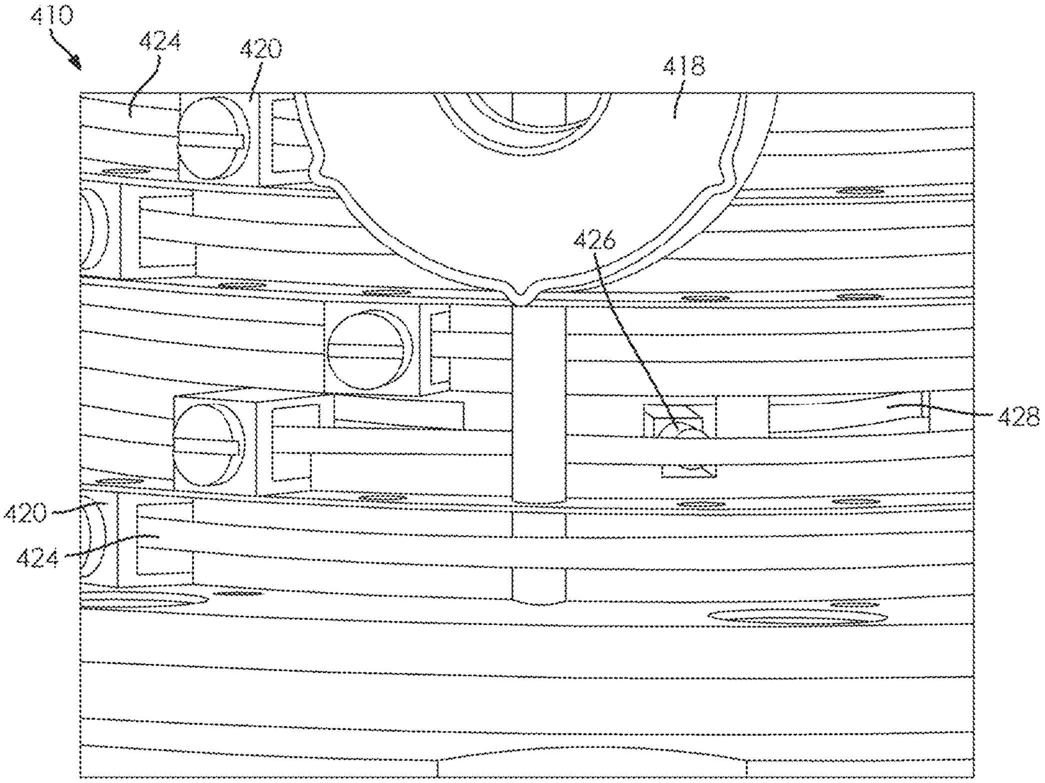
FIG. 37 is a side elevational view of a first slip ring lug and first conductive ring of the first slip ring assembly.
Figure 38:
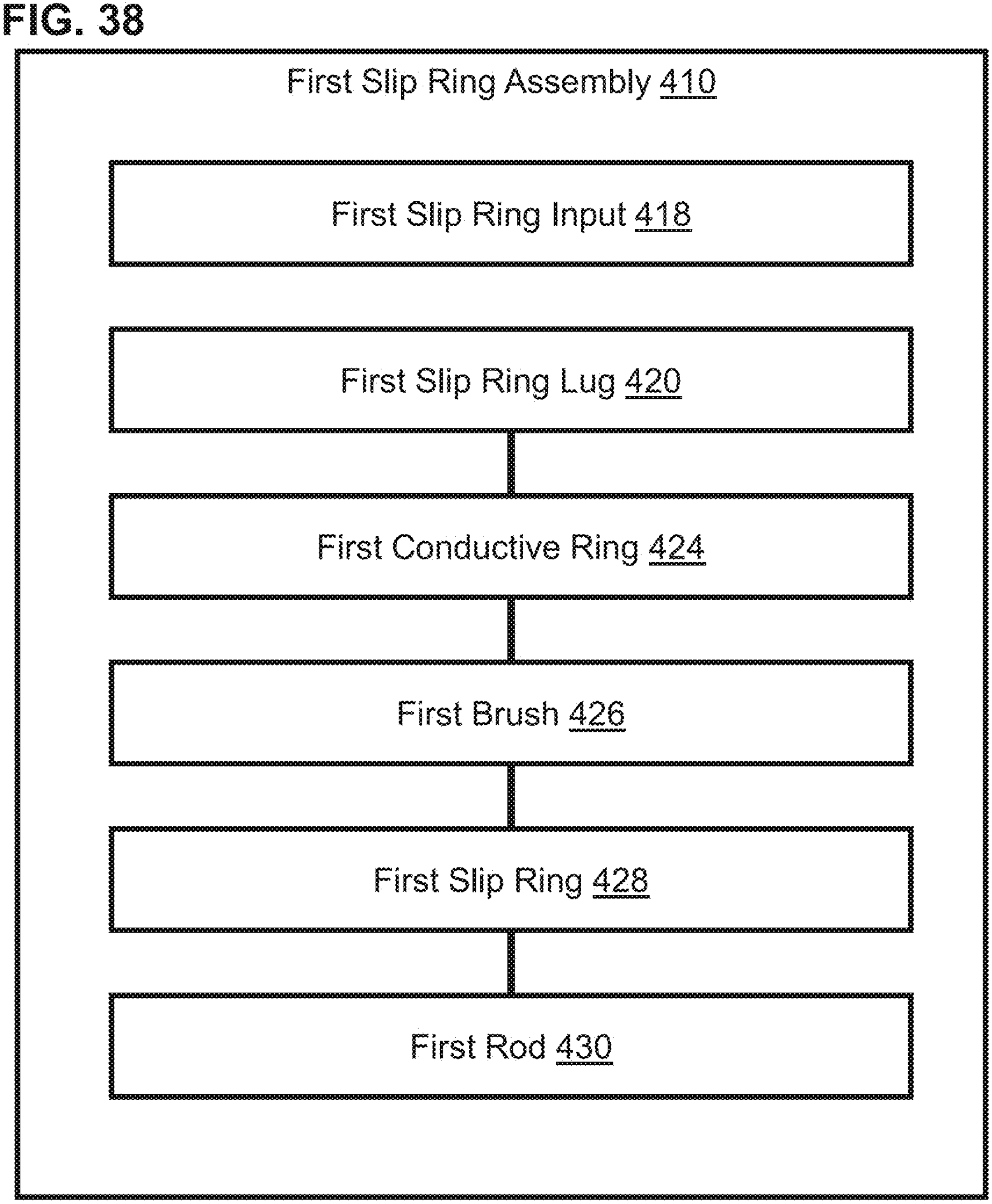
FIG. 38 is a schematic depicting the first slip ring assembly.
Figure 39:
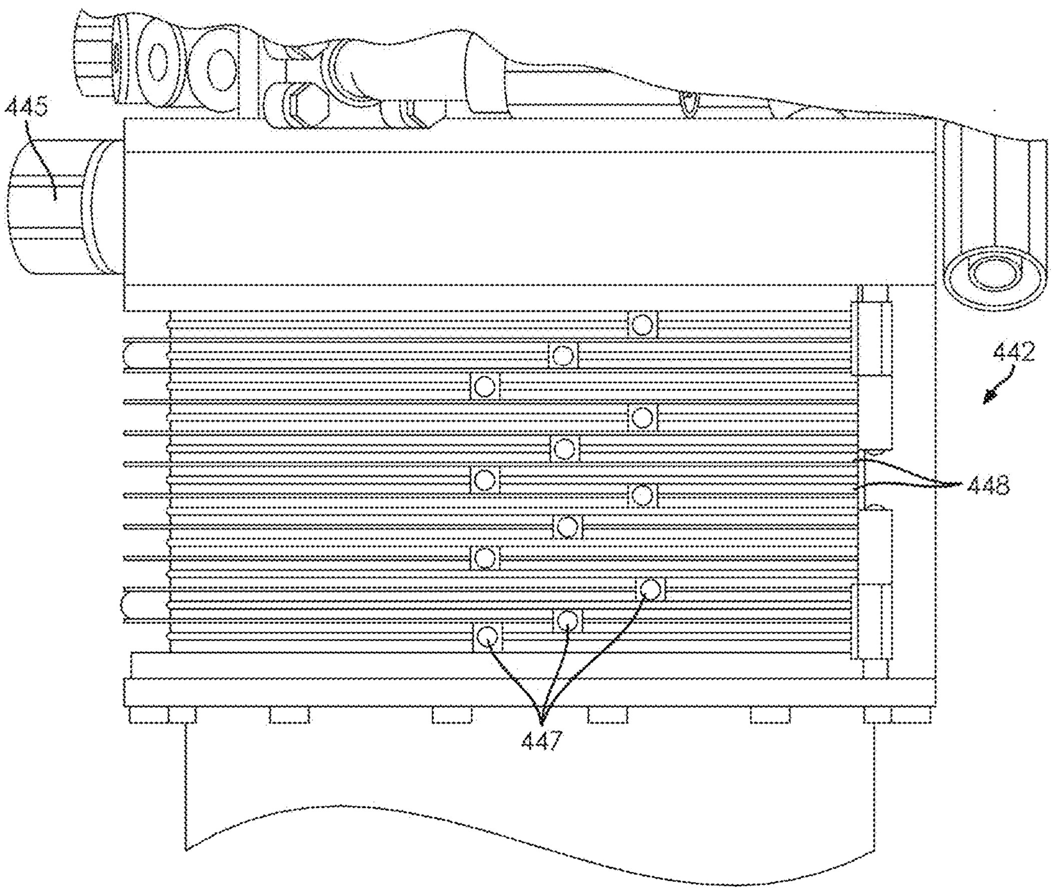
FIG. 39 is a side elevational view of the second slip ring assembly without a housing.
Figure 40:
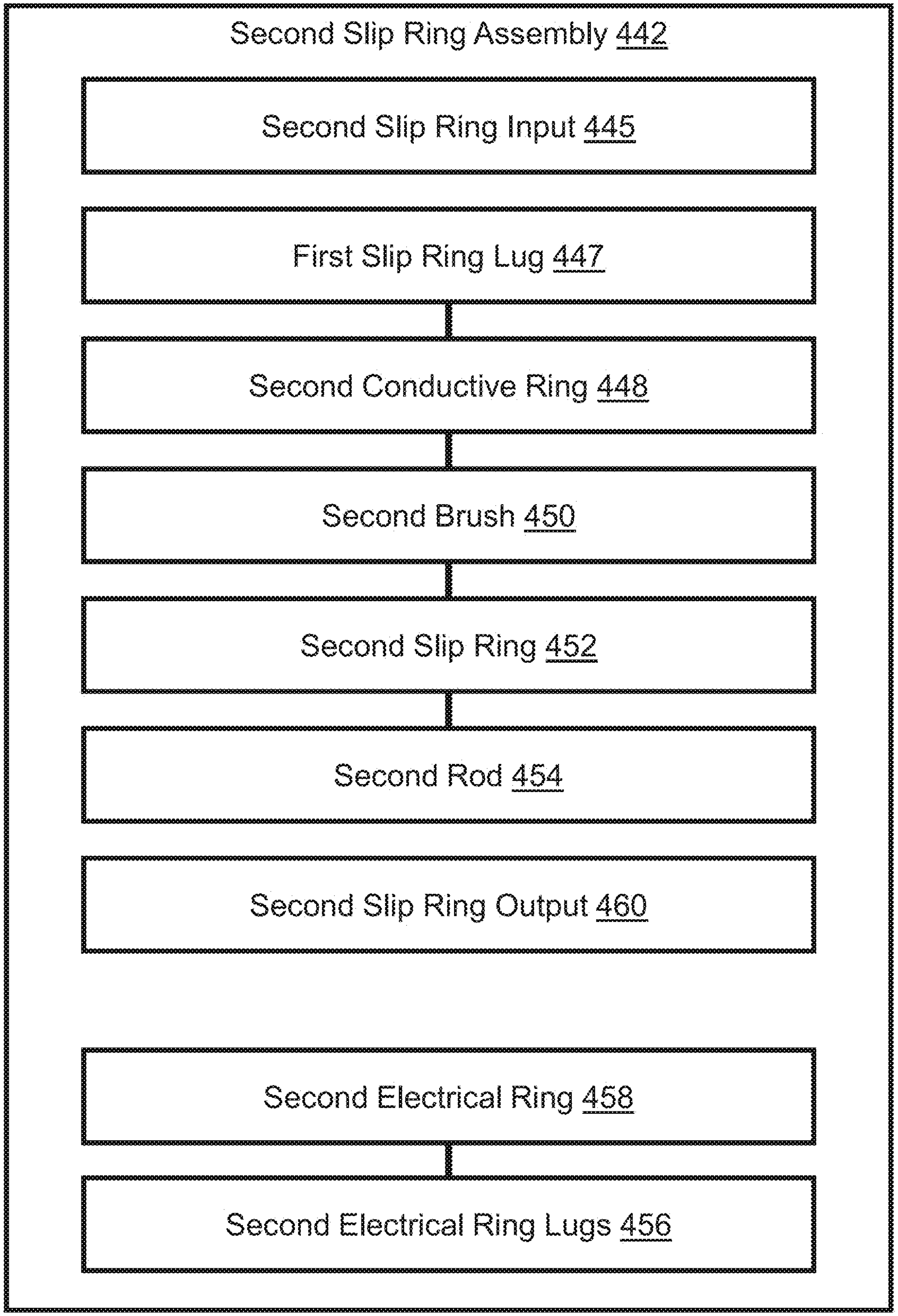
FIG. 40 is a schematic depicting the second slip ring assembly.

In sum, electrical power can flow through the first portion 404 by placing the electrical wire 435 from the cabin 208 in electrical communication with the first slip ring assembly 410, which can be in electrical communication with the first rod 430. The first rod 430 can, in turn, be placed in electrical communication with the electrical hub 416 which can run electrical power to the wires 435 connected to the one or more first electrical ring lugs 434. These wires 435 can be run into the electrical hub 416, as shown in FIGS. 34-35 and through the electrical conduit housed in the core 402.

Turning now to FIG. 32, the second portion 406 can be disposed about and coupled to the core 402. The second portion 406 can be configured to rotate with the boom apparatus 210 of the machine 200 and the second portion 406 can provide continuous electrical and hydraulic power while maintaining continuous and unlimited degrees of rotational functionality. The second portion 406 can rotate independently about the rotational axis (A) of the core 402 while the core 402 itself remains stationary relative to the boom apparatus 210. The integration of both electrical and hydraulic power transmission within the second portion 406 can create a comprehensive power delivery system that maintains operational capability regardless of boom apparatus 210 position relative to the front chassis 202 or other machine components, such as the cabin 208. The second portion 406 can include a second slip ring assembly 442, a first jug 444, and a support manifold 446.

The second portion 406 of the dual power swivel system 400 can be configured to provide electrical power distribution to the boom apparatus 210 through the second slip ring assembly 442 that can operate substantially in accordance with the same electrical transmission principles as the first slip ring assembly 410 while maintaining independent rotational capabilities. The second slip ring assembly 442 can be engineered to receive electrical power from an external power source through a second slip ring input 445, which can serve as the primary electrical entry point for power distribution to the boom apparatus and associated hydraulic and mechanical systems.

The second slip ring assembly 442 can include a plurality of interconnected electrical components that can work in coordinated fashion to maintain continuous electrical connectivity while permitting unlimited rotational movement of the second portion relative to the core 402 and other components of the dual power swivel system 400. The components can include one or more second slip ring lugs 447 that can be configured to receive incoming electrical wires 435 from the power source, a second conductive ring 448 that can be electrically coupled to the second slip ring lugs 447 through soldered connections to ensure electrical continuity, a second brush assembly comprising one or more carbon brushes 450 that can maintain physical contact with rotating electrical components, a second slip ring 452 that can rotate independently while maintaining electrical contact through the brush assembly, and a second rod 454 that can be electrically connected to the second slip ring 452 through silver soldering or other suitable electrical joining methods to ensure optimal current transmission.

The electrical pathway through the second slip ring assembly 442 can begin with electrical wires 435 entering from the power source through the second slip ring input 445, where the electrical current can flow through the second slip ring lugs 447, which can be electrically connected to the second conductive ring 448 through soldered joints that can provide permanent electrical connections capable of handling the required electrical loads for boom apparatus 210 operation. The second conductive ring 448 can be electrically coupled to the second brush 450.

The second brush 450 can conduct electrical current to the second slip ring 452, which can be configured as a brass or other conductive metal ring that can rotate independently from the surrounding assembly components while maintaining electrical connectivity through the brush 450 contact interface. The second slip ring 452 can include a second rod 454 that can be coupled through silver soldering or equivalent high-conductivity joining methods, with the second rod 454 extending upward to connect with one or more second electrical ring lugs 456 on a second electrical ring 458 that can serve as the output terminals for the electrical current while the assembly maintains rotational capabilities.

The electrical routing configuration of the second slip ring assembly 442 can differ from the first slip ring assembly 410 in that the electrical wires 435 emerging from the second electrical ring lugs 456 do not proceed to the electrical hub 416 as occurs in the first slip ring assembly 410, but instead can exit the second slip ring assembly 442 through a second slip ring output 460 that can provide a controlled exit point for the electrical conductors. The electrical wires 435 can then reenter the second portion 406 through the first jug 444, which can serve as an intermediate routing component to accommodate the electrical conductors while maintaining the structural integrity and rotational capabilities of the second portion 406.

Upon entering the first jug 444, the electrical wire 435 can be routed through an internal pathway (not shown) that can be configured to accommodate the electrical conductors while militating against interference with hydraulic fluid pathways and mechanical components. The electrical wires 435 can exit the first jug 444 through the support manifold 446, which can serve as both a mechanical coupling component and an electrical routing interface between the second portion 406 and the boom apparatus 210. The support manifold 446 can include a passage or conduit that can allow the electrical wires 435 to pass through while maintaining appropriate sealing and protection from environmental factors and mechanical damage.

The electrical pathway can culminate with the wires 435 emerging from the support manifold 446 to provide electrical power directly to the boom apparatus 210, enabling operation of various electrical and electro-hydraulic components associated with the boom apparatus 210, including a hydraulically operated actuator with an electrical control system, an electrical valve assembly, a lighting system, a sensor array, a control interface, and other electrical equipment that can be integrated with the boom apparatus 210 for enhanced operational capabilities and control.

Turning now to the hydraulic power mechanism of the second portion 406, the second portion 406 can utilize hydraulic power for providing power to the boom apparatus 210. The second portion 406 can include the first jug 444 through which the boom apparatus 210 can receive hydraulic fluid. The second portion 406 of the dual power swivel system 400 can be constructed from a durable material such as high-strength steel, stainless steel, aluminum alloys, brass, bronze, or other corrosion-resistant metals, for example, that can withstand high hydraulic pressure and provide reliability over the lifespan of the dual power swivel system 400, particularly in a demanding operational environment. A skilled artisan can select a suitable material for the second portion 406 based on the ability of the material to resist wear, corrosion, and hydraulic fluid compatibility, within the scope of the present disclosure.

Figure 43:
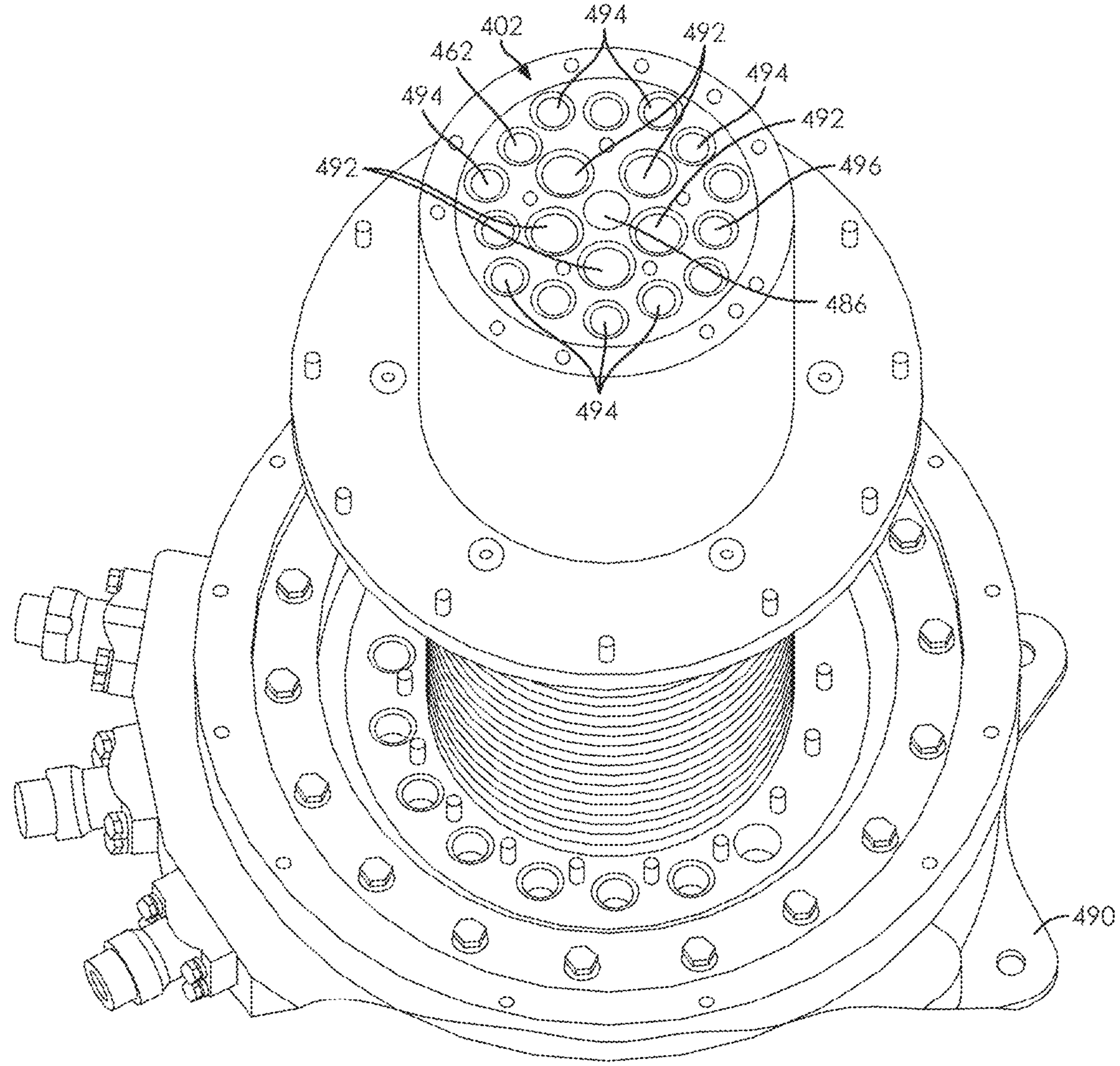
FIG. 43 is a top perspective view of a port of a core of the dual power swivel system.

With reference to FIG. 43, the core 402 can include one or more ports 462 that can be disposed as a vertical channel or an opening within the core 402 and can run along the rotational axis (A) of the core 402. The ports 462 can be configured to ensure hydraulic fluid flow from a fluid source into the respective portion of the dual power swivel system 400 and can be configured as one-way ports to militate against hydraulic fluid backflow. In this way, the ports 462 can maintain system pressure integrity in operation. A skilled artisan can select a suitable number and configuration for the ports 462 within the core 402 within the scope of the present disclosure.

Figure 41A:
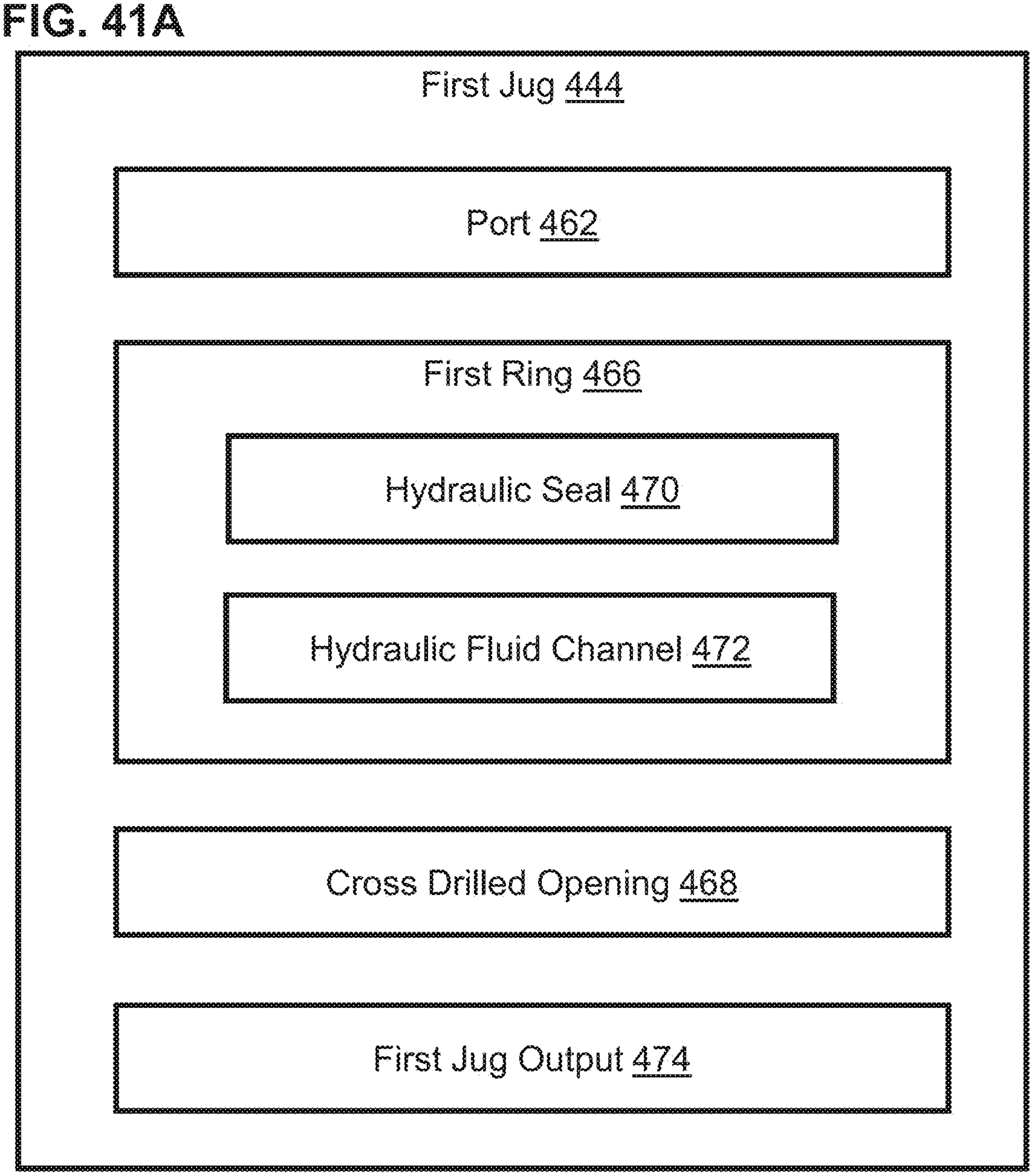
FIG. 41A is a schematic depicting the first jug.
Figure 41B:
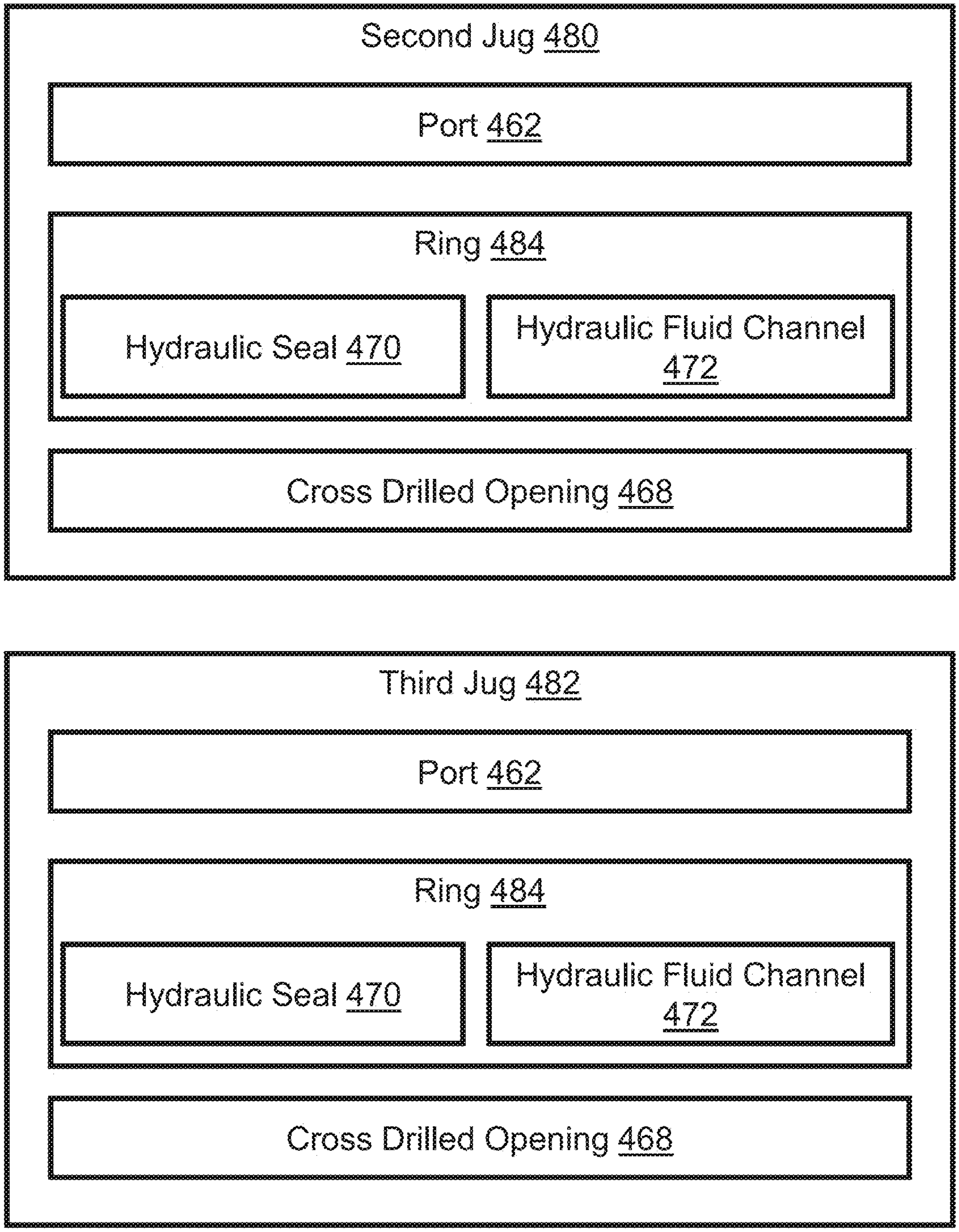
FIG. 41B is a schematic depicting the second jug and the third jug.
Figure 42:
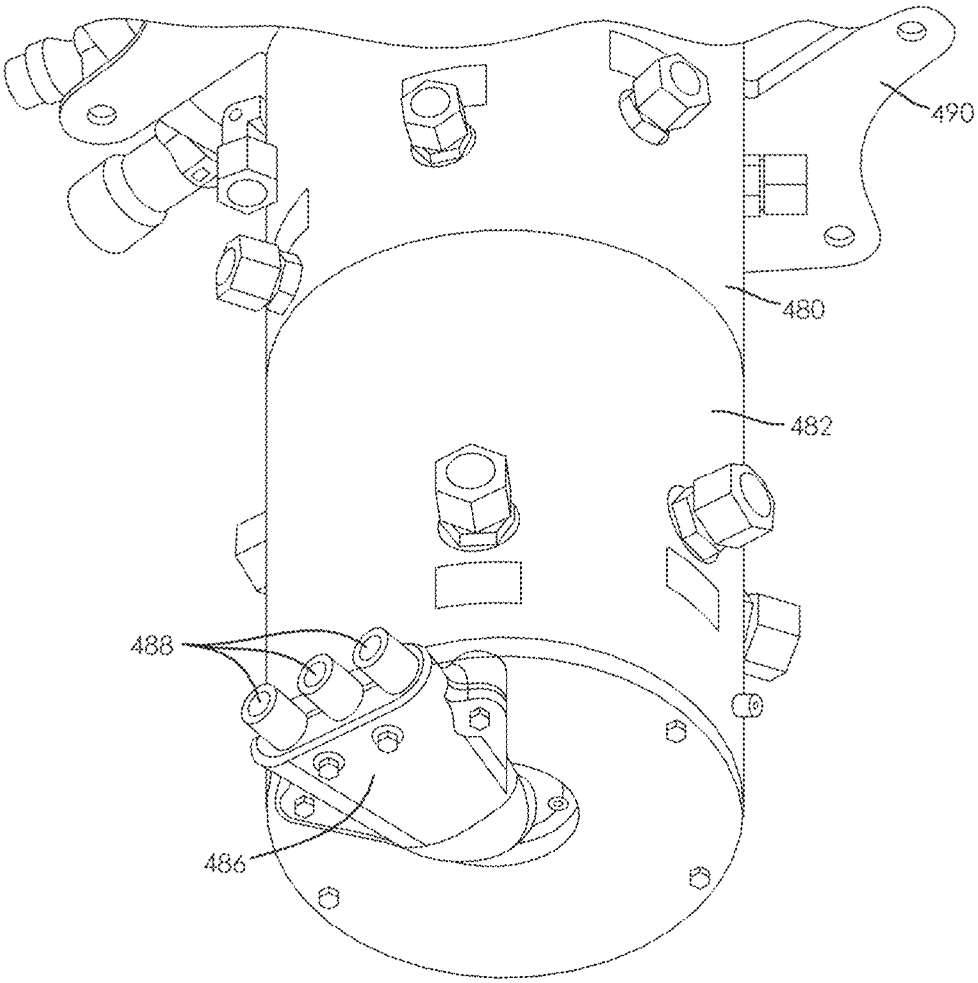
FIG. 42 is a bottom perspective view of a second jug, a third jug, and an electrical conduit system of the dual power swivel system.

With reference to FIG. 41A, the first jug 444 can include one or more first rings 466 that can be manufactured from materials such as hardened steel, cast iron, or specialized hydraulic-grade alloy, for example, to withstand rotational stresses and hydraulic pressures in operation. Each first ring 466 can include a cross-drilled opening 468 with each first ring 466 having one opening 468 that can correspond with one of the vertical ports 462 that runs through the core 402. The cross-drilled openings 468 can create a channel or passageway for the hydraulic fluid to flow from the ports 462 in the core 402 into a circumferential hydraulic fluid channel 472 within each first ring 466, facilitating efficient hydraulic fluid distribution throughout each first ring 466. It should be appreciated that each port 462 can correspond to a first ring 466 of the first jug 444, with each port 462 serving a specific hydraulic circuit within the system 400.

Each first ring 466 can include a hydraulic seal 470 that can be constructed from materials including nitrile rubber, fluorocarbon elastomers, polyurethane, or other specialized sealing compounds, for example. Each first ring 466 can include one or more hydraulic seals 470 that can militate against hydraulic fluid from exiting the first ring 466 and can provide rotary sealing action between the stationary core 402 and the rotating first jug 444. The hydraulic seal 470 can be positioned to isolate each first ring 466 individually and can maintain fluid pressure while militating against cross-contamination between different first rings 466. The hydraulic seal 470 can be configured to accommodate continuous rotation of the first jug 444 while maintaining sealing performance, with the rotary sealing action enabling the core 402 to remain stationary relative to the rotating various components of the first jug 444.

As described herein, the first rings 466 can include the internal hydraulic fluid channel 472 that can promote proper hydraulic fluid flow within the system 400. The channel 472 can include a smooth surface to minimize pressure loss and can incorporate a tapered entry to facilitate efficient hydraulic fluid movement. The hydraulic fluid channel 472 can be disposed within each first ring 466 to align with the corresponding port 462 and can create a continuous fluid pathway from the core 402 to a first jug output 474.

The first jug 444 can include one or more first jug outputs 474 that can include a one-way configuration to militate against hydraulic fluid backflow and maintain system 400 pressure. Each first jug output 474 can correspond to one of the first rings 466 in the first jug 444 and can be positioned to align with one hydraulic fluid channel 472 within the first ring 466. The first jug output 474 can include a threaded portion to accommodate a hydraulic fitting for using with the dual power swivel system 400 to deliver hydraulic fluid to the desired portion of the boom apparatus 210.

In operation, hydraulic fluid can travel through the core 402 via the port 462, into the first ring via the cross-drilled opening 468, through the hydraulic fluid channel 472 of the first ring 466 and out the first jug output 474 to provide hydraulic fluid to a portion of the boom apparatus 210. The one-way first jug output 474 can promote hydraulic fluid flow in the intended direction, with hydraulic fluid coming down the core 402 and ultimately exiting the dual power swivel system 400 into the boom apparatus 210. The hydraulic fluid flow can be controlled by the user via operation of the boom apparatus 210, with the operator control enabling management of hydraulic fluid distribution to various hydraulic circuits and actuators throughout the machine 200. It should be appreciated that the first jug outputs 474 can be evenly disposed about a portion of the circumference and the length of the first jug 444 to allow for 474 to be connected to the closest reasonable portion of the boom apparatus 210 that requires hydraulic fluid, optimizing hydraulic line routing and reducing system 400 complexity.

As shown in FIG. 31, the second portion 406 can include the support manifold 446 can couple the second portion 406 of the dual power swivel system 400 to the boom apparatus 210. The support manifold 446 can be disposed within the hydraulic system to facilitate the transition of both hydraulic fluid and electrical connections from the rotating core 402 to the boom apparatus 210. The support manifold 446 can be configured to accommodate the complex routing requirements of the multi-functional swivel system while maintaining sealing and operational integrity.

The support manifold 446 can facilitate electrical wire 435 routing from the core 402 to the boom apparatus 210. Specifically, electrical wires 435 can be disposed within and substantially adjacent to an interior of the wall of the first jug 444 and can exit the second portion 406 through the support manifold 446, allowing the wires 435 to come out on the top of the boom apparatus 210 where the electrical wire 435 can be properly sealed. The electrical routing capability can enable the transmission of control signals, power, and communication lines to various electrical components mounted on the boom apparatus 210, including a hydraulic valve control, a lighting system, and a sensor network.

In certain embodiments, the second portion 406 can include a cab bearing plate 478 which can facilitate the rotational interface between the cabin 208 and the boom apparatus 210. The cab bearing plate 478 can be disposed to accommodate the mechanical load generated during simultaneous rotation of both the cabin 208 and boom apparatus 210 while maintaining structural integrity in operation.

With reference to FIG. 31, the third portion 408 can be disposed about the core 402 and can be stationary within and coupled to the front chassis 202, providing both hydraulic power and electrical power to the front chassis 202. The third portion 408 can include a second jug 480 and a third jug 482, which can operate using the same principles as the first jug 444 to supply hydraulic power to the front chassis 202 rather than the boom apparatus 210. The second jug 480 and third jug 482 can each include multiple rings 484 each having a hydraulic fluid channel 472. Each ring 484 can include the cross-drilled opening 468 that can correspond to a vertical port 462 within the core 402, as described herein relating to the first jug 444.

The third portion 408 can also provide electrical power via a conduit system 486 that can be disposed at the second end 440 of the core 402. The conduit system 486 can include one or more conduit ports 488 that can be configured to run a control wire, a DC wire, and/or other electrical connections from the first end 438 via the electrical hub 416 to the second end 440 for front chassis 202 electrical power distribution. In certain embodiments, the conduit port 488 can be constructed with a strain relief mechanism and can be positioned to provide secure routing of electrical cables while maintaining protection from environmental factors and mechanical stress. The conduit system 486 can accommodate various types of electrical connections including the control wire for system operation, the DC power wire for electrical operation of the first portion 404 and the second portion 406, and communication lines for data transmission between the first portion 404, the second portion 406, and the third portion 408 of the dual power swivel system 400.The conduit system 486 can rotate with the electrical hub 416 and the front chassis 202, allowing for continuous electrical connectivity while accommodating the rotational requirements of the dual power swivel system 400.

In certain embodiments, third portion 408 can include a bracket 490 coupled to an exterior surface of the second jug 480 for coupling the third portion 408 stationary within the front chassis 202. Although the bracket 490 can couple the third portion 408 stationary within the front chassis 202, it should be appreciated that the entirety of the dual power swivel system 400 is coupled to the machine 200 via the bracket 490 however, as described herein, the first portion 404 and the second portion 406 can rotate independently of the third portion 408 to move the cabin 208 and the boom apparatus 210, respectively. The bracket 490 can be positioned to engage with a corresponding mounting point within the front chassis 202 and can be configured to resist rotational forces while maintaining the stationary position of the third portion 408 relative to the front chassis 202. In certain embodiments, the bracket 490 can include multiple attachment points and can be configured to distribute mechanical loads effectively across the mounting interface of the front chassis 202, promoting stable operation during machine 200 movement and operation.

Returning now to the core 402 as shown in FIGS. 30-33, the core 402 can have the rotational axis (A) which extends from the first end 438 to a second end 440 while being configured to permit electrical conduit to run from the first end 438 to the second end 440. The core 402 can be constructed as one integral piece, providing a unified structure for the entire dual power swivel system 400. The core 402 can be manufactured from durable materials including high-strength steel, stainless steel, cast iron, or a specialized alloy, for example, capable of withstanding the rotational stress, hydraulic pressure, and mechanical force encountered during continuous operation. A skilled artisan can select a suitable material within the scope of the present disclosure.

As described herein, the core 402 can include multiple port 462 configurations for different functional requirements throughout the dual power swivel system 400. In a particular embodiment shown in FIG. 43, the core 402 can include an inner ring of five ports 492 that can be configured to feed various drive motors disposed throughout the machine 200 for propulsion of the machine 200 in use. Additionally, the core 402 can include an outer ring of seven ports 494 that can be configured supply hydraulic fluid to the boom apparatus 210 via the first jug 444. The remaining ports 496 within the core 402 can be configured to supply hydraulic fluid to the second jug 480 and the third jug 482 for hydraulically powering the front chassis 202. The ports 462 can be manufactured with specific diameters and circular cross-sections optimized for the flow rates and pressure requirements of their respective hydraulic circuits.

The core 402, the first portion 404, the second portion 406, and the third portion 408 of the dual power swivel system 400 can enable independent rotation while maintaining continuous electrical and hydraulic power distribution throughout the machine 200. The rotational axis (A) of the core can permit electrical conduit to run from the first end 438 to the second end 440 while housing various ports 462 that distribute hydraulic fluid to the various machine components. The first portion 404 can be disposed about and coupled to the core 402 and can be configured to rotate with the cabin 208 of the machine 200. The second portion 406 can be rotatably disposed about the core 402 and configured to rotate with the boom apparatus 210. The third portion 408 can be disposed about the core 402 and remain stationary within and coupled to the front chassis 202, providing both hydraulic power and electrical power to the front chassis 202. The core 402 configuration can enable the first portion 404 and the second portion 406 to rotate independently of one another and independently of the third portion 408, allowing the cabin 208 and the boom apparatus 210 to rotate independently of one another and the front chassis 202 while maintaining uninterrupted power transmission through the arrangement of slip rings, manifolds, and hydraulic distribution ports within the dual power swivel system 400.

EXAMPLES

The following example demonstrates an embodiment of the present disclosure in use. The example is provided for illustrative purposes only and should not be construed as limiting the scope of the present disclosure. It will be appreciated by those skilled in the art that various modifications, alternatives, and variations of the example can be made without departing from the scope of the present disclosure as defined by the appended claims.

At the start of the workday, an operator parks the machine 200 to load a tool set into the dump body 234 and climbs the step 218 to enter the cabin 208. The dump body 234 provides versatile storage capacity for various materials including tools, cut stone, logs, firewood, pallets, crushed stone aggregate, and topsoil during operation. A coworker joins the operator in the cabin 208, demonstrating how the machine 200 facilitates efficient crew transport to remote work locations.

Upon reaching the worksite, the operator opens the hinged tailgate 240 to retrieve the tools from the dump body 234. Before beginning sandstone collection, the operator deploys the outrigger 222 for enhanced stability during operations. From the ergonomic position in the cabin 208, the operator skillfully coordinates the boom arm assembly 256, utilizing the precise control of the boom 264, boom stick 268, bucket 274, and thumb 278 to securely grip the sandstone. The thumb 278 moves in opposition to the bucket 274, creating a secure grip on the material throughout the entire operation.

Throughout the day, the operator maximizes efficiency by utilizing the rotation capability of the machine 200. The boom apparatus 210 rotates continuously and without limitation through the boom rotation actuator 260, enabling 360-degree material transfer from any collection point around the machine 200. Simultaneously, the cabin 208 rotates independently through the cabin rotation actuator 250, allowing the operator to maintain optimal visibility between the dump body 234, the boom arm assembly 256, and the worksite as the sandstone is collected for transport. The power swivel system 206 facilitates the coordinated movement through independent sections that enable separate rotation capabilities for the cabin 208 and boom apparatus 210.

Using the comprehensive operator controls housed in the cabin 208, the operator manages all machine functions including movement, cabin 208 rotation, rear chassis 204 positioning, lift mechanism 226 operation, dump body 234 manipulation, tailgate 240 position and boom apparatus 210 control. The rear chassis actuator 230 allows for up to 20 degrees of flexion on each side of vertical from the front chassis 202 relative to the rear chassis 204, helping maintain stability while navigating challenging terrain conditions during travel to and from the worksite. It should be appreciated that the flexion function can lock when the lift mechanism 226 is deployed, to avoid machine 100 twist during lift operation.

As the dump body 234 continues to fill with sandstone, the operator and the coworker can make several trips to and from the worksite to retrieve and deliver more sandstone. When transporting the collected materials, the machine 200 maintains stability and traction through the rear chassis actuator 230, ensuring secure operation even on uneven terrain.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A power swivel system for an articulated machine having a front chassis, a cabin, and a boom apparatus, comprising:

a core having a rotational axis extending from a first end to a second end, the core including an electrical conduit running from the first end to the second end;

a first portion disposed about and coupled to the core and configured to rotate with the cabin of the articulated machine, the first portion including a first slip ring assembly for providing electrical power to the cabin, and a first manifold and a second manifold coupling the first portion to the cabin and providing hydraulic power to the first portion, wherein the first slip ring assembly includes a first slip ring input configured to receive an electrical wire from the cabin;

a second portion rotatably disposed about the core and configured to rotate with the boom apparatus of the articulated machine, the second portion including a second slip ring assembly for providing electrical power to the boom apparatus, a first jug for providing hydraulic power to the boom apparatus, and a support manifold for coupling the second portion to the boom apparatus; and a third portion disposed about the core and stationary within and coupled to the front chassis, the third portion for providing hydraulic power and electrical power to the front chassis, wherein the first portion and the second portion rotate independently of one another and the third portion to allow the cabin and the boom apparatus to rotate independently of one another and the front chassis.

2. The power swivel system of claim 1, wherein the core includes a port disposed as a vertical channel along the rotational axis of the core.

3. The power swivel system of claim 1, wherein the first slip ring assembly includes a first slip ring lug and a first conductive ring, the first slip ring lug in electrical communication with the first conductive ring.

4. The power swivel system of claim 3, wherein the first conductive ring is in electrical communication with a first brush of the first slip ring assembly.

5. The power swivel system of claim 4, wherein the first brush is in electrical communication with a first slip ring disposed inward toward the rotational axis relative to the first slip ring assembly.

6. The power swivel system of claim 5, wherein the first slip ring is connected to and in electrical communication with a rod disposed within the core.

7. The power swivel system of claim 6, further including an electrical hub including a first electrical ring in electrical communication with the rod.

8. The power swivel system of claim 7, wherein the first electrical ring includes one or more first electrical ring lugs, each of the one or more electrical ring lugs in electrical communication with an electrical wire.

9. The power swivel system of claim 8, wherein the electrical wire is disposed through an opening of the electrical hub and runs through the electrical conduit of the core from the first end to the second end of the core.

10. The power swivel system of claim 1, wherein the first jug includes a first ring.

11. The power swivel system of claim 10, wherein the first jug includes a plurality of first rings, each first ring of the plurality of first rings includes a cross-drilled opening corresponding to a port in the core.

12. The power swivel system of claim 10, wherein the first jug includes a first jug output corresponding to the first rings.

13. The power swivel system of claim 1, wherein the third portion includes a second jug and a third jug for supplying hydraulic power to the front chassis.

14. A power swivel system for an articulated machine having a front chassis, a cabin, and a boom apparatus, comprising:

a core having a rotational axis extending from a first end to a second end, the core including an electrical conduit running from the first end to the second end, and a port disposed as a vertical channel along the rotational axis of the core;

a first portion disposed about and coupled to the core and configured to rotate with the cabin of the articulated machine, the first portion including a first manifold and a second manifold coupling the first portion to the cabin and providing hydraulic power to the first portion and a first slip ring assembly for providing electrical power to the cabin, the first slip ring assembly including a first slip ring input configured to receive an electrical wire from the cabin, a first slip ring lug, a first conductive ring in electrical communication with the first slip ring lug, a first brush in electrical communication with the first conductive ring, a first slip ring in electrical communication with the first brush and disposed inward toward the rotational axis relative to the first slip ring assembly, and a rod in electrical communication with the first slip ring;

a second portion rotatably disposed about the core and configured to rotate with the boom apparatus of the articulated machine, the second portion including a support manifold for coupling the second portion to the boom apparatus, a first jug for providing hydraulic power to the boom apparatus, a second slip ring assembly for providing electrical power to the boom apparatus and having a second slip ring input, a second slip ring lug, a second conductive ring in electrical communication with the second slip ring lug, a second brush in electrical communication with the second conductive ring, and a second slip ring in electrical communication with the second brush and disposed inward toward the rotational axis relative to the first slip ring assembly; and a third portion disposed about the core and stationary within and coupled to the front chassis, the third portion for providing hydraulic power via a second jug and a third jug and electrical power to the front chassis, wherein the first portion and the second portion rotate independently of one another and the third portion to allow the cabin and the boom apparatus to rotate independently of one another and the front chassis.

15. A power swivel system for an articulated machine having a front chassis, a cabin, and a boom apparatus, comprising:

a core having a rotational axis extending from a first end to a second end, the core including an electrical conduit running from the first end to the second end;

a first portion disposed about and coupled to the core and configured to rotate with the cabin of the articulated machine, the first portion including a first slip ring assembly for providing electrical power to the cabin, and a first manifold and a second manifold coupling the first portion to the cabin and providing hydraulic power to the first portion;

a second portion rotatably disposed about the core and configured to rotate with the boom apparatus of the articulated machine, the second portion including a second slip ring assembly for providing electrical power to the boom apparatus, a first jug for providing hydraulic power to the boom apparatus, and a support manifold for coupling the second portion to the boom apparatus, wherein the second slip ring assembly includes a second slip ring input for receiving electrical power from an external power source; and a third portion disposed about the core and stationary within and coupled to the front chassis, the third portion for providing hydraulic power and electrical power to the front chassis, wherein the first portion and the second portion rotate independently of one another and the third portion to allow the cabin and the boom apparatus to rotate independently of one another and the front chassis.

16. The power swivel system of claim 15, wherein the second slip ring assembly includes a second slip ring lug configured to receive an electrical wire.

17. The power swivel system of claim 16, wherein the second slip ring assembly includes a second conductive ring electrically coupled to the second slip ring lug.

18. The power swivel system of claim 17, wherein the second slip ring assembly includes a second brush electrically coupled to the second conductive ring.

19. The power swivel system of claim 18, wherein the second slip ring assembly includes a second slip ring in electrical communication with the second brush.

* * * * *